United States Patent
Santarnecchi et al.

(10) Patent No.: US 12,440,695 B2
(45) Date of Patent: Oct. 14, 2025

(54) SYSTEMS AND METHODS TO ENHANCE MEMORY USING NON-INVASIVE BRAIN STIMULATION

(71) Applicant: Sinaptica Therapeutics, Inc., Cambridge, MA (US)

(72) Inventors: Emiliano Santarnecchi, Brookline, MA (US); Giacomo Koch, Rome (IT)

(73) Assignee: Sinaptica Therapeutics, Inc., Cambridge, MA (US)

( * ) Notice: Subject to any disclaimer, the term of this patent is extended or adjusted under 35 U.S.C. 154(b) by 0 days.

(21) Appl. No.: 18/933,030

(22) Filed: Oct. 31, 2024

(65) Prior Publication Data

US 2025/0121201 A1 Apr. 17, 2025

Related U.S. Application Data

(63) Continuation of application No. PCT/US2023/069421, filed on Jun. 29, 2023.
(Continued)

(51) Int. Cl.
*A61N 2/00* (2006.01)
*A61B 5/00* (2006.01)
(Continued)

(52) U.S. Cl.
CPC ........... *A61N 2/002* (2013.01); *A61N 1/0408* (2013.01); *A61N 1/36025* (2013.01);
(Continued)

(58) Field of Classification Search
CPC .. A61N 2/002; A61N 1/0408; A61N 1/36025; A61N 1/36031; A61N 1/36034; A61N 2/006; A61N 2/02
See application file for complete search history.

(56) References Cited

U.S. PATENT DOCUMENTS 6,266,556 B1    7/2001   Ives et al.
8,151,317 B2    4/2012   Hinton et al.
(Continued)

FOREIGN PATENT DOCUMENTS

CN    116870366 A     7/2023
EP      3106202 A1 * 12/2016     ......... A61N 1/36014
(Continued)

OTHER PUBLICATIONS

International Search Report and Written Opinion from the International Searching Authority for International Application No. PCT/US23/69421 dated Feb. 21, 2024, 22 pages.
(Continued)

*Primary Examiner* — Carrie R Dorna
*Assistant Examiner* — Joshua Daryl D Lannu
(74) *Attorney, Agent, or Firm* — Pierce Atwood LLP

(57) ABSTRACT

Provided herein are apparatuses, systems and methods for non-invasively assessing synaptic dysfunction in a patient with Alzheimer's Disease. Transcranial magnetic stimulation (TMS) is applied to at least one brain region of the patient. A plurality of TMS evoked potentials generated in response to the TMS applied to the at least one brain region of the patient is recorded with a plurality of electroencephalography (EEG) electrodes. At least one characteristic of the plurality of TMS evoked potentials is analyzed to assess synaptic dysfunction in the patient. An indication of the synaptic dysfunction assessment of the patient is output.

20 Claims, 25 Drawing Sheets

Related U.S. Application Data

(60) Provisional application No. 63/356,609, filed on Jun. 29, 2022.

(51) Int. Cl.

| | |
|---|---|
| *A61B 5/242* | (2021.01) |
| *A61B 5/245* | (2021.01) |
| *A61B 5/377* | (2021.01) |
| *A61B 5/388* | (2021.01) |
| *A61B 5/389* | (2021.01) |
| *A61N 1/04* | (2006.01) |
| *A61N 1/36* | (2006.01) |
| *A61N 2/02* | (2006.01) |
| *G16H 20/30* | (2018.01) |
| *G16H 20/70* | (2018.01) |
| *G16H 30/40* | (2018.01) |
| *G16H 40/63* | (2018.01) |
| *G16H 50/20* | (2018.01) |
| *G16H 50/50* | (2018.01) |

(52) U.S. Cl.
CPC ..... *A61N 1/36031* (2017.08); *A61N 1/36034* (2017.08); *A61N 2/006* (2013.01); *A61N 2/02* (2013.01)

(56) References Cited

U.S. PATENT DOCUMENTS

| | | |
|---|---|---|
| 8,805,516 B2 | 8/2014 | Bentwich |
| 9,492,114 B2 | 11/2016 | Reiman |
| 9,662,492 B1 | 5/2017 | Tucker et al. |
| 10,485,470 B2 | 11/2019 | Dolev et al. |
| 10,758,174 B2 | 9/2020 | Widge et al. |
| 11,406,841 B2 | 8/2022 | Ho |
| 11,786,747 B2 | 10/2023 | Malish |
| 11,793,456 B2 | 10/2023 | Malish |
| 11,998,740 B2 | 6/2024 | Koch et al. |
| 2006/0004422 A1* | 1/2006 | De Ridder ......... A61N 1/36082 607/45 |
| 2008/0101665 A1 | 5/2008 | Collins et al. |
| 2013/0267761 A1 | 10/2013 | Bentwich |
| 2014/0058189 A1 | 2/2014 | Stubbeman |
| 2015/0011864 A1 | 1/2015 | Reisberg |
| 2015/0080703 A1 | 3/2015 | Reiman |
| 2015/0119689 A1 | 4/2015 | Pascual-Leone et al. |
| 2015/0174418 A1 | 6/2015 | Tyler et al. |
| 2016/0008620 A1* | 1/2016 | Stubbeman ........ A61N 1/36082 607/45 |
| 2016/0220836 A1 | 8/2016 | Parks |
| 2017/0079538 A1 | 3/2017 | Liang et al. |
| 2017/0319063 A1 | 11/2017 | Verdooner et al. |
| 2018/0008827 A1 | 1/2018 | Dolev et al. |
| 2018/0014772 A1* | 1/2018 | Dolev ................. A61B 5/4076 |
| 2018/0236255 A1 | 8/2018 | Etkin |
| 2019/0126055 A1 | 5/2019 | Etkin et al. |
| 2019/0388020 A1 | 12/2019 | Stauch et al. |
| 2020/0214569 A1 | 7/2020 | Kim |
| 2020/0352443 A1 | 11/2020 | Fox |
| 2021/0023378 A1 | 1/2021 | Intrator |
| 2021/0031034 A1* | 2/2021 | Santarnecchi ........... A61N 2/02 |
| 2021/0045645 A1 | 2/2021 | Aur |
| 2021/0353224 A1 | 11/2021 | Etkin et al. |
| 2023/0082594 A1 | 3/2023 | Hagedorn |
| 2023/0113681 A1 | 4/2023 | Fogel et al. |

FOREIGN PATENT DOCUMENTS

| | | |
|---|---|---|
| JP | 2015097887 A | 5/2015 |
| WO | 2013172981 A1 | 11/2013 |
| WO | 2016016888 A1 | 2/2016 |
| WO | 2017197211 A1 | 11/2017 |
| WO | 2024006939 A2 | 1/2024 |

OTHER PUBLICATIONS

De Boer et al., A causal role for the right angular gyrus in self-location mediated perspective taking. Scientific Reports. 2020, vol. 10:19229, p. 1-10.

International Search Report and Written Opinion of The International Searching Authority dated Feb. 16, 2025 for International Patent Application No. PCT/US22/36115.

Koch, G. et al., Transcranial magnetic stimulation of the precuneus enhances memory and neural activity in prodromal Alzheimer's disease. NeuroImage, Dec. 19, 2017, vol. 169, pp. 302-311.

Search Report from the Intellectual Property Office of Singapore dated Nov. 12, 2024 for SG Patent Application No. 11202400007Y.

* cited by examiner

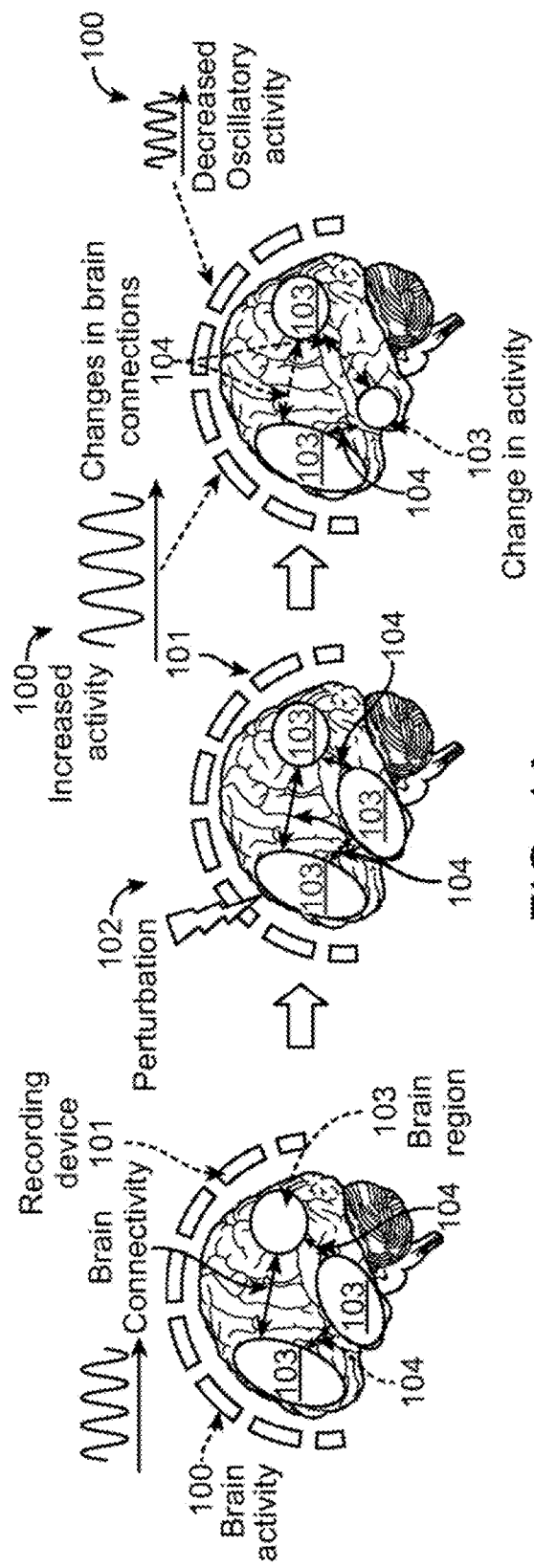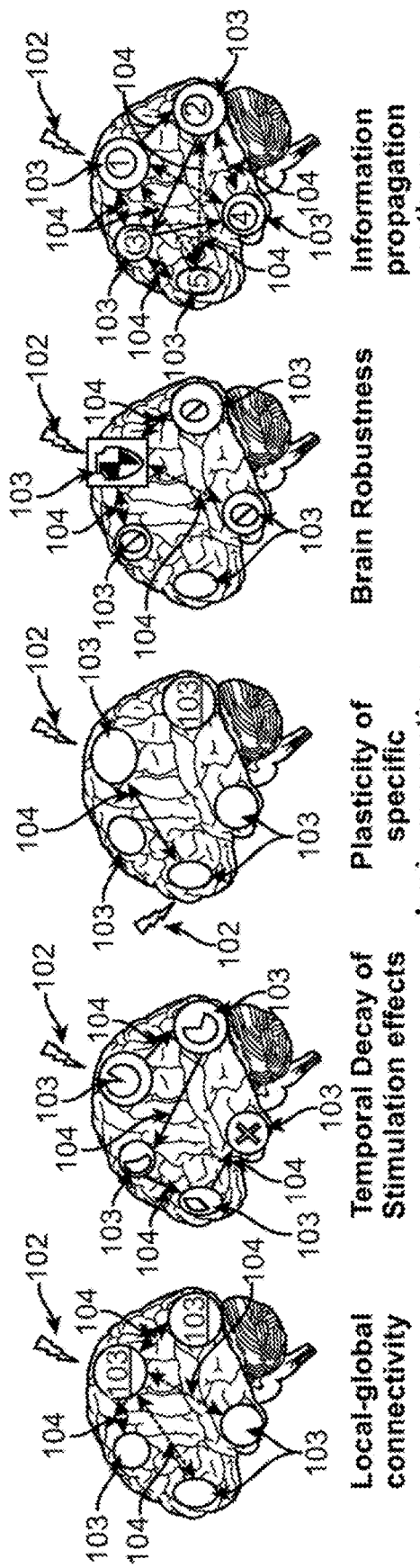

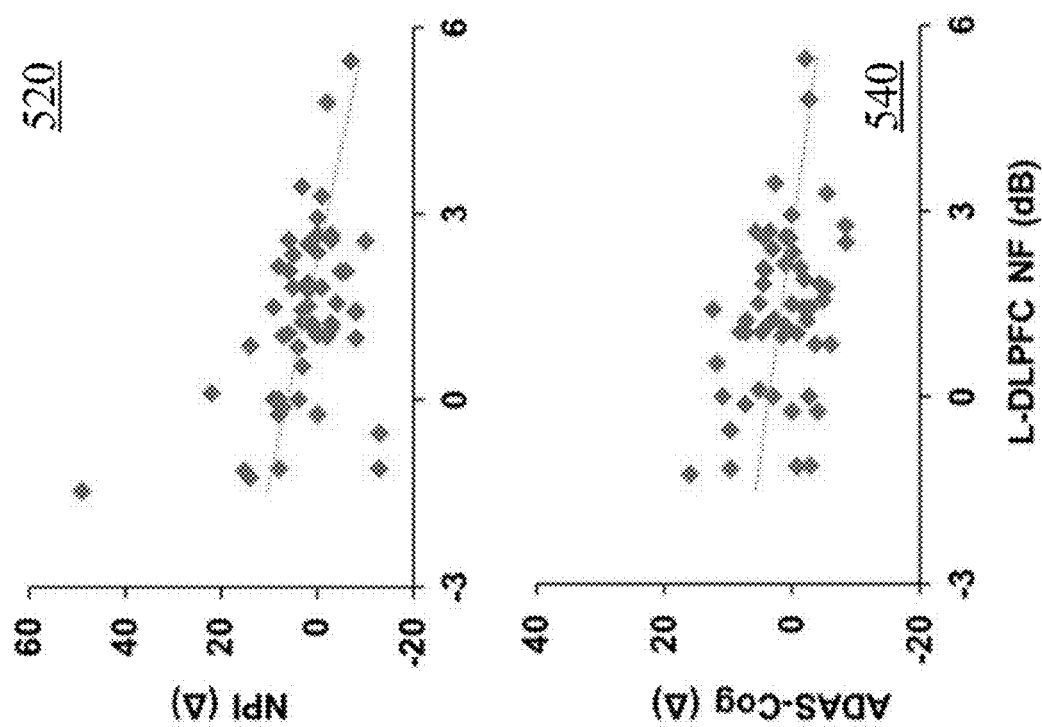
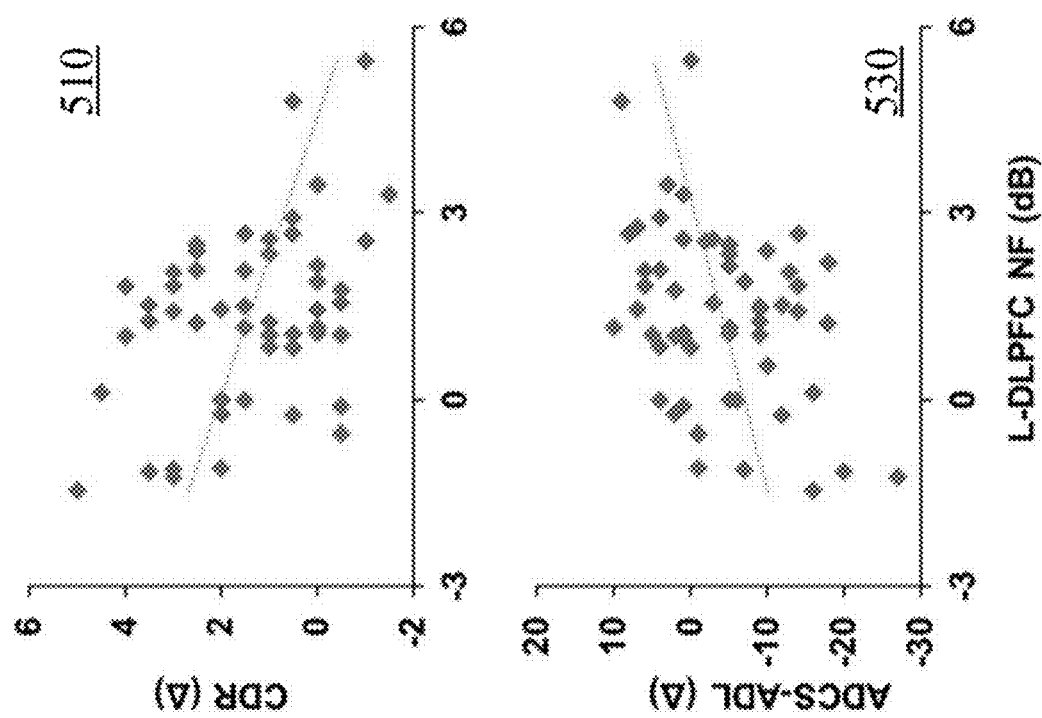
FIG. 5

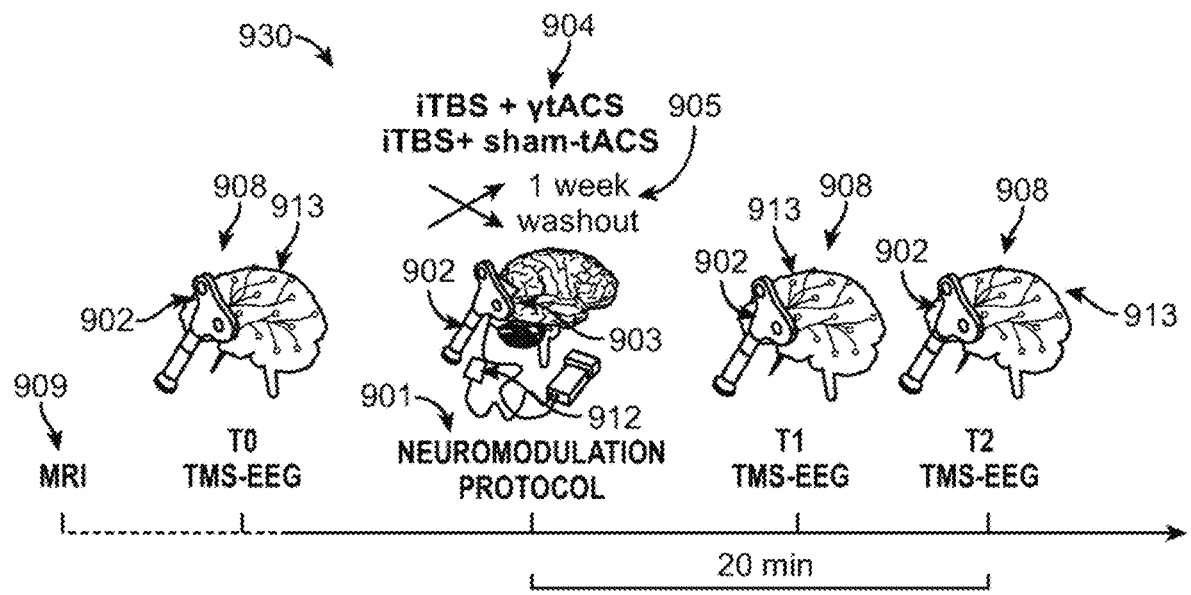
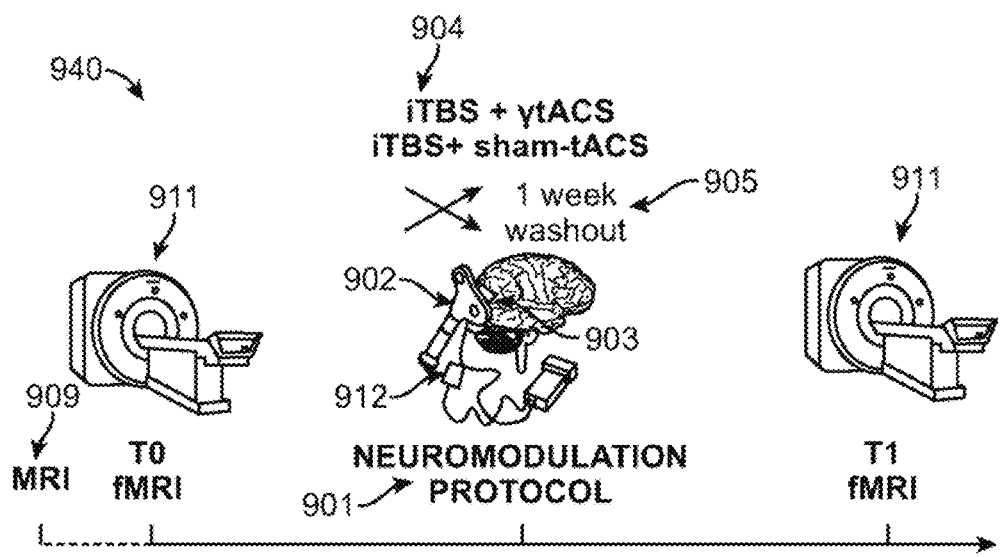
FIG. 9B

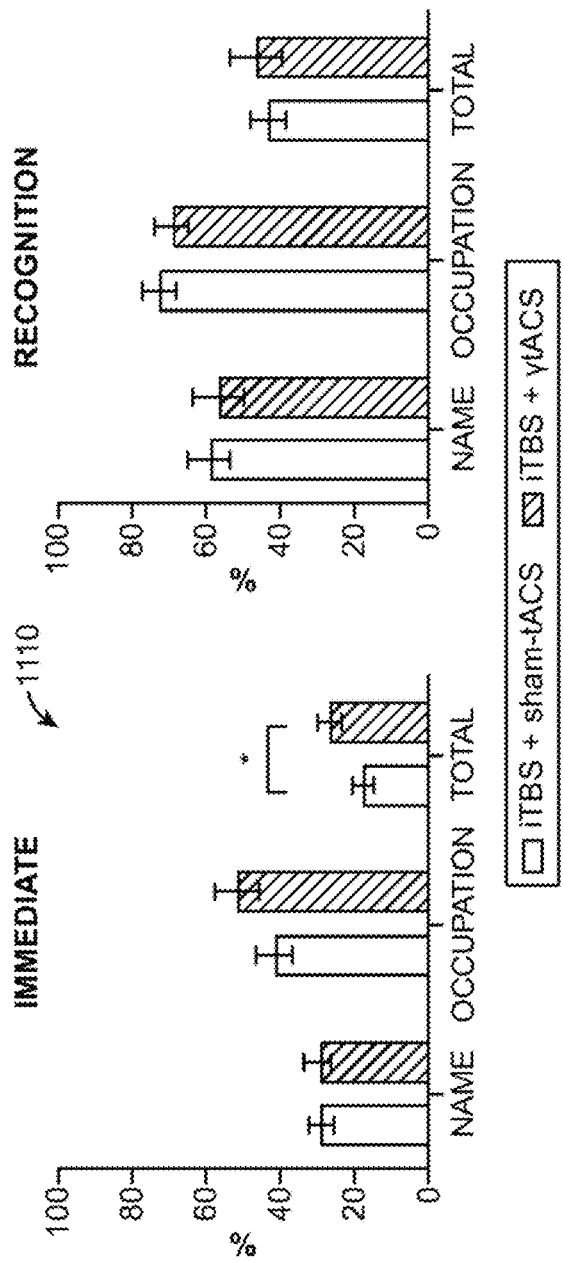
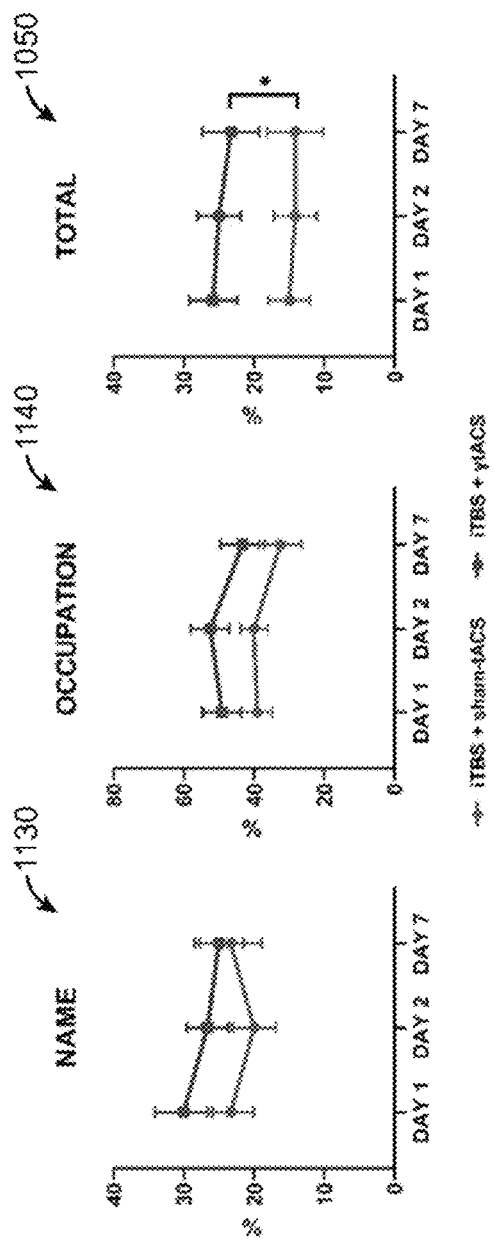
FIG. 11A
FIG. 11B

SYSTEMS AND METHODS TO ENHANCE MEMORY USING NON-INVASIVE BRAIN STIMULATION

CROSS-REFERENCE TO RELATED APPLICATIONS

This application is a Continuation of International Application No. PCT/US2023/069421, filed Jun. 29, 2023, entitled, "SYSTEMS AND METHODS TO CHARACTERIZE INDIVIDUAL RESPONSE TO BRAIN PERTURBATION IN PATIENTS WITH ALZHEIMER'S DISEASE," which claims the benefit under 35 U.S.C. § 119(e) of U.S. Provisional Patent Application Ser. No. 63/356,609, filed Jun. 29, 2022, and entitled, "SYSTEMS AND METHODS TO CHARACTERIZE INDIVIDUAL RESPONSE TO BRAIN PERTURBATION IN PATIENTS WITH ALZHEIMER'S DISEASE", the entire contents of each of which is incorporated herein by reference.

FIELD OF THE INVENTION

This disclosure relates to techniques for enhancing memory using non-invasive brain stimulation.

BACKGROUND

Alzheimer's disease (AD) is one of the most devastating conditions affecting elderly individuals in Western World populations. It is considered as one of the most serious medical, economic, and social emergencies faced by our society today and, even more extensively, over the next decades. Currently, there are no effective treatments, and patients diagnosed with AD face an uncertain future, caused by the current inability to predict the course of the disease.

In recent years, a growing body of evidence supported the concept that loss of synaptic density could be an early event and precede neuronal degeneration, suggesting that the impairment of synaptic mechanisms plays a key role in the pathogenesis of AD. These altered synaptic mechanisms have been related to spine shrinkage, neuronal network disarrangement and cell death. Synaptic dysfunction represents a key driver of Alzheimer's disease which eventually results in dysfunction of brain functional networks and cognitive decline, making it a promising therapeutic target. However, there is a lack of validated biomarkers to measure synaptic dysfunction in AD.

SUMMARY

Here are described systems and methods for conducting a stress test on the brain, given the notion from physics and biology that complex systems, such as the human brain, are better characterized by looking at their response to external perturbation rather than via their spontaneous activity. Some aspects of the present disclosure combine hardware and software, and are optimized for use in patients with neurodegenerative disorders, in particular patients with Alzheimer's disease and dementia more in general.

Methods combine data collection methods to capture brain activity before, during, and after a perturbation, allowing to record individual response to said perturbation and therefore reflecting unique characteristics of each individual brain. The nature of the perturbation can vary depending on the target response or brain system. Methods concern concepts and principles from neurophysiology, neurology, neuroscience, cell biology, including but not limited to brain plasticity, Hebbian plasticity, excitation-inhibition balance, network complexity, connectomics, network resilience, structural and functional brain network analysis. Systems and methods have a particular application in the field of neurodegeneration, physiological and pathological aging, dementia and Alzheimer's Disease in particular, for applications including but not limited to the identification of patients and the prediction of response to a treatment.

The brain might be conceived as a complex dynamic system of organized distributed neural networks with specific spatio-temporal properties. The complex geometry of brain structural and functional connections (the so-called brain connectome) explains individual differences in cognitive performance, vulnerability to neurological and psychiatric conditions, as well as trajectories of healthy aging. Neuroimaging and electrophysiology methods are sometimes used to characterize such complexity, looking at brain anatomy and spontaneous functional properties of brain activity collected at rest. In limited cases, cognitive or behavioral stimuli are presented to elicit transitory changes in brain activity possibly relevant when quantifying cognitive performance, for instance during a memory task. However, these methods have multiple limitations, for instance (i) they require active collaboration from the subject undergoing the assessment (e.g., perform a memory task), which can be a limiting factor in patients with cognitive impairment; (ii) they typically rely on perturbations (e.g., cognitive or behavioral stimuli) that affect (e.g., activate or deactivate) multiple brain regions or networks of the brain (sometimes the entire brain), limiting the specificity of the conclusions drawn from the data and also preventing from assessing the brain's response to perturbation at higher spatial resolution in the range of 1 or 2 millimeters rather than centimeters, which is often necessary when investigating the brain of patients with conditions affecting a specific region or network of the brain; finally, (iii) the nature of the stimuli typically does not allow to engage specific classes of neurons in the brain, or induce a controlled sustained activation or deactivation by directly inducing neuronal activity (instead of indirectly promoting neuronal activity by displaying a stimuli on a screen), which may be important when investigating aspects of the brain of patients with brain alterations related to a specific type of neurons, neurotransmitter or cortical circuitry. These aspects may be important when investigating brain alterations in patients with dementia, and Alzheimer's disease in particular. Patients with AD display altered synaptic activity in specific brain networks (including the default mode network—DMN), specific regions (including the precuneus, angular gyri, frontal medial cortex, hippocampus and temporal lobe), and specific classes of neurons (including parvalbumin positive interneurons) and neurotransmitters (including GABA and Glutamate). Although several AD biomarkers are widely applied and considered useful for diagnosis, sufficient accuracy is still lacking to evaluate disease severity and predict disease progression. Few imaging biomarkers have been developed to specifically evaluate synaptic dysfunction. One emerging method to detect synaptic loss in neurodegenerative dementias is based on PET tracers targeting synaptic vesicle protein. However, this approach is supported by limited scientific evidence as well as by the complexity of PET procedures, high costs and the need for patient's exposure to radioactive tracers. In this context, a novel approach that combines neuroimaging and electrophysiology methods to measure synaptic and network dysfunction in patients with AD may, at least in part, address some of the challenges with the existing approaches described above.

For at least these reasons, the inventors have created a system and methods where perturbation is induced via electrical or magnetic stimulation of the brain of patients with AD, and characteristics of the individual response from each patient are collected, analyzed, and summarized in metrics and indexes with diagnostic and prognostic value. Each response is captured at high spatial (i.e., 1 cubic millimeter) and temporal resolution (i.e., at least 1 millisecond) and represents the brain's response to focused electromagnetic perturbation.

The disclosure also relates to following numbered clauses:

Clause 1. A method of non-invasively assessing synaptic dysfunction in a patient with Alzheimer's Disease, the method comprising:
applying transcranial magnetic stimulation (TMS) to at least one brain region of the patient; recording, with a plurality of electroencephalography (EEG) electrodes, a plurality of TMS evoked potentials in response to applying the TMS to the at least one brain region of the patient; analyzing at least one characteristic of the plurality of TMS evoked potentials to assess synaptic dysfunction in the patient; and outputting an indication of the synaptic dysfunction assessment of the patient.

Clause 2. The method of clause 1, wherein applying TMS to at least one brain region of the patient comprises applying single-pulse TMS to the at least one brain region.

Clause 3. The method of clause 1 or 2, wherein applying TMS to at least one brain region of the patient comprises applying repetitive TMS to the at least one brain region.

Clause 4. The method of any one of clauses 1 to 3, wherein applying TMS to at least one brain region of the patient comprises applying TMS at multiple frequencies simultaneously.

Clause 5. The method of any one of clauses 1 to 4, wherein applying TMS to at least one brain region of the patient comprises applying patterned bursts of TMS to the at least one brain region.

Clause 6. The method of clause 5, wherein the patterned bursts of TMS comprise a continuous or intermittent theta burst pattern.

Clause 7. The method of any one of clauses 1 to 6, wherein applying TMS to at least one brain region of the patient comprises applying TMS to a single brain region.

Clause 8. The method of any one of clauses 1 to 7, wherein applying TMS to at least one brain region of the patient comprises applying TMS to multiple distinct brain regions.

Clause 9. The method of clause 8, wherein the multiple distinct brain regions are two or more nodes of a same brain network.

Clause 10. The method of clause 9, wherein the brain network is a long-term memory network.

Clause 11. The method of clause 9 or 10, wherein the brain network is a default mode network.

Clause 12. The method of any one of clauses 9 to 11, wherein the brain network is a front-parietal network.

Clause 13. The method of any one of clauses 1 to 12, wherein the at least one brain region includes at least one brain region in a temporal lobe of the patient's brain.

Clause 14. The method of any one of clauses 1 to 13, wherein the at least one brain region includes a precuneus region.

Clause 15. The method of any one of clauses 1 to 15, further comprising determining a location of the at least one brain region to apply the TMS based, at least in part, on a spatial and functional search.

Clause 16. The method of any one of clauses 1 to 15, further comprising determining a location of the at least one brain region to apply the TMS based, at least in part, on magnetic resonance imaging (MRI) data associated with the patient's brain.

Clause 17. The method of clause 16, wherein determining a location of the at least one brain region to apply the TMS based, at least in part, on magnetic resonance imaging (MRI) data associated with the patient's brain comprises generating a biophysical model of brain anatomy for the patient's brain based on the MRI data and determining the location based, at least in part, on the generated biophysical model.

Clause 18. The method of any one of clauses 1 to 17, further comprising determining a location of the at least one brain region to apply the TMS based, at least in part, on data from a plurality of patients.

Clause 19. The method of any one of clauses 1 to 18, further comprising recording electromyography (EMG) data in response to applying the TMS to the at least one brain region of the patient, wherein the assessment of synaptic dysfunction in the patient is further based, at least in part, on at least one characteristic of the recorded EMG data Clause 20. The method of any one of clauses 1 to 19, further comprising determining a resting motor threshold (RMT) for the patient, wherein applying transcranial magnetic stimulation (TMS) to at least one brain region of the patient comprises applying TMS at an intensity based on the RMT for the patient.

Clause 21. The method of clause 20, wherein the intensity of applied TMS is set at 90% of the RMT for the patient.

Clause 22. The method of any one of clauses 9-12, wherein the brain network is an anterior salience network.

Clause 23. The method of any one of clauses 9-12 or 22, wherein the brain network is a sensorimotor network.

Clause 24. The method of any one of clauses 9-12, 22, or 23, wherein the brain network is an attention network.

Clause 25. The method of any one of clauses 1 to 24, wherein the at least one brain region is a cortical brain region connected with the hippocampus and temporal pole region of the brain via white matter fibers.

Clause 26. The method of any one of clauses 1 to 25, wherein the at least one brain region is a cortical brain region connected with regions of the default mode network via white matter fibers.

Clause 27. The method of any one of clauses 1 to 26, wherein the at least one brain region is a dorsolateral prefrontal cortex.

Clause 28. The method of any one of clauses 1 to 27, wherein the at least one brain region is a brain region with high network resilience, i.e. in the 5th percentile of brain regions ranked based on their resilience, able to maintain high levels of efficiency of network communication despite the occurrence of simulated or real lesioning.

Clause 29. The method of any one of clauses 1 to 28, wherein the at least one brain region is a brain region with relatively high network modularity where brain activity is organized in more than 2 separate networks based on functional connectivity measurements.

Clause 30. The method of any one of clauses 1 to 29, wherein the at least one brain region is a brain region or network supporting episodic memory.

Clause 31. The method of any one of clauses 1 to 30, wherein the at least one brain region is a brain region or network supporting autobiographical memory.

Clause 32. The method of any one of clauses 1 to 31, wherein the at least one brain region is a brain region or network supporting emotion processing.

Clause 33. The method of any one of clauses 1 to 32, wherein the at least one brain region is a brain region or network supporting mental rotation abilities.

Clause 34. The method of any one of clauses 1 to 33, wherein the at least one brain region is a brain region or network supporting mental planning.

Clause 35. The method of any one of clauses 1 to 34, wherein the at least one brain region is a brain region or network supporting executive functioning.

Clause 36. The method of any one of clauses 1 to 35, wherein the at least one brain region is a brain region or network with presence of amyloid-β protein.

Clause 37. The method of any one of clauses 1 to 36, wherein the at least one brain region is a brain region or network with presence of tau protein.

Clause 38. The method of any one of clauses 1 to 37, wherein the at least one brain region is a brain region or network with altered neuroinflammation levels.

Clause 39. The method of any one of clauses 1 to 38, wherein the at least one brain region is a brain region or network with altered synaptic plasticity.

Clause 40. The method of any one of clauses 1 to 39, wherein the at least one brain region is a brain region or network with hypoperfusion and hypometabolism.

Clause 41. The method of any one of clauses 1 to 40, wherein the at least one brain region is a brain region or network supporting cognitive reserve.

Clause 42. The method of any one of clauses 1 to 41, wherein the at least one brain region is a brain region or network with elevated neuroinflammation.

Clause 43. The method of any one of clauses 1 to 42, wherein the at least one brain region is a brain region or network supporting functional independence in elderly individuals.

Clause 44. The method of any one of clauses 1 to 43, wherein the at least one brain region is a brain region or network with altered oscillatory activity.

Clause 45. The method of any one of clauses 1 to 44, wherein recording a plurality of TMS evoked potentials in response to applying the TMS to the at least one brain region of the patient comprises recording at least one TMS evoked potential from the at least one brain region to which TMS is applied.

Clause 46. The method of any one of clauses 1 to 45, wherein recording a plurality of TMS evoked potentials in response to applying the TMS to the at least one brain region of the patient comprises recording at least one TMS evoked potential from one or more brain regions distinct from the at least one brain region to which TMS is applied.

Clause 47. The method of any one of clauses 1 to 46, wherein analyzing at least one characteristic of the plurality of TMS evoked potentials to assess synaptic dysfunction in the patient comprises comparing the at least one characteristic of the plurality of TMS evoked potentials to data collected from an individual without Alzheimer's Disease or previous data collected from the patient.

Clause 48. The method of any one of clauses 1 to 47, wherein analyzing at least one characteristic of the plurality of TMS evoked potentials to assess synaptic dysfunction in the patient comprises comparing the at least one characteristic of the plurality of TMS evoked potentials to data collected from a plurality of patients having Alzheimer's Disease, wherein the assessment of synaptic dysfunction comprises determining that the patient has a subtype of Alzheimer's Disease.

Clause 49. The method of any one of clauses 1 to 48, wherein the applying and recording are performed after providing the patient with a treatment for Alzheimer's Disease, and wherein analyzing at least one characteristic of the plurality of TMS evoked potentials to assess synaptic dysfunction in the patient comprises comparing the at least one characteristic of the plurality of TMS evoked potentials to data collected from the patient prior to providing the patient with the treatment for Alzheimer's Disease.

Clause 50. The method of any one of clauses 1 to 49, wherein analyzing at least one characteristic of the plurality of TMS evoked potentials to assess synaptic dysfunction in the patient comprises analyzing the plurality of TMS evoked potentials using at least one machine learning classification model.

Clause 51. The method of any one of clauses 1 to 50, wherein the at least one characteristic of the plurality of TMS evoked potentials comprises one or more of a shape, an amplitude, a phase or a timing of one or more of the plurality of TMS evoked potentials.

Clause 52. The method of any one of clauses 1 to 51, wherein analyzing at least one characteristic of the plurality of TMS evoked potentials to assess synaptic dysfunction in the patient comprises determining an amount of time for an energy level of one or more of the plurality of TMS evoked potentials to return to a baseline energy level prior to application of the TMS, wherein the assessment of synaptic dysfunction is based, at least in part, on the amount of time for the energy level of the one or more of the plurality of TMS evoked potentials to return to the baseline energy level.

Clause 53. The method of clause 52, wherein the assessment of synaptic dysfunction is further based, at least in part, on an amplitude of the one or more of the plurality of TMS evoked potentials.

Clause 54. The method of any one of clauses 1 to 53, wherein analyzing at least one characteristic of the plurality of TMS evoked potentials to assess synaptic dysfunction in the patient comprises projecting the plurality of TMS evoked potentials onto structural magnetic resonance imaging (MRI) data.

Clause 55. The method of clause 54, wherein analyzing at least one characteristic of the plurality of TMS evoked potentials to assess synaptic dysfunction in the patient further comprises extracting time series data from one or more regions of interest defined based on the structural MRI data.

Clause 56. The method of clause 55, wherein analyzing at least one characteristic of the plurality of TMS evoked potentials to assess synaptic dysfunction in the patient further comprises using the extracted time series data to evaluate a synchrony across electrodes and/or brain regions.

Clause 57. The method of any one of clauses 1 to 56, further comprising determining a treatment for the patient based, at least in part, on the assessment of synaptic dysfunction and providing the treatment to the patient.

Clause 58. The method of any one of clauses 1 to 57, wherein the assessment of synaptic dysfunction comprises an assessment of neuroinflammation, the method further comprising determining a treatment for the patient based, at least in part, on the assessment of neuroinflammation and providing the treatment to the patient.

Clause 59. The method of any one of clauses 1 to 58, wherein the assessment of synaptic dysfunction comprises an assessment of protein clearance mechanisms and cerebral protein burden, the method further comprising determining a treatment for the patient based, at least in part, on the assessment of protein clearance mechanisms and cerebral protein burden and providing the treatment to the patient.

Clause 60. The method of any one of clauses 1 to 59, wherein the assessment of synaptic dysfunction comprises an assessment of brain network dysfunction and altered connectivity patterns, the method further comprising determining a treatment for the patient based, at least in part, on the assessment of brain network dysfunction and altered connectivity patterns and providing the treatment to the patient.

Clause 61. The method of any one of clauses 1 to 60, wherein the assessment of synaptic dysfunction comprises an assessment of cortical excitability levels, the method further comprising determining a treatment for the patient based, at least in part, on the assessment of cortical excitability levels and providing the treatment to the patient.

Clause 62. The method of any one of clauses 1 to 61, wherein the assessment of synaptic dysfunction comprises an assessment of altered brain oscillatory activity, the method further comprising determining a treatment for the patient based, at least in part, on the assessment of altered brain oscillatory activity and providing the treatment to the patient.

Clause 63. The method of any one of clauses 1 to 62, wherein the perturbation of brain function is applied via a combination of TMS and tACS stimulation, the method further comprising delivering tACS to induce brain oscillatory activity in a specific frequency band delivering TMS simultaneously to tACS to assess brain plasticity and cortical excitability levels of a patient.

Clause 64. The method of clause 63, wherein the tACS perturbation is delivered in the gamma frequency band between 30 Hz and 300 Hz.

Clause 65. The method of clause 63 or 64, wherein the tACS perturbation is delivered using electrical noise stimulation with electrical patterns at a frequency between 1 Hz and 1000 Hz, based on patterns including but not limited to brown, pink, white and random noise.

Clause 66. The method of any one of clauses 1 to 65, wherein the perturbation of brain function is applied via the combination of TMS and tACS stimulation, the method further comprising delivering tACS to induce brain oscillatory activity in a specific frequency band and delivering repetitive TMS (rTMS) simultaneously to tACS to modulate brain plasticity and cortical excitability of a patient.

Clause 67. The method of clause 63, wherein the TMS perturbation is delivered in the form of theta-burst stimulation, including intermittent and continuous stimulation patterns.

Clause 68. A non-invasive brain assessment system, comprising:
a transcranial magnetic stimulation (TMS) device configured to apply TMS to at least one brain region of a patient;
a plurality of electroencephalography (EEG) electrodes configured to record a plurality of TMS evoked potentials in response to applying the TMS to the at least one brain region of the patient; and at least one computer processor programmed to analyze at least one characteristic of the plurality of TMS evoked potentials to provide an assessment of synaptic dysfunction in the patient.

Clause 69. The system of clause 68, further comprising a neuronavigation system including at least one camera, wherein the neuronavigation system is configured to facilitate positioning of the TMS device.

Clause 70. The system of clause 68 or 69, further comprising an electromyography (EMG) system configured to determine an EMG signal in response to applying the TMS to the at least one brain region of the patient.

Clause 71. The system of any one of clauses 68 to 70, wherein applying TMS to at least one brain region of the patient comprises applying single-pulse TMS to the at least one brain region.

Clause 72. The system of any one of clauses 68 to 71, wherein applying TMS to at least one brain region of the patient comprises applying repetitive TMS to the at least one brain region.

Clause 73. The system of any one of clauses 68 to 72, wherein applying TMS to at least one brain region of the patient comprises applying TMS at multiple frequencies simultaneously.

Clause 74. The system of any one of clauses 68 to 73, wherein applying TMS to at least one brain region of the patient comprises applying patterned bursts of TMS to the at least one brain region.

Clause 75. The system of clause 74, wherein the patterned bursts of TMS comprise a continuous or intermittent theta burst pattern.

Clause 76. The system of any one of clauses 68 to 75, wherein applying TMS to at least one brain region of the patient comprises applying TMS to a single brain region.

Clause 77. The system of any one of clauses 68 to 76, wherein applying TMS to at least one brain region of the patient comprises applying TMS to multiple distinct brain regions.

Clause 78. The system of clause 77, wherein the multiple distinct brain regions comprise two or more nodes of a same brain network.

Clause 79. The system of clause 78, wherein the brain network is a long-term memory network.

Clause 80. The system of clause 78 or 79, wherein the brain network is a default mode network.

Clause 81. The system of any one of clauses 78 to 80, wherein the brain network is a front-parietal network.

Clause 82. The system of any of one of clauses 68 to 81, wherein the at least one brain region includes at least one brain region in a temporal lobe of the patient's brain.

Clause 83. The system of any one of clauses 68 to 82, wherein the at least one brain region includes a precuneus region.

Clause 84. The system of any one of clauses 68 to 83, wherein the at least one computer processor is further programed to determine a location of the at least one brain region to apply the TMS based, at least in part, on a spatial and functional search.

Clause 85. The system of any one of clauses 68 to 84, wherein the at least one computer processor is further programed to determine a location of the at least one brain region to apply the TMS based, at least in part, on magnetic resonance imaging (MRI) data associated with the patient's brain.

Clause 86. The system of clause 85, wherein determining a location of the at least one brain region to apply the TMS based, at least in part, on magnetic resonance imaging (MRI) data associated with the patient's brain comprises generating a biophysical model of brain anatomy for the patient's brain based on the MRI data and determining the location based, at least in part, on the generated biophysical model.

Clause 87. The system of any one of clauses 68 to 86, wherein the at least one processor is further programed to determine a location of the at least one brain region to apply the TMS based, at least in part, on data from a plurality of patients.

Clause 88. The system of any one of clauses 70 to 87, wherein the assessment of synaptic dysfunction in the patient is further based, at least in part, on at least one characteristic of the determined EMG signal.

Clause 89. The system of any one of clause 68 to 88, wherein the at least one processor is further programed to determine a resting motor threshold (RMT) for the patient, and wherein applying transcranial magnetic stimulation (TMS) to at least one brain region of the patient comprises applying TMS at an intensity based on the RMT for the patient.

Clause 90. The method of clause 89, wherein the intensity of applied TMS is set at 90% of the RMT for the patient.

Clause 91. The system of any one of clauses 78 to 81, wherein the brain network in an anterior salience network.

Clause 92. The system of any one of clauses 78 to 81 or 91, wherein the brain network is a sensorimotor network.

Clause 93. The system of any one of clauses 78 to 81, 91, or 92, wherein the brain network is an attention network.

Clause 94. The system of any of one of clauses 68 to 93, wherein the at least one brain region is a cortical brain region connected with the hippocampus and temporal pole region of the brain via white matter fibers.

Clause 95. The system of any one of clauses 68 to 94, wherein the at least one brain region is a cortical brain region connected with regions of the default mode network via white matter fibers.

Clause 96. The system of any one of clauses 68 to 95, wherein the at least one brain region is a brain region within a dorsolateral prefrontal cortex.

Clause 97. The system of any one of clauses 68 to 96, wherein the at least one brain region is a brain region with high network resilience, i.e. in the 5th percentile of brain regions ranked based on their resilience, able to maintain high levels of efficiency of network communication despite the occurrence of simulated or real lesioning.

Clause 98. The system of any of one of clauses 68 to 97, wherein the at least one brain region is a brain region with relatively high network modularity where brain activity is organized in more than 2 separate networks based on functional connectivity measurements.

Clause 99. The system of any one of clauses 68 to 98, wherein the at least one brain region is a brain region or network supporting episodic memory.

Clause 100. The system of any one of clauses 68 to 99, wherein the at least one brain region is a brain region or network supporting autobiographical memory.

Clause 101. The system of any one of clauses 68 to 100, wherein the at least one brain region is a brain region or network supporting emotion processing.

Clause 102. The system of any one of clauses 68 to 101, wherein the at least one brain region is a brain region or network supporting mental rotation abilities.

Clause 103. The system of any one of clauses 68 to 102, wherein the at least one brain region is a brain region or network supporting mental planning.

Clause 104. The system of any one of clauses 68 to 103, wherein the at least one brain region is a brain region or network supporting executive functioning.

Clause 105. The system of any one of clauses 68 to 104, wherein the at least one brain region is a brain region or network with presence of amyloid-β protein.

Clause 106. The system of any one of clauses 68 to 105, wherein the at least one brain region is a brain region or network with presence of tau protein.

Clause 107. The system of any one of clauses 68 to 106, wherein the at least one brain region is a brain region or network with altered neuroinflammation levels.

Clause 108. The system of any one of clauses 68 to 107, wherein the at least one brain region is a brain region or network with altered synaptic plasticity.

Clause 109. The system of any one of clauses 68 to 108, wherein the at least one brain region is a brain region or network with hypoperfusion and hypometabolism.

Clause 110. The system of any one of clauses 68 to 109, wherein the at least one brain region is a brain region or network supporting cognitive reserve.

Clause 111. The system of any one of clauses 68 to 110, wherein the at least one brain region is a brain region or network with elevated neuroinflammation.

Clause 112. The system of any one of clauses 68 to 111, wherein the at least one brain region is a brain region or network supporting functional independence in elderly individuals.

Clause 113. The system of any one of clauses 68 to 112, wherein the at least one brain region is a brain region or network with altered oscillatory activity.

Clause 114. The system of any one of clauses 68 to 113, wherein recording a plurality of TMS evoked potentials in response to applying the TMS to the at least one brain region of the patient comprises recording at least one TMS evoked potential from the at least one brain region to which TMS is applied.

Clause 115. The system of any one of clauses 68 to 114, wherein recording a plurality of TMS evoked potentials in response to applying the TMS to the at least one brain region of the patient comprises recording at least one TMS evoked potential from one or more brain regions distinct from the at least one brain region to which TMS is applied.

Clause 116. The system of any one of clauses 68 to 115, wherein analyzing at least one characteristic of the plurality of TMS evoked potentials to assess synaptic dysfunction in the patient comprises comparing the at least one characteristic of the plurality of TMS evoked potentials to data collected from an individual without Alzheimer's Disease or previous data collected from the patient.

Clause 117. The system of any one of clauses 68 to 116, wherein analyzing at least one characteristic of the plurality of TMS evoked potentials to assess synaptic dysfunction in the patient comprises comparing the at least one characteristic of the plurality of TMS evoked potentials to data collected from a plurality of patients having Alzheimer's Disease, wherein the assessment of synaptic dysfunction comprises determining that the patient has a subtype of Alzheimer's Disease.

Clause 118. The system of any one of clauses 68 to 117, wherein the applying and recording are performed after providing the patient with a treatment for Alzheimer's Disease, and wherein analyzing at least one characteristic of the plurality of TMS evoked potentials to assess synaptic dysfunction in the patient comprises comparing the at least one characteristic of the plurality of TMS evoked potentials to data collected from the patient prior to providing the patient with the treatment for Alzheimer's Disease.

Clause 119. The system of any one of clauses 68 to 118, wherein analyzing at least one characteristic of the plurality of TMS evoked potentials to assess synaptic dysfunction in the patient comprises analyzing the plurality of TMS evoked potentials using at least one machine learning classification model.

Clause 120. The system of any one of clauses 68 to 119, wherein the at least one characteristic of the plurality of TMS evoked potentials comprises one or more of a shape, an amplitude, a phase or a timing of one or more of the plurality of TMS evoked potentials.

Clause 121. The system of any one of clauses 68 to 120, wherein analyzing at least one characteristic of the plurality of TMS evoked potentials to assess synaptic dysfunction in the patient comprises:
determining an amount of time for an energy level of one or more of the plurality of TMS evoked potentials to return to a baseline energy level prior to application of the TMS, wherein the assessment of synaptic dysfunction is based, at least in part, on the amount of time for the energy level of the one or more of the plurality of TMS evoked potentials to return to the baseline energy level.

Clause 122. The system of clause 121, wherein the assessment of synaptic dysfunction is further based, at least in part, on an amplitude of the one or more of the plurality of TMS evoked potentials.

Clause 123. The system of any one of clauses 68 to 122, wherein analyzing at least one characteristic of the plurality of TMS evoked potentials to assess synaptic dysfunction in the patient comprises projecting the plurality of TMS evoked potentials onto structural magnetic resonance imaging (MRI) data.

Clause 124. The system of clause 123, wherein analyzing at least one characteristic of the plurality of TMS evoked potentials to assess synaptic dysfunction in the patient further comprises extracting time series data from one or more regions of interest defined based on the structural MRI data.

Clause 125. The system of clause 123 or 124, wherein analyzing at least one characteristic of the plurality of TMS evoked potentials to assess synaptic dysfunction in the patient further comprises using the extracted time series data to evaluate a synchrony across electrodes and/or brain regions.

Clause 126. The system of any one of clauses 68 to 125, wherein the at least one computer processor is further programmed to determine a treatment for the patient based, at least in part, on the assessment of synaptic dysfunction, and the TMS device is further configured to apply TMS to at least one brain region of a patient to provide the treatment to the patient.

Clause 127. The system of any one of clauses 68 to 126, wherein the assessment of synaptic dysfunction comprises an assessment of neuroinflammation, the at least one computer processor is further programmed to determine a treatment for the patient based, at least in part, on the assessment of neuroinflammation, and the TMS device is further configured to apply TMS to at least one brain region of a patient to provide the treatment to the patient.

Clause 128. The system of any one of clauses 68 to 127, wherein the assessment of synaptic dysfunction comprises an assessment of protein clearance mechanisms and cerebral protein burden, the at least one computer processor is further programmed to determine a treatment for the patient based, at least in part, on the assessment of protein clearance mechanisms and cerebral protein burden, and the TMS device is further configured to apply TMS to at least one brain region of a patient to provide the treatment to the patient.

Clause 129. The system of any one of clauses 68 to 128, wherein the assessment of synaptic dysfunction comprises an assessment of brain network dysfunction and altered connectivity patterns, the at least one computer processor is further programmed to determine a treatment for the patient based, at least in part, on the assessment of brain network dysfunction and altered connectivity patterns, and the TMS device is further configured to apply TMS to at least one brain region of a patient to provide the treatment to the patient.

Clause 130. The system of any one of clauses 68 to 129, wherein the assessment of synaptic dysfunction comprises an assessment of cortical excitability levels, the at least one computer processor is further programmed to determine a treatment for the patient based, at least in part, on the assessment of cortical excitability levels, and the TMS device is further configured to apply TMS to at least one brain region of a patient to provide the treatment to the patient.

Clause 131. The system of any one of clauses 68 to 130, wherein the assessment of synaptic dysfunction comprises an assessment of altered brain oscillatory activity, the at least one computer processor is further programmed to determine a treatment for the patient based, at least in part, on the assessment of altered brain oscillatory activity, and the TMS device is further configured to apply TMS to at least one brain region of a patient to provide the treatment to the patient.

Clause 132. The system of any one of clauses 68 to 131, wherein the assessment of synaptic dysfunction comprises the simultaneous delivery of magnetic (TMS) and electrical stimulation, and the recording of brain activity via EEG recording, with the system comprising at least one TMS device configured to apply TMS to at least one brain region of a patient at least one electrical stimulation device to deliver transcranial electrical stimulation to at least one brain region of a patient at least one EEG device to record brain activity from scalp EEG electrodes.

Clause 133. The system of clause 132, wherein the electrical stimulation is delivered in the form of tACS.

Clause 134. The system of clause 133, wherein the tACS perturbation is delivered in the gamma frequency band between 30 Hz and 300 Hz.

Clause 135. The system of clause 133 or 134, wherein the tACS perturbation is delivered using electrical noise stimulation with electrical patterns at a frequency between 1 Hz and 1000 Hz, based on patterns including but not limited to brown, pink, white and random noise.

Clause 136. The system of any one of clauses 133 to 135, wherein the TMS perturbation is delivered in the form of theta-burst stimulation, including intermittent and continuous stimulation patterns.

Clause 137. The system of any one of clauses 133 to 136, wherein the TMS, electrical stimulation, and EEG recording, is delivered via a single device including TMS, tES and EEG capabilities.

Clause 138. A method of providing a non-invasive assessment of a brain state of a person, the method comprising:
applying non-invasive stimulation to at least one brain region of the person;
recording, using a brain activity recording device, brain signals in response to applying the non-invasive stimulation to the at least one brain region of the person;
analyzing at least one characteristic of the recorded brain signals to provide the non-invasive assessment of the brain state of the person; and outputting an indication of the non-invasive assessment of the brain state of the person.

Clause 139. The method of clause 138, wherein applying non-invasive stimulation to at least one brain region of the person comprises applying one or more of transcranial magnetic stimulation (TMS), transcranial current stimulation (tCS) or focused ultrasound stimulation (tFUS).

Clause 140. The method of clause 139, wherein applying non-invasive stimulation to at least one brain region of the person comprises applying at least two of TMS, tCS or tFUS.

Clause 141. The method of any one of clauses 138 to 140, wherein the brain activity recording device is an electroencephalography (EEG) device.

Clause 142. The method of any one of clauses 138 to 141, wherein applying TMS to at least one brain region of the patient comprises applying single-pulse TMS to the at least one brain region.

Clause 143. The method of any one of clauses 138 to 142, wherein applying TMS to at least one brain region of the patient comprises applying repetitive TMS to the at least one brain region.

Clause 144. The method of any one of clauses 138 to 143, wherein applying TMS to at least one brain region of the patient comprises applying TMS at multiple frequencies simultaneously.

Clause 145. The method of any one of clauses 138 to 144, wherein applying TMS to at least one brain region of the patient comprises applying patterned bursts of TMS to the at least one brain region.

Clause 146. The method of clause 145, wherein the patterned bursts of TMS comprise a continuous or intermittent theta burst pattern.

Clause 147. The method of any one of clauses 138 to 146, wherein applying TMS to at least one brain region of the patient comprises applying TMS to a single brain region.

Clause 148. The method of any one of clauses 138 to 147, wherein applying TMS to at least one brain region of the patient comprises applying TMS to multiple distinct brain regions.

Clause 149. The method of clause 148, wherein the multiple distinct brain regions are two or more nodes of a same brain network.

Clause 150. The method of clause 149, wherein the brain network is a long-term memory network.

Clause 151. The method of clause 149 or 150, wherein the brain network is a default mode network.

Clause 152. The method of any one of clauses 149 to 151, wherein the brain network is a front-parietal network.

Clause 153. The method of any one of clauses 138 to 152, wherein the at least one brain region includes at least one brain region in a temporal lobe of the patient's brain.

Clause 154. The method of any one of clauses 138 to 153, wherein the at least one brain region includes a precuneus region.

Clause 155. The method of any one of clauses 138 to 154, further comprising determining a location of the at least one brain region to apply the TMS based, at least in part, on a spatial and functional search.

Clause 156. The method of any one of clauses 138 to 155, further comprising determining a location of the at least one brain region to apply the TMS based, at least in part, on magnetic resonance imaging (MRI) data associated with the patient's brain.

Clause 157. The method of clause 156, wherein determining a location of the at least one brain region to apply the TMS based, at least in part, on magnetic resonance imaging (MRI) data associated with the patient's brain comprises generating a biophysical model of brain anatomy for the patient's brain based on the MRI data and determining the location based, at least in part, on the generated biophysical model.

Clause 158. The method of any one of clauses 138 to 157, further comprising determining a location of the at least one brain region to apply the TMS based, at least in part, on data from a plurality of patients.

Clause 159. The method of any one of clauses 138 to 158, further comprising recording electromyography (EMG) data in response to applying the TMS to the at least one brain region of the patient, wherein the assessment of the brain state of the person is further based, at least in part, on at least one characteristic of the recorded EMG data.

Clause 160. The method of any one of clauses 138 to 159, further comprising determining a resting motor threshold (RMT) for the patient, wherein applying transcranial magnetic stimulation (TMS) to at least one brain region of the patient comprises applying TMS at an intensity based on the RMT for the patient.

Clause 161. The method of clause 160, wherein the intensity of applied TMS is set at 90% of the RMT for the patient.

Clause 162. The method of any one of clauses 149 to 152, wherein the brain network is an anterior salience network.

Clause 163. The method of any one of clauses 149 to 152 or 162, wherein the brain network is a sensorimotor network.

Clause 164. The method of any one of clauses 149 to 152, 162, or 163, wherein the brain network is an attention network.

Clause 165. The method of any one of clauses 138 to 164, wherein the at least one brain region includes a cortical brain region connected with the hippocampus and temporal pole region of the brain via white matter fibers.

Clause 166. The method of any one of clauses 138 to 165, wherein the at least one brain region includes a cortical brain region connected with regions of the default mode network via white matter fibers.

Clause 167. The method of any one of clauses 138 to 166, wherein the at least one brain region includes a dorsolateral prefrontal cortex.

Clause 168. The method of any one of clauses 138 to 167, wherein the at least one brain region includes a brain region with relatively high network resilience, i.e. in the 5th percentile of brain regions ranked based on their resilience, able to maintain high levels of efficiency of network communication despite the occurrence of simulated or real lesioning.

Clause 169. The method of any one of clauses 138 to 168, wherein the at least one brain region includes a brain region with relatively high network modularity where brain activity is organized in more than 2 separate networks based on functional connectivity measurements.

Clause 170. The method of any one of clauses 138 to 169, wherein the at least one brain region includes a brain region or network supporting episodic memory.

Clause 171. The method of any one of clauses 138 to 170, wherein the at least one brain region includes a brain region or network supporting autobiographical memory.

Clause 172. The method of any one of clauses 138 to 171, wherein the at least one brain region includes a brain region or network supporting emotion processing.

Clause 173. The method of any one of clauses 138 to 172, wherein the at least one brain region includes a brain region or network supporting mental rotation abilities.

Clause 174. The method of any one of clauses 138 to 173, wherein the at least one brain region includes a brain region or network supporting mental planning.

Clause 175. The method of any one of clauses 138 to 174, wherein the at least one brain region includes a brain region or network supporting executive functioning.

Clause 176. The method of any one of clauses 138 to 175, wherein the at least one brain region includes a brain region or network with presence of amyloid-β protein.

Clause 177. The method of any one of clauses 138 to 176, wherein the at least one brain region includes a brain region or network with presence of tau protein.

Clause 178. The method of any one of clauses 138 to 177, wherein the at least one brain region includes a brain region or network with altered neuroinflammation levels.

Clause 179. The method of any one of clauses 138 to 178, wherein the at least one brain region includes a brain region or network with altered synaptic plasticity.

Clause 180. The method of any one of clauses 138 to 179, wherein the at least one brain region includes a brain region or network with hypoperfusion and hypometabolism.

Clause 181. The method of any one of clauses 138 to 180, wherein the at least one brain region includes a brain region or network supporting cognitive reserve.

Clause 182. The method of any one of clauses 138 to 181, wherein the at least one brain region includes a brain region or network with elevated neuroinflammation.

Clause 183. The method of any one of clauses 138 to 182, wherein the at least one brain region includes a brain region or network supporting functional independence in elderly individuals.

Clause 184. The method of any one of clauses 138 to 183, wherein the at least one brain region includes a brain region or network with altered oscillatory activity.

Clause 185. The method of any one of clauses 138 to 184, wherein recording a plurality of TMS evoked potentials in response to applying the TMS to the at least one brain region of the patient comprises recording at least one TMS evoked potential from the at least one brain region to which TMS is applied.

Clause 186. The method of any one of clauses 138 to 185, wherein recording a plurality of TMS evoked potentials in response to applying the TMS to the at least one brain region of the patient comprises recording at least one TMS evoked potential from one or more brain regions distinct from the at least one brain region to which TMS is applied.

Clause 187. The method of any one of clauses 138 to 186, wherein analyzing at least one characteristic of the plurality of TMS evoked potentials to assess synaptic dysfunction in the patient comprises analyzing the plurality of TMS evoked potentials using at least one machine learning classification model.

Clause 188. The method of any one of clauses 138 to 187, wherein the at least one characteristic of the plurality of TMS evoked potentials comprises one or more of a shape, an amplitude, a phase or a timing of one or more of the plurality of TMS evoked potentials.

Clause 189. The method of any one of clauses 138 to 188, wherein analyzing at least one characteristic of the plurality of TMS evoked potentials to assess synaptic dysfunction in the patient comprises determining an amount of time for an energy level of one or more of the plurality of TMS evoked potentials to return to a baseline energy level prior to application of the TMS, wherein the assessment of the brain state of the person is based, at least in part, on the amount of time for the energy level of the one or more of the plurality of TMS evoked potentials to return to the baseline energy level.

Clause 190. The method of clause 189, wherein assessment of the brain state of the person is further based, at least in part, on an amplitude of the one or more of the plurality of TMS evoked potentials.

Clause 191. The method of any one of clauses 138 to 190, wherein analyzing at least one characteristic of the plurality of TMS evoked potentials to assess synaptic dysfunction in the patient comprises projecting the plurality of TMS evoked potentials onto structural magnetic resonance imaging (MRI) data.

Clause 192. The method of clause 191, wherein analyzing at least one characteristic of the plurality of TMS evoked potentials to assess synaptic dysfunction in the patient further comprises extracting time series data from one or more regions of interest defined based on the structural MRI data.

Clause 193. The method of clause 192, wherein analyzing at least one characteristic of the plurality of TMS evoked potentials to assess synaptic dysfunction in the patient further comprises using the extracted time series data to evaluate a synchrony across electrodes and/or brain regions.

Clause 194. The method of any one of clauses 138 to 193, further comprising determining a treatment for the patient based, at least in part, on the assessment of the brain state of the person and providing the treatment to the patient.

Clause 195. The method of any one of clauses 138 to 194, wherein the assessment of the brain state of the person comprises an assessment of neuroinflammation, the method further comprising determining a treatment for the patient based, at least in part, on the assessment of neuroinflammation and providing the treatment to the patient.

Clause 196. The method of any one of clauses 138 to 195, wherein the assessment of the brain state of the person comprises an assessment of protein clearance mechanisms and cerebral protein burden, the method further comprising determining a treatment for the patient based, at least in part, on the assessment of protein clearance mechanisms and cerebral protein burden and providing the treatment to the patient.

Clause 197. The method of any one of clauses 138 to 196, wherein the assessment of the brain state of the person comprises an assessment of brain network dysfunction and altered connectivity patterns, the method further comprising determining a treatment for the patient based, at least in part, on the assessment of brain network dysfunction and altered connectivity patterns and providing the treatment to the patient.

Clause 198. The method of any one of clauses 138 to 197, wherein the assessment of the brain state of the person comprises an assessment of cortical excitability levels, the method further comprising determining a treatment for the patient based, at least in part, on the assessment of cortical excitability levels and providing the treatment to the patient.

Clause 199. The method of any one of clauses 138 to 198, wherein the assessment of the brain state of the person comprises an assessment of altered brain oscillatory activity, the method further comprising determining a treatment for the patient based, at least in part, on the assessment of altered brain oscillatory activity and providing the treatment to the patient.

Clause 200. A non-invasive brain state assessment system, comprising:
a non-invasive brain stimulation device configured to apply non-invasive stimulation to at least one brain region of a person;
a brain activity recording device configured to record brain signals in response to applying the non-invasive stimulation to the at least one brain region of the person; and at least one computer processor programmed to analyze at least one characteristic of the recorded brain signals to provide a non-invasive assessment of a brain state of the person.

Clause 201. The system of clause 200, further comprising a neuronavigation system including at least one camera, wherein the neuronavigation system is configured to facilitate positioning of the TMS device.

Clause 202. The system of clause 200 or 201, further comprising an electromyography (EMG) system configured to determine an EMG signal in response to applying the TMS to the at least one brain region of the patient.

Clause 203. The system of any one of clauses 200 to 202, wherein applying TMS to at least one brain region of the patient comprises applying single-pulse TMS to the at least one brain region.

Clause 204. The system of any one of clauses 200 to 203, wherein applying TMS to at least one brain region of the patient comprises applying repetitive TMS to the at least one brain region.

Clause 205. The system of any one of clauses 200 to 204, wherein applying TMS to at least one brain region of the patient comprises applying TMS at multiple frequencies simultaneously.

Clause 206. The system of any one of clauses 200 to 205, wherein applying TMS to at least one brain region of the patient comprises applying patterned bursts of TMS to the at least one brain region.

Clause 207. The system of clause 206, wherein the patterned bursts of TMS comprise a continuous or intermittent theta burst pattern.

Clause 208. The system of any one of clauses 200 to 207, wherein applying TMS to at least one brain region of the patient comprises applying TMS to a single brain region.

Clause 209. The system of any one of clauses 200 to 208, wherein applying TMS to at least one brain region of the patient comprises applying TMS to multiple distinct brain regions.

Clause 210. The system of clause 209, wherein the multiple distinct brain regions are two or more nodes of a same brain network.

Clause 211. The system of clause 210, wherein the brain network is a long-term memory network.

Clause 212. The system of clause 210 or 211, wherein the brain network is a default mode network.

Clause 213. The system of any one of clauses 210 to 212, wherein the brain network is a front-parietal network.

Clause 214. The system of any one of clauses 200 to 213, wherein the at least one brain region includes at least one brain region in a temporal lobe of the patient's brain.

Clause 215. The system of any one of clauses 200 to 214, wherein the at least one brain region includes a precuneus region.

Clause 216. The system of any one of clauses 200 to 215, wherein the at least one computer processor is further programmed to determine a location of the at least one brain region to apply the TMS based, at least in part, on a spatial and functional search.

Clause 217. The system of any one of clauses 200 to 216, wherein the at least one computer processor is further programmed to determine a location of the at least one brain region to apply the TMS based, at least in part, on magnetic resonance imaging (MRI) data associated with the patient's brain.

Clause 218. The system of clause 217, wherein determining a location of the at least one brain region to apply the TMS based, at least in part, on magnetic resonance imaging (MRI) data associated with the patient's brain comprises generating a biophysical model of brain anatomy for the patient's brain based on the MRI data and determining the location based, at least in part, on the generated biophysical model.

Clause 219. The system of any one of clauses 200 to 218, wherein the at least one computer processor is further programmed to determine a location of the at least one brain region to apply the TMS based, at least in part, on data from a plurality of patients.

Clause 220. The system of any one of clauses 202 to 219, wherein the assessment of the brain state of the person is further based, at least in part, on at least one characteristic of the EMG signal.

Clause 221. The system of any one of clauses 200 to 220, wherein the at least one computer processor is further programmed to determine a resting motor threshold (RMT) for the patient, and wherein applying transcranial magnetic stimulation (TMS) to at least one brain region of the patient comprises applying TMS at an intensity based on the RMT for the patient.

Clause 222. The system of any one of clauses 210 to 213, wherein the brain network is an anterior salience network.

Clause 223. The system of any one of clauses 210 to 213 or 222, wherein the brain network is a sensorimotor network.

Clause 224. The system of any one of clauses 210 to 213, 222, or 223, wherein the brain network is an attention network.

Clause 225. The system of any one of clauses 200 to 224, wherein the at least one brain region includes a cortical brain region connected with the hippocampus and temporal pole region of the brain via white matter fibers.

Clause 226. The system of any one of clauses 200 to 225, wherein the at least one brain region includes a cortical brain region connected with regions of the default mode network via white matter fibers.

Clause 227. The system of any one of clauses 200 to 226, wherein the at least one brain region includes a dorsolateral prefrontal cortex.

Clause 228. The system of any one of clauses 200 to 227, wherein the at least one brain region includes a brain region with relatively high network resilience, i.e. in the 5th percentile of brain regions ranked based on their resilience, able to maintain high levels of efficiency of network communication despite the occurrence of simulated or real lesioning.

Clause 229. The system of any one of clauses 200 to 228, wherein the at least one brain region includes a brain region with relatively high network modularity where brain activity is organized in more than 2 separate networks based on functional connectivity measurements.

Clause 230. The system of any one of clauses 200 to 229, wherein the at least one brain region includes a brain region or network supporting episodic memory.

Clause 231. The system of any one of clauses 200 to 230, wherein the at least one brain region includes a brain region or network supporting autobiographical memory.

Clause 232. The system of any one of clauses 200 to 231, wherein the at least one brain region includes a brain region or network supporting emotion processing.

Clause 233. The system of any one of clauses 200 to 232, wherein the at least one brain region includes a brain region or network supporting mental rotation abilities.

Clause 234. The system of any one of clauses 200 to 233, wherein the at least one brain region includes a brain region or network supporting mental planning.

Clause 235. The system of any one of clauses 200 to 234, wherein the at least one brain region includes a brain region or network supporting executive functioning.

Clause 236. The system of any one of clauses 200 to 235, wherein the at least one brain region includes a brain region or network with presence of amyloid-β protein.

Clause 237. The system of any one of clauses 200 to 236, wherein the at least one brain region includes a brain region or network with presence of tau protein.

Clause 238. The system of any one of clauses 200 to 237, wherein the at least one brain region includes a brain region or network with altered neuroinflammation levels.

Clause 239. The system of any one of clauses 200 to 238, wherein the at least one brain region includes a brain region or network with altered synaptic plasticity.

Clause 240. The system of any one of clauses 200 to 239, wherein the at least one brain region includes a brain region or network with hypoperfusion and hypometabolism.

Clause 241. The system of any one of clauses 200 to 240, wherein the at least one brain region includes a brain region or network supporting cognitive reserve.

Clause 242. The system of any one of clauses 200 to 241, wherein the at least one brain region includes a brain region or network with elevated neuroinflammation.

Clause 243. The system of any one of clauses 200 to 242, wherein the at least one brain region includes a brain region or network supporting functional independence in elderly individuals.

Clause 244. The system of any one of clauses 200 to 243, wherein the at least one brain region includes a brain region or network with altered oscillatory activity.

Clause 245. The system of any one of clauses 200 to 244, wherein the TMS, electrical stimulation, and EEG recording, is delivered via a single device including TMS, tES and EEG capabilities.

Clause 246. The system of clause 245, wherein the electrical stimulation and EEG recording is delivered via a single scalp electrode with both recording and stimulation capabilities.

Clause 247. The system of clause 246, wherein the electrode delivering electrical stimulation and recording EEG signals is part of a TMS stimulation coil.

Clause 248. The system of clause 247, wherein the TMS stimulation coil includes a figure-of-eight structure for TMS delivery capable of hosting the EEG and electrical stimulation electrodes.

Clause 249. The system of clause 248, wherein the TMS stimulation coil includes a figure-of-eight structure for TMS delivery and an additional structure capable of hosting the EEG and electrical stimulation electrodes.

Clause 250. The system of clause 249, wherein the structure capable of hosting the EEG and electrical stimulation electrodes allows for recording and stimulation from multiple brain regions and brain lobes, including but not limited to the frontal, temporal, parietal, and occipital lobes.

Clause 251. The system of clause 249, wherein the structure capable of hosting the EEG and electrical stimulation electrodes is composed of a flexible material allowing for comfortable placement of the system on the scalp of individuals with different head sizes and shapes.

Clause 252. A method of treating a patient having Alzheimer's Disease, the method comprising:
applying transcranial magnetic stimulation (TMS) to at least one brain region of the patient; recording, with a plurality of electroencephalography (EEG) electrodes, a plurality of TMS evoked potentials in response to applying the TMS to the at least one brain region of the patient; determining a treatment for the patient based, at least in part, on an analysis of at least one characteristic of the plurality of TMS evoked potentials; and administering the treatment to the patient.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the present disclosure are set forth with particularity in the appended claims. A better understanding of the features and advantages of the present disclosure will be obtained by reference to the following detailed description that sets forth illustrative embodiments, in which the principles of the present disclosure are utilized, and the accompanying drawings (also "Figure" and "FIG." herein), of which:

FIGS. 1A-1F illustrate non-limiting examples of perturbation-based assessment of brain dynamics;

FIG. 5 shows graphical analysis of the linear relation between the natural frequency of L-DLPFC (x-axis) and the clinical scores change after 24 weeks (y-axis);

FIGS. 9A-9B illustrate experimental set ups for assessing the effects of TMS on long term associate memory;

FIG. 11A shows graphical analysis for immediate FNAT and delayed FNAT testing;

FIG. 11B shows graphical analysis for delayed FNAT after 1 day, 2 days, and 7 days;

DETAILED DESCRIPTION

Figure 2A:
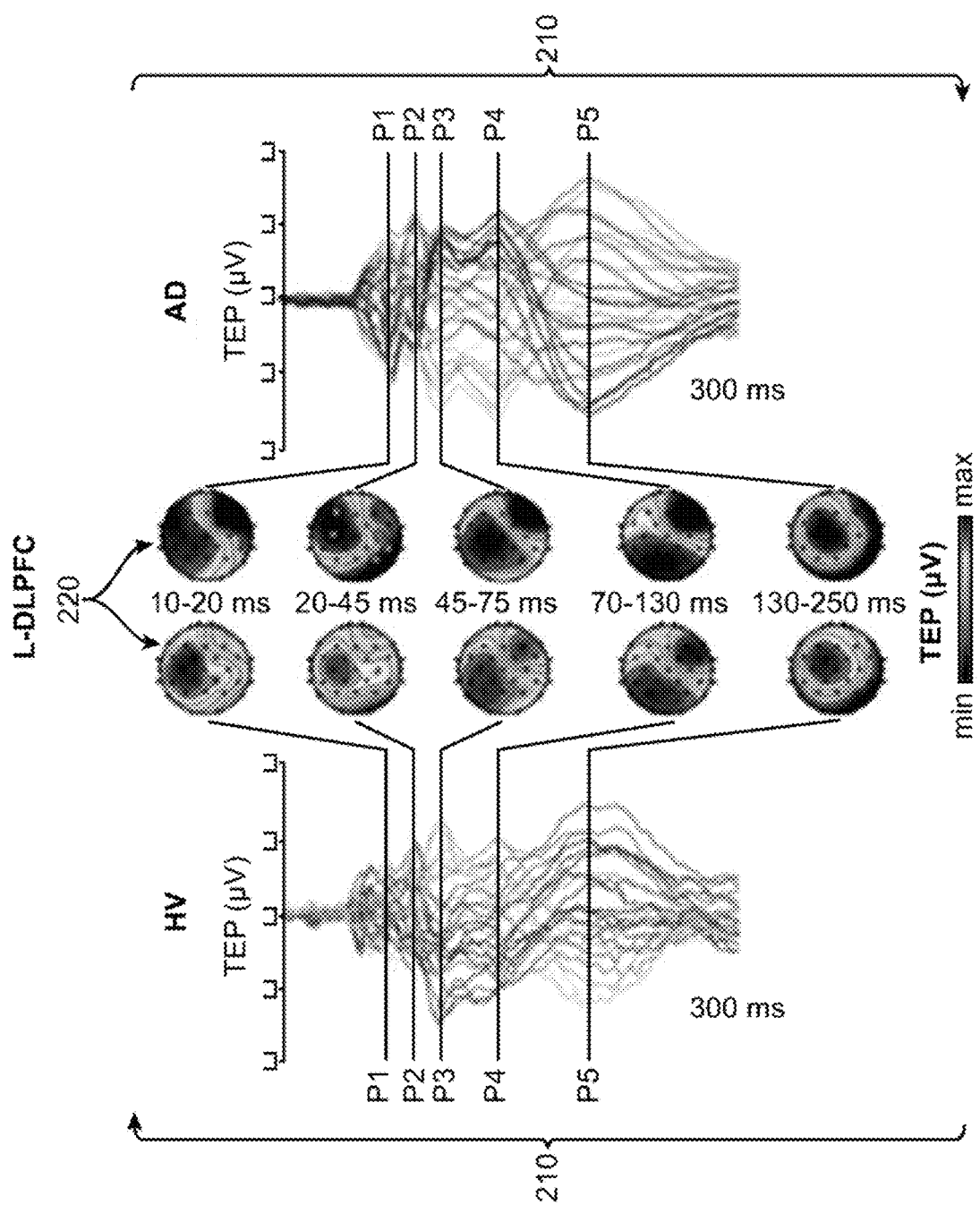
FIG. 2A illustrates a spatio-temporal reconstruction of TEPs recorded over all the scalp after stimulation of L-DLPFC.

While various embodiments of the present disclosure have been shown and described herein, it will be obvious to those skilled in the art that such embodiments are provided by way of example only. Numerous variations, changes, and substitutions may occur to those skilled in the art without departing from the scope of the present disclosure. It should be understood that various alternatives to the embodiments described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

Certain inventive embodiments herein contemplate numerical ranges. When ranges are present, the ranges include the range endpoints. Additionally, every sub range and value within the range is present as if explicitly written out. The term "about" or "approximately" may mean within an acceptable error range for the particular value, which will depend in part on how the value is measured or determined, e.g., the limitations of the measurement system. For example, "about" may mean within 1 or more than 1 standard deviation, per the practice in the art. Alternatively, "about" may mean a range of up to 20%, up to 10%, up to 5%, or up to 1% of a given value. Where particular values are described in the application and claims, unless otherwise stated the term "about" meaning within an acceptable error range for the particular value may be assumed.

The inventors have recognized that complex network dynamics characterizing the human brain may be effectively captured by applying a controlled perturbation and modeling resulting activity. This has relevance in the field of neurodegenerative disorders, where alterations of brain dynamics are difficult to detect in the preclinical stages of diseases such as Alzheimer's disease, and where those alterations have been hypothesized to be present years, if not decades, before clinical symptoms arise. To this end, some embodiments relate to identifying a location or multiple locations in a brain of a subject to which non-invasive perturbation is to be provided. Some embodiments relate to how to quantify the effect of perturbation via methods from electrophysiology including, but not limited to, electroencephalography (EEG) and electromyography (EMG).

Several studies using EEG to explore the dynamics of cerebral activity during various cognitive activities have unveiled correlations between activity in specific frequency bands and cognitive functions. Furthermore, more recent studies suggest that electrophysiological features measured using EEG may serve as endophenotypes of psychiatric and neurological disease in both human and rodent models. However, one of the limitations of EEG can be that it passively records brain activity, and thus the inferences that can be drawn about brain dynamics may purely be correlational. Furthermore, critical and fundamental brain properties such as plasticity—the ability to change in response to changing environmental and systemic needs or stressors—may be difficult to be assessed.

In contrast to EEG, Non-invasive Brain Stimulation (NiBS) techniques such as Transcranial Magnetic Stimulation (TMS) utilize electromagnetic principles to noninvasively modulate brain function by inducing an electric field in a target cortical area. TMS can be used to directly activate a brain region, without mediation by sensory or cognitive pathways, and can thus assess the functional integrity of cortical circuits within the stimulated region. Applying TMS to neurons in the motor cortex results in motor evoked potentials (MEP) that can be measured via EMG. When applied in pairs of pulses, TMS engages intracortical GABAergic and glutaminergic circuits and can be used to assess the balance of excitation and inhibition in vivo. Simultaneous TMS and EEG monitoring (TMS-EEG) may enable direct measurements of the cerebral response to TMS and can thus assess cerebral reactivity. TMS-EEG studies have shown that TMS produces waves of activity that are reproducible and reliable, and that reverberate throughout the cortex with distinct frequency responses as a function of stimulation site. Furthermore, the evoked activity varies as a function of cognitive task engagement and is altered by interventions that change task performance. As such, TMS-evoked potentials (TEP) can be used to assess cortical network properties in health and disease. Furthermore, TEP can be used to assess the integrity of different excitatory and inhibitory circuits and detect alterations in cortical excitation/inhibition balance in disease states.

Notably, TMS-EEG can identify abnormalities in cerebral reactivity for an individual even when the individual's routine EEG appears normal. The use of perturbation-based paradigms to amplify the information available during scalp EEG recording has been successfully tested using single pulse TMS, reinforcing the idea that brain responses to an external perturbation might carry more information about system dynamics than canonical resting or task-induced evoked activity. In addition to measuring brain reactivity and connectivity, TMS can also be used to assess the efficacy of the mechanisms of brain plasticity. When applied in trains of repetitive TMS pulses at a fixed frequency or in specific patterns based on experimental synaptic plasticity induction protocols, repetitive TMS can produce changes in cortical reactivity (as measured via MEP or TEP) that outlast the duration of stimulation. Such TMS protocols are thought to achieve their effects via synaptic plasticity mechanisms and produce widespread changes in the topological structure of brain connectivity as measured via EEG and fMRI. Such TMS measures have provided evidence of abnormal mechanisms of plasticity in diseases such as AD. Thus, real time integration of TMS with EEG can overcome at least some of the above-mentioned fundamental limitations of conventional EEG analysis and enables the study of causal implications. Furthermore, the same TMS and TMS-EEG protocols can be applied in both humans and animal models, promoting translational efforts.

Similar to TMS, Transcranial current stimulation (tCS) is a form of non-invasive brain stimulation (NIBS) that uses electrodes placed on the scalp to deliver weak electrical currents to the brain. tCS can be used to stimulate or inhibit one or more target brain region(s). tCS may include a family of related non-invasive techniques such as transcranial direct stimulation (tDCS), transcranial alternating stimulation (tACS), transcranial random noise current stimulation (tRNS), and more complex forms of stimulation that may be used to stimulate a region of an individual's brain in accordance with the systems and methods described herein.

Combining TMS and tCS with EEG recording, in accordance with some embodiments of the systems and methods described herein, might lead to fast, highly sensitive and easy to handle clinical tests, which can be applied to vast pathological and non-pathological populations. In particular, patients with dementia, and Alzheimer's Disease in particular, display alteration of cortical brain dynamics captured by EEG and may be potentially better characterized by combined approaches leveraging controlled perturbation of the brain. Patients with dementia can also display alterations of mechanisms of plasticity, altered excitation/inhibition balance and GABA-ergic dysfunction, and changes of brain connectivity dynamics.

Notably, subclinical manifestation of such alterations is likely present in the general population as well and in subjects at risk of developing dementia. The systems and methods can also be used to assess brain health, identifying individual deviations from a normative dataset and informing interventions to preserve cognitive function, help slow disease onset and disease progression.

The systems and methods described herein have applicability in the diagnosis, monitoring and prediction of disease course in patients with dementia and AD in particular. The system and methods include the combination of multiple approaches to brain perturbation, brain recording, and data analysis.

In some embodiments, perturbation can be delivered via noninvasive brain stimulation techniques such as transcranial magnetic stimulation or transcranial electrical stimulation.

In some embodiments, transcranial direct stimulation (tDCS), transcranial alternating stimulation (tACS) or transcranial random noise current stimulation (tRNS) are used as a perturbation approach.

In some embodiments, determination of a perturbation target may be performed using a brain scan of a subject, including but not limited to data obtained via Magnetic Resonance Imaging (MRI) and Positron Emission Tomography (PET).

In some embodiments, determination of a perturbation target may be performed using electrophysiology data collected from a subject, including but not limited to data obtained via Electroencephalography (EEG), electromyography (EMG) and Magnetoencephalography (MEG).

In some embodiments, determination of a perturbation target may be performed without using brain scans of a subject and may be based on a normative database of healthy individuals or pathology-specific data as in the case of Alzheimer's disease data.

In some embodiments, perturbation is delivered to assess the integrity of brain networks, including the resilience of brain systems to perturbation and their ability to adapt to said perturbation by rearranging their structural and functional connections.

In some embodiments, perturbation is delivered to a single brain region, network or system, to assess brain's level of excitability and response to stimulation.

In some embodiments, perturbation is delivered to multiple brain regions, networks or systems, either simultaneously or in a predefined sequence, to assess the integrity of brain connections and their ability to adapt to perturbation.

In some embodiments, response to perturbation is measured during perturbation itself, while in other embodiments a comparison between brain activity monitored before and after perturbation is performed.

In some embodiments, the impact of perturbation is quantified via the analysis of performance change at a cognitive task administered via tablet/phone/computer before, and/or during and/or after said brain perturbation.

In some embodiments, perturbation is delivered during a particular brain state, for example, to either stabilize brain dynamics or to elicit a specific response related to the specific brain state. Brain states include but are not limited to: high cognitive load states such as those observed while performing a working memory or an abstract reasoning task, sensory stimulation, and sleep.

In some embodiments, the methods involve obtaining or developing a map comprising locations in the brain where waste protein deposits generally occur in patients with neurodegenerative disorders and Alzheimer's disease more specifically, and then using a NIBS targeted to the locations.

In some embodiments, after identifying a perturbation target, further refinement of the stimulation location may be achieved using perturbation-based functional mapping of the brain region. For instance, stimulation may sequentially be provided to a plurality of locations within the identified target and evoked responses to the stimulation may be sensed using, for example, electroencephalography (EEG) or another suitable sensing technique. A further personalized perturbation target may be selected based, at least in part, on an analysis of the evoked responses to the stimulation.

In some embodiments, the intensity or amplitude of stimulation may be selected by adjusting a baseline intensity of stimulation determined using other techniques. For instance, a patient's resting motor threshold may be used to establish a baseline stimulation intensity and the baseline stimulation intensity may be refined based, at least in part, on one or more characteristic of evoked responses sensed during perturbation-based functional mapping as described herein.

In some embodiments, the systems and methods can be used to aid the diagnosis and/or prognosis of a neurological or psychiatric condition, with relevance for neurodegenerative disorders such as Mild Cognitive Impairments (MCI) and Alzheimer's Disease.

In some embodiments, the systems and methods can be used to track brain health in patient with a diagnosis of dementia, including but not limited to Mild Cognitive Impairments (MCI) and Alzheimer's Disease.

In some embodiments, the systems and methods can be used to track brain health in a subject at risk of developing dementia, including but not limited to Mild Cognitive Impairments (MCI) and Alzheimer's Disease.

In some embodiments, data collected before, during and after perturbation is analyzed using machine learning (ML) and artificial intelligence (AI) for detection of individual response to perturbation, to classify individuals based on their response, to identify predictors of response to a treatment or to identify the natural course of a disease. ML includes using one or more models leveraging a regression model, a neural network, a regularization model such as LASSO, a decision tree, a Bayesian model, a generic clustering model, an associative model, a deep learning model, a dimensionality reduction model (such as ICA and PCA), a multilayer perceptron. In some embodiments, the machine learning model includes a neural network.

Example System Components

In some embodiments, the System has multiple modules, including but not limited to:
(i) A Non-invasive brain stimulation device configured to deliver single pulse and/or repetitive Transcranial Magnetic Stimulation (TMS) protocols, transcranial current stimulation (tCS) and/or focused ultrasound stimulation (tFUS);
(ii) A brain activity recording device, such as an EEG system, configured to define personalized levels of stimulation and monitor brain activity in response to perturbation;
(iii) A neuronavigation system equipped with an infrared camera allowing to ensure individualized positioning of the non-invasive brain stimulation device;
(iv) An electromyography (EMG) system configured to determine response to perturbation in the sensorimotor system; and
(v) A software platform (e.g., implemented using one or more programmed computer processors) for data analysis and storage.

Noninvasive Brain Stimulation

Non-invasive brain stimulation (NIBS) is a class of methods used to alter brain electrical signaling at local level. Induced local alterations in signaling can result in broader alterations to neuronal signaling throughout the brain, involving brain networks. These network-wide effects of non-invasive brain stimulation reflect the brain effects of stimulation as well as the network rebound response to a burst of activity entering the system. NIBS methods include Transcranial Magnetic Stimulation (TMS), transcranial current stimulation (tCS), and transcranial focused ultrasound stimulation (tFUS).

TMS is a non-invasive brain stimulation method which employs a magnetic field generator applied near the head to locally stimulate an electrical current within the brain. In some embodiments, TMS includes repetitive transcranial magnetic stimulation or rTMS. Treatment with rTMS typically includes multiple sessions (either daily across days or multiple times per day and across days) during which TMS is delivered repetitively in a pattern that is intended to induce plasticity (e.g., defined as a change in brain activity). rTMS can be delivered as a high-frequency protocol, involving stimulation at >5 Hz, or as a low frequency protocol, involving stimulation at <1 Hz. rTMS can also be delivered with more than one frequency simultaneously. rTMS can also deliver patterned bursts of TMS, as in the case of theta-burst rTMS protocols, involving stimulation with either a continuous or intermittent theta burst pattern.

tCS includes methods where intensity, frequency, amplitude, and phase of an electrical stimulation signal are manipulated to modify brain activity. Examples of tCS methods include transcranial direct current stimulation (tDCS), a non-invasive brain stimulation technique where low levels of constant current are delivered to specific areas of the brain via electrodes positioned on and about the head to modulate neural activity in the targeted brain tissue. This technique can promote modulation of, for example, spontaneous brain activity, neurotransmitters' dynamics, or blood flow characteristics.

Transcranial alternating current stimulation (tACS) is a non-invasive brain stimulation technique where a small, pulsed, alternating current is delivered to specific areas of the brain via electrodes positioned on and about the head to modulate neural activity in the targeted brain tissue. tACS allows for frequency-specific stimulation of brain tissues, inducing a resonant effect used to entrain neuronal activity and guide brain activity within specific frequency bands (e.g., alpha, gamma, beta).

Transcranial Random Noise Stimulation (tRNS) is a non-invasive brain stimulation technique where a small current having a frequency content of white, brown or pink noise is delivered to specific areas of the brain via electrodes positioned on and about the head to modulate neural activity in the targeted brain tissue. tRNS allows for stochastic resonance-like effects, decreasing signal to noise ratio in brain systems and therefore exerting an effect on spontaneous synchronization of brain activity and the likelihood of response to perturbation.

Focused ultrasound stimulation (fUJS) is a non-invasive brain stimulation technique involving the delivery of acoustic pressure waves to specific and potentially deep areas of the brain, to modulate neural activity.

Example Hardware

A description of some components of an example system for Perturbation-based biomarkers data collection based on TMS or tCS perturbation is provided below.

TMS device. The device includes (i) a metallic case hosting set of capacitors for charge accumulation and delivery of energy into (ii) a stimulation coil configured to be positioned on the scalp, (iii) a LED display to visualize stimulation parameters. The coil may be equipped with buttons to regulate stimulation intensity and to deliver TMS pulses without having to interact with the LED display directly therefore ensuring maximal accuracy during treatment delivery.

EEG. The EEG system may be configured to record EEG activity from the scalp with an EEG amplifier. The EEG signals continuously recorded from multiple scalp sites may be positioned according to the 10-20 International System, using Ag/AgCl pellet electrodes mounted on elastic cap. The EEG signals may be digitized at a sampling rate of 5 kHz. Skin/electrode impedance may be maintained below 5 kΩ. Horizontal and vertical eye movements may be detected by recording the electrooculogram (EOG) to reject portions of the EEG signals with ocular artifacts. TMS-EEG data may be pre-processed offline with algorithms included as part of a cloud-based software platform. Physiological and TMS-related artefactual components may be detected using independent component analysis and removed based on their scalp distribution, frequency, timing and amplitude.

EMG. Electromyography data may be used in combination with TMS and neuronavigation to collect motor-evoked potentials after each TMS pulse and to estimate the resting motor threshold (RMT) used to set stimulation intensity for personalized perturbation. The EMG device may have up to 16 bipolar channels and be connected to a monitor for data visualization.

Neuronavigation. The neuronavigation system may be configured to enable precise positioning of the magnetic coil over the region to be stimulated in the brain. For example, the neuronavigation system may be used to monitor (e.g., constantly monitor) TMS coil position using an infrared camera capturing the activity of magnetic trackers placed on the TMS coil and the head of the patient. The neuronavigation system may be configured to provide high precision in positioning the TMS coil over a specified target based on a brain scan.

Perturbation Approaches

The method includes, but is not limited to, solutions where a perturbation is delivered to one brain region at the time, where multiple perturbations are delivered to a single brain region to assess dynamic brain response, or where perturbation is delivered over multiple brain regions either simultaneously or in a predefined sequence to investigate network-level rearrangements of brain dynamics. The method includes, but is not limited to, solutions where the effect of the perturbation are measured via electrophysiological approaches such as, but not limited to, EEG or EMG.

FIGS. 1A-1F illustrates perturbation-based assessment of brain dynamics in accordance with some embodiments. Different brain stimulation approaches can be used to perturb brain activity and record responses dependent on individual differences in brain anatomy and function. FIG. 1A shows an example approach that involves measuring activity 100 (as in the case of EEG using noninvasive electrodes 101 placed on the scalp), delivering a perturbation 102 (e.g., electro-magnetic as in the case of TMS) and measuring activity 100 in multiple regions of the brain 103 looking, for instance, at an increase in activity following stimulation or an increase in synchronicity between two or more regions or networks 104. The effects of the electro-magnetic perturbation 102 approach on local-global connectivity 104 are illustrated in FIG. 1B. The effects of the electro-magnetic perturbation 102 approach on temporal decay of stimulation effects are illustrated in FIG. 1C. The effects of the electro-magnetic perturbation 102 approach on plasticity of specific brain connections are illustrated in FIG. 1D. The effects of the electro-magnetic perturbation approach on brain robustness are illustrated in FIG. 1E. The effects of the electro-magnetic perturbation approach on information propagation pathways are illustrated in FIG. 1F.

Stimulation Modalities

Single Perturbation

In some embodiments, a controlled perturbation 102 is applied to a single region, and a response is measured via electrodes 101 placed on the scalp (EEG) or on another portion of the body (EMG). Perturbation 102 can have various intensity levels based on a subject brain state, including but not limited to levels of cortical excitability, plasticity, inhibition, excitation, oscillatory activity, connectivity and reactivity. Response 100 to perturbation 102 can be measured via EMG, looking at longitudinal changes in local excitability of a targeted brain system over time after perturbation 102, as a measure of cortical plasticity. Response 100 to perturbation 102 can be measured via EEG 101, looking at (a) local responses expressed as, but not limited to, the amplitude, number, frequency and timing of so called TMS-evoked potentials measured in the brain region being stimulated; a (b) distant response can also be measured using the same or similar metrics computed from distant brain regions, looking at EEG electrodes or the induced amount of current generated in the brain; a (c) change in interregional dynamics including or not the brain region receiving stimulation, with these measures including but not being limited to correlation, connectivity, effective connectivity, dynamic connectivity, graph-theory measures of nodal interactions; or (d) change in whole brain complexity including mathematical indexes expressing the global response to an external perturbation.

Dual Co-Localized Perturbation

In some embodiments, a sequence of at least two controlled perturbations 102 is repeated over a single region 103, and a response is measured via electrodes 101 placed on the scalp (EEG) or on another portion of the body (EMG).

Dual Site Perturbation

In some embodiments, a sequence of at least two controlled perturbations 102 is repeated over multiple distinct brain regions 103, and a response 100 is measured via electrodes 101 placed on the scalp (EEG) or on another portion of the body (EMG).

Response to perturbation 102 can be measured via EMG, looking at longitudinal changes in local excitability within a targeted brain system over time after perturbation, as a measure of cortical plasticity. The cortico-cortical paired associative stimulation protocol (cc-PAS) is a dual site TMS protocol able to promote Hebbian spike-timing-dependent plasticity (STDP). The cc-PAS protocol mimics the neuronal pre- and post-synaptic coupling pattern that induce the STDP, via a series TMS pairs on two interconnected areas with a specific inter-stimulus interval (ISI).

Multimodal Perturbation

In some embodiments, a combination of two or more types of stimulation can be used to maximize the impact of TMS or tCS on the brain, thereby reducing noise in brain activity data. Oscillatory electrical stimulation (e.g., transcranial alternating current stimulation—tACS) can be used to regulate oscillatory activity in the target region/network before or during the application of TMS. For instance, application of 20 Hz tACS over the precuneus brain region can act as a stabilizer of spontaneous brain activity, for the subsequent delivery of TMS pulses synchronized with the peak of each 20 Hz oscillatory cycle. In some embodiments, tACS can be applied before the application of TMS to modulate brain oscillatory activity, for instance by driving the brain of an individual oscillating at 18.5 Hz towards a stable oscillatory patterns at 21 Hz; TMS is subsequently delivered over the same region stimulated by tACS to augment the effect of tACS, or to generate brain plasticity and crystallize changes in oscillatory activity induced by tACS.

Perturbation Stimuli

Perturbation 102 may be applied in many forms, including but not limited to (i) a single pulse, (ii) a train of pulses spaced by a fix interval or a variable jitter, (iii) a continuous waveform characterized by a given amplitude, frequency (or combination of frequencies) and duration, (iv) a continuous electrical field with a given polarity, amplitude and duration, or (v) a signal composed by noise pulsed at a specific frequency.

Target Selection Approaches

In some embodiments, perturbation 102 is delivered to one or multiple brain regions 103 identified on the basis of brain scans and electrophysiology data. These sources of information to define optimal perturbation targets can represent population-level data and/or individual data. The data may be organized so that local and distributed brain activity can be summarized in quantifiable metrics; characteristics of brain activity may be extracted, measuring features related to, but not limited to, (a) metabolic and vascular activity, (b) oscillatory activity within known frequency bands, (c) network resilience measures, (d) dynamic connectivity, (e) protein accumulation maps obtained via PET imaging.

In some embodiments, perturbation 102 is delivered to a brain region 103 that is determined to be a node based on a degree of connections 104 between the node and the rest of the brain, to (i) assess the integrity of the brain connectome or (ii) induce a widespread response in local and distant brain regions as a measure of brain integrity and connectedness, as illustrated in FIG. 1B. The degree of connectivity 104 may be estimated via functional imaging data or EEG as in the case of Functional Connectivity, or via anatomical and diffusion MRI scans in the case of Structural Connectivity. In the latter, the physical connection between two or more regions may be estimated by looking at the characteristics of white matter fibers (e.g., diameter, anisotropy, diffusivity) composing specific white matter tracts in the brain. In an example scenario, a TMS or tCS stimulation target is defined by examining the structural connectivity of many brain regions and then selecting the region with the most connections with the rest of the brain, with the goal of maximizing signal propagation and overall stimulation effects. The same analysis can be done to identify a brain target with strong structural connectivity with a subcortical brain region not reachable via TMS or tCS (for instance, the hippocampus); stimulation of an accessible grey matter area with strong structural connections with the hippocampus maximizes the probability of indirectly activating the hippocampus as well.

In some embodiments, perturbation is delivered to two or more nodes of the same brain network, to assess the integrity of connectivity within a given brain network, as in the case of the Default Mode Network in patients with Alzheimer's disease. Perturbation targets within the brain network may be identified via analysis of brain scans (e.g., functional MRI) or electrophysiology data (e.g., EEG data).

In some embodiments, perturbation is delivered to a node with demonstrated relevance for the pathophysiology of a given disease; for instance, the precuneus region can be targeted for its demonstrated decay of functional connectivity in Alzheimer's Disease, as measured using functional magnetic resonance imaging (fMRI); regions of the temporal lobe affected by waste proteins in Alzheimer's Disease can be a stimulation target, with particular emphasis on amyloid-p and p-tau protein; regions displaying altered level of neuroinflammation as measured via, for instance, by diffusion MRI.

In some embodiments, selection of perturbation targets is based on estimates of the induced electrical field elicited in a candidate brain region extracted from biophysical modeling of passive tissue conductivity. A model may be created by simulating the propagation of magnetic and electric energy across head and brain tissues (e.g., skin, muscle fibers, bone, cerebrospinal fluid—CSF, grey matter, white matter), resulting in quantitative measurements of induced electromagnetic stimulation affecting brain cells, for instance, excitatory neurons and inhibitory interneurons. The magnitude of induced electromagnetic stimulation may be used to adjust stimulation parameters such as intensity and phase angle, to maximize stimulation effects on a given brain target(s) according to known standards for inducing, for instance, neuronal firing or the release of neurotransmitters. In an example application, stimulation of the precuneus region in patients with Alzheimer's disease is achieved by simulating the impact of TMS pulses on a patients' anatomical MRI scan and determining that the minimal TMS intensity to induce an electrical field sufficient to induce neuronal firing in the precuneus corresponds to 67% of the TMS device's output capacity. The process may also identify one or more position that may be best for the TMS coil to be placed on the scalp, by simulating different angles and rotations while considering fine grey matter anatomy.

In some embodiments, the target region for perturbation is identified as a region responsible for a specific cognitive process, for instance long-term memory or attention. Brain scans and/or EEG data collected during the execution of a cognitive task by patients with Alzheimer's disease may be analyzed, identifying regions in which activation is related to performance of the task. In an example scenario, a resulting region (or regions) are then selected as target(s) for TMS or tCS perturbation to evaluate their level of integration with the other brain regions involved with the same cognitive process (e.g., long-term memory), as a measure of efficiency within the long-term memory network in patients with Alzheimer's disease.

Stimulation Parameters Selection

Selection of appropriate intensity of stimulation for TMS, tCS and tFUS stimulation may be important to ensure a proper assessment.

In some embodiments, the target region for perturbation is identified based on a spatial and functional search algorithm, where evoked EEG activity after at least 2 TMS pulses is averaged, revealing TEPs at different latencies between 5 ms and 500 ms after TMS. The amplitude of the TEPs may be calculated for each patient and used as a proxy of individual responsiveness to TMS and therefore as an index of the target region/network's excitability and reactivity. The amplitude of TEPs may then be used to correct the stimulation intensity obtained from stimulation of the motor cortex (e.g., RMT), with the goal of adapting TMS stimulation intensity based on TEPs.

The intensity of stimulation for TMS, tCS, and tFUS stimulation depends on individual brain anatomy and can be estimated by creating high-resolution biophysical models of brain anatomy via MRI scans. In some embodiments, the electric field (E-field) induced over the brain target region is generated by using a realistic volume conductor head model generated based on MRI images and segmentation from a validation dataset. The model is based on anisotropic conductivity values for each brain tissue class (e.g., skin, fat, muscle, bone, cerebrospinal fluid, grey matter, white matter) expressed in S/m. The set of resulting meshes, comprehensive of at least gray and white matter, scalp, bone, and cerebrospinal fluid, may be used to calculate the E-field distribution for a specific TMS coil design, position, angle and rotation, accounting for coil-to-scalp distance and brain atrophy. The estimated E-field can be used to (a) retrospectively calculate individual differences in the amount of current delivered over a target region and therefore to explain differences in response to a treatment, or (b) to adjust stimulation location and/or intensity so that all participants receive the same amount of induced cortical stimulation.

Temporal Framework and Scope of Perturbation-Based Markers

The system and methods described herein may be applied for multiple scopes and timeframes. Below, example applications of perturbation-based markers in patients with Alzheimer's disease and dementia in general are described.

Diagnostic Purposes

Individual response to perturbation may be used to identify abnormal brain activity in patients suspected of having Alzheimer's disease or dementia. A response to perturbation dissimilar to a control subject, a healthy control or a previous response obtained from the same individual, may be used to aid the diagnostic process. The same process may be applied to identify patients with subtypes of Alzheimer's disease within a group of patients diagnosed with Alzheimer's disease (e.g., amnestic Alzheimer). Analysis of the response may be carried out via visual inspection performed by a trained human operator and/or via a machine learning-based classification algorithm configured to label a response to perturbation as a normal or abnormal response.

Prognostic Purposes

Analysis of individual brain data may be carried out to predict (e.g., estimate) the course of a pathology (e.g., Alzheimer's disease) based on historical data collected from the same individual or group-level estimates of disease progression.

Evaluation of Treatment Effect

Analysis of individual or group-level brain data may be carried out to quantify differences in brain activity before and after a treatment for Alzheimer's disease or memory problems. Pre-Post treatment changes in perturbation-based metrics may be used to evaluate individual or group-level response to a given treatment, alter the treatment parameters, continue or discontinue treatment.

Personalized Treatment Definition

Analysis of individual brain data may be carried out to personalize noninvasive brain stimulation parameters, including but not limited to stimulation location, orientation, intensity, frequency, phase, noise level. Personalization may be carried out by looking at the response to, for instance, TMS pulses delivered over multiple locations within a target region and identifying the location providing the highest brain response to TMS. Parameters such as intensity of brain stimulation, frequency of stimulation, location of stimulation, stimulation waveform, timing of multi-pulse stimulation, duration of a stimulation protocol and number of stimulation session can be defined based on individual response to perturbation as performed using TMS and EEG. In some embodiments, stimulation intensity is defined based on the amplitude of an evoked response recorded via EEG right after a TMS pulse, with the amplitude of said evoked potential representing the excitability of brain tissue stimulated via TMS. Stimulation intensity may also be defined based on characteristics of brain anatomy of an individual, including level of cortical grey and white matter atrophy affecting the magnitude of magnetic and electrical stimulation reaching the brain during TMS due to increased scalp-cortex distance. In some embodiments, stimulation frequency is defined on the basis of the frequency domain response to TMS recorded via EEG, where the spectral power of brain activity in frequency bands including but not limited to delta, theta, alpha, beta and gamma is calculated on the EEG signal collected after TMS delivery. The peak of spectral power in a target frequency band may be determined and used to set the stimulation frequency or as a reference point to guide an adaptive modulation of oscillatory brain activity; for instance, an individual displaying a strong response after TMS with a peak at 38 Hz in the gamma band may be stimulated using repetitive TMS at 38 Hz to maintain ongoing oscillatory activity, or stimulated at a frequency incrementally faster of 38 Hz (e.g., 39 Hz, 40 Hz, 45 Hz) with the goal of guiding neurons to generate faster brain activity. In some embodiments, stimulation location is determined based on the analysis of evoked potentials collected using EEG right after TMS delivery, creating a map of higher and lower responses to TMS based on potentials' amplitude. This information may be used to select areas displaying a stronger response to TMS as a metric of integrity and ongoing activity of the neural circuitry stimulated by TMS. Brain regions with stronger ongoing activity might symptom intact brain circuitry and might be selected as targets for repetitive TMS with the goal of preserving their activity and counteract neurodegeneration. Brain regions with weaker response to TMS might be targeted with repetitive TMS with the goal to restore brain activity and repair brain circuitry. In some embodiments, frequency, amplitude, waveform and duration of brain response to TMS as recorded via EEG is used to determine the duration of a repetitive TMS treatment, and the number of TMS pulses delivered in each repetitive TMS session. Individuals with stronger response to TMS (e.g., high amplitude of evoked potentials above 6 mV and a strong response in the gamma band) might be assigned to a shorter treatment duration compared to individuals with weaker responses indicating a more impaired brain circuitry in the stimulation brain region. Information related to EEG evoked response might be combined with other markers of pathology, including but not limited to levels of neuroinflammation as measured via blood/plasma biomarkers, cerebral level of amyloid and tau protein accumulation as measured via Positron Emission Tomography (PET), level of cortical brain atrophy and levels of corticospinal plasticity measured via transcranial theta-burst stimulation (TBS).

Disease Tracking Purposes

Perturbation-based metrics collected over time may be used to monitor brain function in patients with Alzheimer's disease, capturing, at any given timepoint, significant deviations of brain activity patterns from data collected at previous timepoints. Individual response data may be compared to normative data collected in a sample of patients with Alzheimer's disease or in a group of healthy controls, thus providing an estimated deviation from, for instance, expected rates of cognitive decline.

Investigation of Cognitive Function

Perturbation-based data may be collected from brain regions/networks associated or supporting specific cognitive functions. For instance, TMS or tCS can be used to stimulate a region relevant for memory processing, such as the precuneus or the dorsolateral prefrontal cortex. TMS-EEG and tCS-EEG data may be used in combination with neuropsychological scores to identify altered brain circuitry associated with, for instance, decreased memory performance in patients with Alzheimer's disease.

Data Processing and Analysis

Data Processing Methods

In some embodiments, data processing includes solutions for automated cleaning/preprocessing and/or solutions for semi-automated processing with the possibility for manual identification of artifacts. Processing and analysis may be performed as part of separate modules, covering (i) data collection, (ii) data validation and format conversion, (iii) data cleaning and preprocessing, (iv) data analysis, and (v) detailed report creation (e.g., including optimal stimulation target/parameters and summary of processing steps).

Brain Scans Processing

When brain scans are available for stimulation target selection, two types of information may be used: (i) brain structural properties, including but not limited to density/volume/thickness/gyrification/sulcal depth of grey/white matter, CSF distribution, diffusivity and anisotropy of white matter, and spectroscopy profile of neurotransmitters; and (ii) functional properties of the brain, including but not limited to hemodynamic response, blood perfusion, metabolic activity (e.g., glucose consumption), and protein burden. Steps for preparing the brain scans for statistical analysis include, but are not limited to, conversion of single images to a 3D volume format; segmentation in brain tissue classes; spatial and temporal filtering; removal of physiological noise; removal of image artifacts; extraction of average values and/or timeseries of brain activity, co-registration to a common anatomical or functional template for group-level analysis; calculation of evoked activity when multiple scanning conditions are present as in the case of block-fMRI data. Follow-up analysis can be performed on both voxel-based volumetric data or vertex-based surface images and may include masking of clean data on the basis of anatomical or functional atlases describing relevant networks or brain regions that can be targeted by TMS.

EEG Data Processing

EEG data collected before, during and/or after a single TMS pulse during a TMS-EEG recording session may be processed in preparation for data analysis and selection of a perturbation target using TMS. In addition to EEG artifacts (e.g., eye movements and heart-beat), EEG data collected during TMS is often contaminated by TMS-specific artifacts, including a magnetic pulse artifact changing the impedance of EEG electrodes, TMS-induced muscle artifacts characterized by high-frequency activity, and artifacts related to the TMS machine recharging process in-between TMS pulses. These artifacts usually have amplitudes several orders of magnitude larger than the magnitude of the recorded EEG data, therefore confounding brain signals in the EEG.

Preprocessing and cleaning steps may include, but are not limited to: raw data conversion in .edf format; trimming of raw data into epochs of predefined length, including segments capturing pre- and post-TMS brain activity; normalization of post-TMS activity by subtracting the average signal amplitude of EEG data collected pre-TMS; automated or semi-automated data inspection to identify EEG channels with excessive noise or artifacts; zero padding of activity concurrent to the single TMS pulse to remove early signal decay and muscle artifacts induced by the TMS pulse (according to voltage-based thresholds, kurtosis and joint probability); independent component analysis (ICA) to identify and remove components including early TMS evoked high amplitude electrode, with an additional data reduction via principal component analyses (PCA) to minimize overfitting and noise components; interpolation of previously zero-padded signal across the TMS pulse; band pass filtering using a forward-backward filter typically between 1 to 150 Hz; notch filtering to account for line noise; referencing to global average; a second ICA to manually remove all remaining artifactual components including eye movement/blink, muscle noise (EMG), single electrode noise, TMS evoked muscle activity, cardiac signal (EKG), as well as auditory evoked artifacts (artifacts may be identified and labeled on the basis of their spectral frequency profile, power spectrum, amplitude, scalp topography, and/or time course); application of machine learning and deep learning algorithms for identification of residual artifacts; or interpolation of previously removed electrodes.

Data cleaning and processing may be performed as a supervised method, e.g. with human validation of processing steps and visual inspection of data, or as an unsupervised procedure using, for example, machine learning techniques that do not require human interaction.

Covariates of Interest

It should be appreciated that the order of steps can vary, and specific adjustments may be implemented based at least in part on individual brain properties or pathology-specific artifact and signal characteristics. Features to consider include, but are not limited to, the level of cortical atrophy impacting the induced electric field in the brain; known alterations of neurotransmitters' activity impacting the amplitude and shape of evoked potentials; elevated movement and muscle activations during EEG recording; elevated levels of oscillatory activity in the EEG due to drowsiness and/or general slowing of brain activity typical of the brain of patients with AD.

Perturbational Indexes

Responses to perturbation may be quantified via multiple non mutually exclusive metrics and indexes, including but not limited to those based on shape, amplitude, phase and timing of the signal, those related to resonance effects linked to the duration of induced perturbation, and those related to network-level activity and brain connectivity analysis.

Metrics Based on Signal Characteristics

EEG signals recorded before and after a TMS or tCS stimulation can be characterized via metrics quantifying activity in specific frequency bands, activity at specific time points after the TMS/tCS stimulation linked to the dynamics of specific neurotransmitters or cortico-cortical circuits. Non-limiting example of metrics that may be applicable in patients with AD include:

Natural Frequency of TMS-evoked activity in local Region-Of-Interest, expressed as the oscillatory activity displaying the strongest spectral power after a TMS pulse EEG theta/beta frequency bands ratio measured in the frontal lobe of the brain Magnitude of the N100 peak Area-under-the-curve of the Global Mean Field Potential (GMFP) of the TMS-evoked response after stimulation EEG absolute and relative spectral power in specific frequency bands including but not limited to delta, theta, alpha, beta and gamma EEG spectral power in alpha and delta bands in posterior brain regions Paired-pulse TMS decrease of oscillations in the gamma band Paired-pulse TMS reduction of P60 and N100 peaks of the TMS-evoked potentials Cross-frequency coupling centered around the frequency bands being stimulated via TMS or tCS (to assess for changes in multiplexing and information processing of underlying brain circuits)

Change in P30, N45, P60 and N100 peaks of the TMS-evoked potentials

Change in resting-EEG alpha and beta power

TMS-induced spectral perturbation in the local region, for instance the evoked activity in specific frequency bands including but not limited to delta, theta, alpha, beta and gamma Magnitude and duration of TMS/tCS-induced spectral changes (as measures of plasticity within cortical regions as a function of frequency).

Changes in spectral coherence at scalp and source level, using individual MRI data or a template generated from a sample of individuals with desired clinical or phenotypical characteristics.

Perturbation Resonance EEG Metrics (PREMs

The time required for the EEG signal to return to baseline after applying TMS can be useful to characterize the ability of the brain to recover after perturbation, possibly indexing plasticity mechanisms. However, the return time may not be the only indicator of recovery. Different subjects may exhibit higher amplitudes in the response. For instance, patients with Alzheimer's Disease have been previously shown to exhibit increased excitability. Therefore, a combination of the amplitude of the response and the time required to return to baseline energy could reveal important information on the pathology of such patients and could serve as a biomarker for the disease. Multiple metrics may be extracted from TMS-EEG or tCS-EEG signals, based on the energy of the EEG signal collected before and after perturbation.

In some embodiments, the time needed for the EEG signal to return to baseline is automatically calculated based on the signal energy levels obtained over the time course of the TEP.

The absolute TEP value may be extracted and normalized with respect to its maximum value to have a uniformity in amplitude ranges across subjects. Next, the energy level of the signal may be calculated over a sliding window moving sample by sample through the TEP. Experiments were performed to evaluate the optimum window size. Values for the length of the sliding window included 5 ms, 10 ms, 20 ms, 30 ms and 40 ms. The final evaluation was conducted with respect to the maximum performance obtained for the classification of AD and HC.

Once the energy signal is calculated, the values of the EEG signals obtained after the TMS pulse are compared to baseline. A threshold may be defined as the mean value of the energy signal obtained on the baseline data added with one standard deviation. Baseline has been considered between −500 ms and −200 ms prior to the pulse. The last 200 ms prior to the pulse were excluded to avoid the interference of residual pre-processing and filtering effects on the baseline data.

After applying the threshold, a new signal is obtained that should be representative of the increase in energy as a response to stimulation.

The difference between the timepoints when the energy signal crossed the threshold is computed. The maximum interval between time points is extracted. When the difference between two time points of the signal is higher than 75% of the maximum, it is considered that the signal is back to baseline levels after the perturbation. In some embodiments, this represents the time required for the signal to return to baseline.

Examples of metrics that may be used to characterize the TEP include, but are not limited to, an index measuring the time required for the signal to return to baseline (e.g., measure of target engagement duration); an index measuring the slope of the signal between the end of engagement and the maximum absolute value of the highest TEP between after the TMS pulse, and a measure capturing the area under the curve of the signal between the TMS pulse and the end of target engagement.

Network-Based Metrics

Response to perturbation may be analyzed to characterize network-level dynamics in the brain, with particular focus on the analysis of brain functional and structural networks altered in Alzheimer's disease and dementia. The recorded electrophysiological (e.g., EEG) data may be preprocessed to eliminate sources of noise and recording artifacts, and then analyzed by looking at patterns of brain connectivity in electrode- and/or source-space. Analysis in electrode space involves looking at brain activity as recorded by scalp EEG electrodes, without projecting the data onto a structural MRI scan of a patient. Source analysis involves projecting the clean EEG data onto a 3D brain structural MRI region, therefore looking at high spatial resolution activity in the range of 1 cubic millimeter related to individual anatomy and topographical organization of brain functional networks. Regardless of the approach, the data may be expressed as a time series representing brain activity in a specific electrode (at scalp level) or brain region/network (at source level). In source space, the time series may be extracted from anatomically or functionally defined regions-of-interest representing specific brain regions or functional networks of interest for Alzheimer's disease pathology (e.g., the Default Mode Network, Fronto-Parietal Control Network, Anterior Salience Network, Dorsal Attention Network). The extracted time series may be analyzed to look at patterns of synchrony across electrodes and brain regions/network, obtaining a connectivity matrix describing the direction and strength of connectivity for each given pair of brain regions/network or electrodes (functional connectivity analysis). This analysis may be performed by extracting one value for each pair of regions/networks/electrodes, and it provides a static metric of brain functional connectivity. Time series data may also be used to look at time varying, dynamic patterns of connectivity and to model their changes over time (Dynamic Connectivity analysis). The time series may also be used to estimate the directionality of influence across brain regions/networks/electrodes, by calculating the predictive power of time series #1 over time series #2. The resulting metric measures the causal connection between activity in region #2 from region #1, resulting in a weighted map describing a hierarchy of brain regions/networks/electrodes driving brain activity in other regions/networks/electrodes.

Analysis of functional/dynamic/effective connectivity may be performed looking at metrics of inter- and intra-network activity, quantifying the amount of connectivity within nodes of a network relevant for Alzheimer's disease, or between nodes of two or more networks of the brain to look at network-to-network communication and information processing. The connectivity matrix based on functional/dynamic/effective connectivity may also be used to obtain network topography measures related to the field of graph theory analysis, allowing to identify regions/networks/electrodes of particular importance in providing, for instance, integrity, efficiency of information transfer and resilience to perturbation to a network or the entire brain.

Example metrics related to network dynamics in AD patients include, but are not limited to:
Connectivity within the Default Mode Network (DMN), Frontoparietal Control Network (FPCN), Dorsal Attention Network (DAN) and Anterior Salience Network (AS);
Connectivity between any two pairs of networks, as a measure of inter-network synchronization;
Strength of the negative connectivity between DMN and AS;
Connectivity of the precuneus region of the DMN;
Connectivity between parietal and frontal nodes of the DMN;
Connectivity of the angular gyrus of the DMN, and in particular the strength of its connection with the hippocampus;
Connectivity of brain regions with high accumulation of waste proteins as measured via PET imaging;
Connectivity between frontal and parietal nodes of the FPCN as a metric of cognitive flexibility and executive functions;
Dynamics, time-varying connectivity of brain regions composing the DMN and FPCN
Effective, causal connectivity of brain regions composing the DMN and FPCN
Cross-frequency coupling of theta and gamma activity in regions composing the DMN and FPCN
Dynamics changes in network modularity following a TMS pulse, including but not limited to those related to an increase in resilience to external perturbation measured via resilience graph analysis.

Machine Learning Analysis

In some embodiments, metrics extracted from a perturbation-based dataset are analyzed via a machine learning (ML) and artificial intelligence (AI) platform. In some embodiments, a ML model may be trained to cluster one or more of a plurality or combination of variables to obtain unique information from a dataset. The ML model may then generate clusters that group same and/or similar variables or combinations of variable together, allowing to identify patterns of response within a dataset, within a group of individuals, and across groups of individuals. In some embodiments, the ML model may include algorithms to reduce the dimensionality of a dataset, also applying a feature selection technique to decrease dimensionality of the feature space by discarding multiple variables or metrics providing the same type of information. Dimensionality reduction techniques include, but are not limited to, principal component analysis (PCA), independent component analysis (ICA), and spectral decomposition. In some embodiments, the ML model may include a training and testing split for cross-validation of classification results, including but not limited to K-fold and leave-one-out cross-validation. The ML methods here described can be applied in a supervised or unsupervised fashion, depending on whether the model is trained to identify hidden clusters/groups in the dataset (unsupervised) or trained to identify a specific group of features/individuals based on a target set of desired features.

Infrastructure and Patient Flow

In some embodiments, an infrastructure is created to allow for, among other steps, stimulation target and TMS parameters optimization, data storage and processing, as well as report creation. The session flow may include the following steps:
1) Patient is prescribed a TMS-EEG investigation to identify possible alteration of brain physiology;
2) Patient is scheduled for a target definition and optimization session;
3) Patient completes a brain scanning session to identify and characterize the topography of a target brain network/region;
4) Brain scans are processed and TMS target region(s) are identified;
5) Patient's EMG, TMS and EEG data are collected from the region(s) previously identified via brain scans;
6) Results are streamed to a data processing unit/platform where data cleaning and analysis take place;
7) Optionally, the data is compared with a normative database of age-matched healthy individuals to identify altered responses to perturbation;
8) Optionally, the data is collected over multiple time points and compared with a normative longitudinal database of age-matched healthy individuals to identify altered responses to perturbation and estimate disease trajectory and, e.g., potential conversion from MCI to AD in the case of patients with MCI;
9) The clinician/operator receives a report about the altered markers and use it to (i) prescribe medications, (ii) prescribe non-pharmacological interventions (e.g., meditation, cognitive training);
10) Data is stored and harmonized with follow-up data collections for disease tracking.

The steps can be combined or substituted with any suitable steps of the other methods disclosed herein.

Starting from step 3, in an example scenario, a clinical staff member may access a URL link and authenticate their user account with a service (e.g., Auth0). Then, the clinical staff member can set up the TMS-EEG apparatus and pair it with the web browser. Following this, data (raw EEG data and/or survey metadata, e.g., demographic information, brain scan data, neuronavigation parameters) and a request may be sent from the EEG to the backend via an application programming interface (API). This data and request are then routed through the gateway ingress and gateway.

Definition of Brain Targets

A brain region may refer to a brain anatomical region following standard neuroanatomy hierarchies. Brain regions may also include an ensemble of anatomical regions or areas of the brain with similar function or associated with a specific cognitive function. A "cognitive area" may be considered as a physical portion of the brain (e.g., part of the cerebral cortex, hippocampus, thalamus or cerebellum) supporting a cognitive function (including but not limited to, attention, language, memory, visuomotor function, executive function, flexibility, inhibition, abstract reasoning, creativity, emotional processing).

A brain network may refer to functional and/or anatomical networks as defined via techniques such as fMRI, Diffusion Tensor Imaging (DTI), Diffusion Weighted Imaging (DWI), PET, EEG, and MEG. Examples of brain networks are the Default Mode Network (DMN), the ventral DMN (vDMN), the dorsal DMN (dDMN), the Frontoparietal Control Network (FPCN, the Visual Network (VN), the Sensorimotor Network (SMN), the Dorsal Attention Network (DAN), the Ventral Attention Network (VAN), the Salience Network (SN), the Limbic Network (LN), the Executive Control Network (ECN), the Auditory Network (AN), the Memory Network (MN), the Cingulo-Opercular Network (CON), the Episodic Memory Network (EMN), the Precuneus Network (PrecN), the Language Network (LangN), the Cognitive Control Network (CCN), the Inhibitory Network (InhN), the Working Memory Network (WMN), the Insight Network (InsiN), the Insular Network (InsN), the Vestibular Network (VestN), the Basal Ganglia Network (BGN).

System Design for Simultaneous TMS, Electrical Stimulation and EEG Recording

Figure 8C:
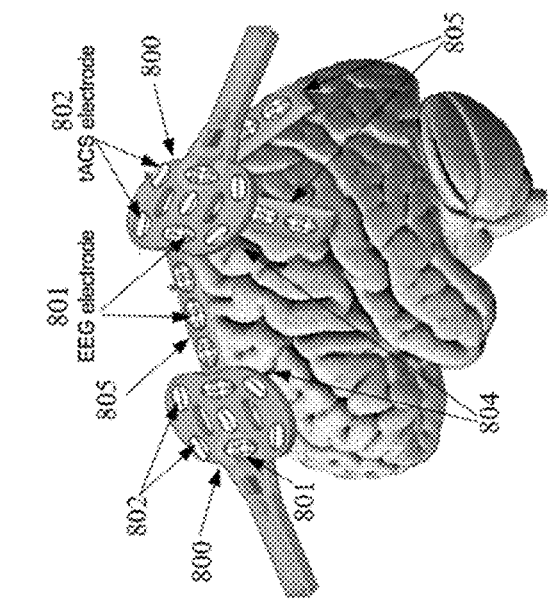
FIGS. 8A-8C illustrate non-limiting examples of a TMS stimulation systems in accordance with embodiments described herein.
Figure 8B:
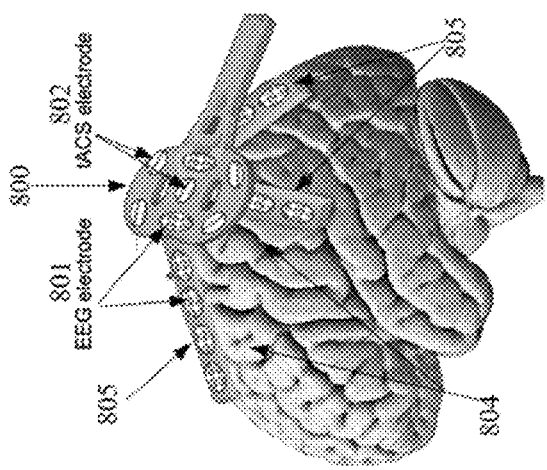
Figure 8A:
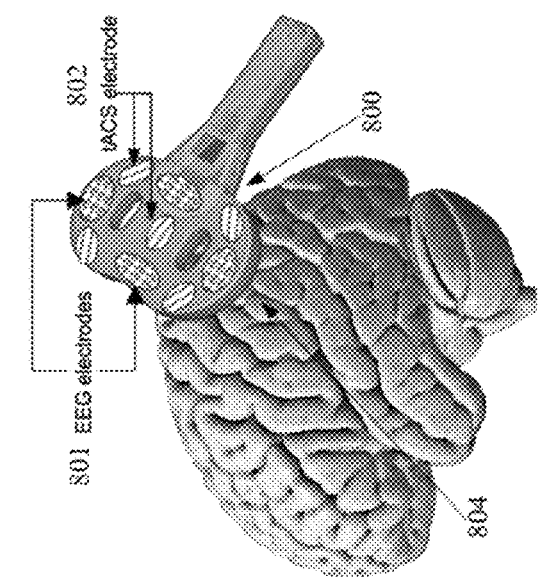

Brain perturbation to assess, quantify and modulate brain activity may be delivered via a system allowing for simultaneous delivery of TMS (including but not limited to single pulse and repetitive TMS), electrical stimulation (including but not limited to tDCS and tACS), and scalp EEG recording. FIGS. 8A-8C illustrate non-limiting examples of a described herein wherein the system may include a TMS coil 801 (e.g., figure-of-8) which incorporate EEG electrodes 800 within the plastic casing of the coil 801, as well as tACS electrodes 802 distributed along the surface of the coil. In some embodiments, the TMS coil 801 may have a different shape other than figure-of-8, including personalized shapes based on an individual's head shape derived from 3D-scan of the head including but not limited to those obtained via a structural MRI image. In some embodiments, the system includes multiple TMS coils 801 allowing for stimulation of multiple brain regions via TMS, connected to the additional EEG 800 and electrical stimulation electrodes 802.

In some embodiments, the EEG and electrical stimulation electrodes are controlled by a separate generator and amplifier, distinct from the TMS coil. In some embodiments, the EEG and electrical stimulation electrodes are operated by the TMS device.

In some embodiments the system may comprise a single TMS coil 800 including EEG 801 and electrical stimulation electrodes 802 placed within the casing of a figure-of-8 coil 800 illustrated in FIG. 8A. In some embodiments, the system may include a TMS coil 800 and may also include additional structures 805 protruding from the TMS coil 800 casing and covering other head scalp territories to allow for additional EEG 801 and electrical stimulation 802 of other brain regions and lobes 804, as illustrated in FIG. 8B. In some embodiments, the system may comprise multiple TMS coils 800 configured for targeting of multiple brain regions 804 and lobes 804 and may further comprise integrated additional EEG 801 and electrical stimulation electrodes 802 as illustrated in FIG. 8C.

Example Use Cases

Embodiments herein are further illustrated by the following examples and detailed protocols. However, the examples are merely intended to illustrate embodiments and are not to be construed to limit the scope of the technology described herein.

Examples demonstrate the application of perturbation-based methods to (i) predict AD patients' response to a 6-months treatment based on repetitive TMS and (ii) identify patients with AD vs healthy individuals.

Example Use Case 1

Prediction of Response to a Brain Stimulation Treatment in Patients with AD

Data collected as part of a phase 2, double blind, randomized, placebo controlled clinical trial in patients with AD demonstrate the safety, feasibility, and efficacy of the proposed perturbation-based measures. The trial investigated the efficacy of a long-duration treatment course of repetitive TMS based on a novel approach for targeting functional networks altered in AD, specifically the DMN and the Precuneus region, with clinical and cognitive effects captured over the course of 24 weeks. After recruitment and baseline assessment, patients were randomly assigned in a 1:1 ratio to receive either real or sham rTMS over the precuneus. All treatments were administered for 24 weeks with no interruptions. The trial comprised a 24-week treatment period with a 2-week intensive course in which rTMS of the precuneus was applied daily 5 times per week (W1 and W2), Monday to Friday, followed by a maintenance phase in which the same stimulation was applied weekly for 22 weeks (W3-W24). During the entire period of 24 weeks a total of 51200 pulses were delivered for each patient. rTMS was carried out using a magnetic stimulator connected with a figure-of-eight coil.

Efficacy assessments were conducted at baseline (W0) for enrolled patients and caregivers and repeated at weeks 12 (W12) and 24 (W24) (or upon early termination) by raters who were blinded in respect to the assignment group. Investigators, patients, and their caregivers were also blinded. At each clinical visit (or upon early termination), adverse events (AEs) were recorded, vital signs were measured, and physical and neurological examination performed. An independent Data Monitoring Committee monitored the patients' safety according to the Data Monitoring Committee Charter.

Primary and Secondary Outcome Measures

The primary outcome measure was the change at 24 weeks from baseline of the Clinical Dementia Rating Scale Sum of Boxes (CDR-SB) score (CDR-SB scores range from 0 to 18, with higher scores indicating worse cognition and daily function). The intention-to-treat analysis set included all patients who had post-baseline efficacy data. The secondary outcome measures were:
  Change at 24 weeks from baseline on the Alzheimer's Disease Assessment Scale—Cognitive Subscale (ADAS-Cog)11;
  Change at 24 weeks from baseline on MMSE score;
  Change at 24 weeks from baseline on the Activities of Daily Living (ADCS-ADL);

Sample 86 patients were screened, and 50 patients underwent randomization. The mean age of the total sample of patients was 73.7 years (SD=6.6, range 62 to 84), and 52% were female. Patients had a mean MMSE raw score at baseline of 21.3 (SD=2.5). A total of 45 patients (90%) completed the treatment period.

Predication of Response to rTMS Treatment

TMS-based measures of cortical physiology were selected by the investigators on the basis of their knowledge and expertise on the pathophysiology of AD and used to predict response to treatment. The approach included three main single and dual perturbation measures: Resting Motor Threshold (RMT), Short afferent inhibition (SAI), TMS-evoked potentials (TEPs).

Resting Motor Threshold (RMT)

RMT was defined as the lowest intensity producing MEPs of >50 µV in at least five out of ten trials in the relaxed first dorsal intereosseous (FDI) muscle of the right hand. RMT was assessed over the optimal stimulus site to elicit MEPs in the right FDI, termed "motor hotspot", identified by positioning the coil approximately over the central sulcus and moving it on the scalp by 0.5 cm steps on left M1.

Short Afferent Inhibition (SAI)

Corticospinal evaluation was performed with TMS-EMG and was aimed to investigate if short-afferent latency inhibition (SAI) was able to predict the clinical progression of AD patients of the real-rTMS group. This measure was based on MEP amplitudes evoked from the relaxed first dorsal interosseous (FDI) muscle of the hand contralateral to the stimulation. The coil was placed tangentially to the scalp at about 450 angle away from the midline, thus inducing a posterior-anterior current in the brain. The intensity of stimulation for single-pulse TMS was adjusted to evoke a MEP of ~1 mV peak-to-peak amplitude. SAI was measured as follows: a conditioning electrical stimulus (200 s) applied through bipolar electrodes to the right median nerve at the wrist (cathode proximal) preceded a single-pulse TMS by 16, 20, 24 and 28 ms. The intensity of the electrical stimulus was set at just over motor threshold for evoking a visible twitch of the thenar muscles. To measure SAI effects, the mean peak-to-peak amplitude of conditioned MEP as a percentage of the mean peak-to-peak amplitude of the unconditioned MEP in that block was considered.

TMS-Evoked Potentials (TEPs)

Intensity of stimulation was set at 90% of RMT, tested on contralateral FDI muscle at rest. Each session consisted of 80 TMS single-pulses applied at a random ISI of 2-4 s over the DMN-precuneus, targeted using a neuronavigation system. Each participant wore in-ear plugs which continuously played a white noise that reproduced the specific time-varying frequencies of the TMS click.

TMS-evoked EEG activity was recorded from the scalp with a TMS-compatible DC amplifier. The EEG was continuously recorded from 61 scalp sites positioned according to the 10-20 International System, using TMS-compatible Ag/AgCl pellet electrodes mounted on elastic cap. EEG signals were digitized at a sampling rate of 5 kHz. Skin/electrode impedance was maintained below 5 kΩ. Horizontal and vertical eye movements were detected by recording the electrooculogram (EOG) to off-line reject the trials with ocular artifacts.

Physiological and TMS-related artefactual components were detected using INFOMAX-ICA and removed basing on their scalp distribution, frequency, timing and amplitude. Effects of rTMS were evaluated on three domains: temporal, by means of TMS-evoked potentials (TEPs) from the site of stimulation, in this case, DMN-precuneus; oscillatory, by means of TMS-related spectral perturbation (TRSP) from the site of stimulation, i.e. DMN-precuneus; and spatial, by means of source analysis conducted over all the scalp.

TEPs were computed considering a time window from 100 ms before TMS to 300 ms after TMS, with a baseline correction of −100 to 0 ms (where 0 ms represents the time at which TMS was applied). Frequency-domain analysis was performed using a time/frequency decomposition based on Morlet wavelet (parameters c=3; 41 linear 1 Hz steps from 4 to 45 Hz) and then by computing TRSP. Spectral power was extracted for the theta (4-7 Hz), alpha (8-13 Hz), beta (14-30 Hz) and gamma band (31-45 Hz) and averaged in a time window lasting from 20 to 250 ms after TMS for the theta and alpha band and from 20 to 70 ms after TMS for the beta and gamma band.

TMS-EEG source reconstruction for precuneus stimulation was performed using Brainstorm, fitting a distributed source model consisting of 15,000 elementary current dipoles. These dipole sources were distributed at each vertex of a tessellated cortical mesh template surface derived from the standard 1 mm resolution brain (Colin27) of the MNI as provided in Brainstorm toolbox running in MATLAB. First the head model for source imaging was implemented according to the boundary element method (BEM). Based on this head model, the inverse problem was solved using a current density map.

Impact of rTMS and Prediction of Response to Treatment

Cognitive and Clinical Outcomes

The mean baseline CDR-SB total score was 4.1 (SD=1.8) for the real-rTMS group, and 4.6 (SD=1.5) for the sham-rTMS group. There were significant differences (baseline vs. week 24) in the cognitive performance as measured by the CDR-SB total score in the active rTMS group compared to sham. GLMM for repeated measures on CDR-SB scores showed significant result in terms of difference between group (p=0.038) and time×group (p=0.009) interaction, with patients treated with sham-rTMS showing a general worsening of cognitive performance of patients over time that was not evident in the DMN-p-rTMS group. The GLMM estimated mean change (baseline—week 24) in CDR-SB score was −0.25 for DMN-p-rTMS (95% confidence interval (CI) [−4.8, 4.3]) and −1.42 for sham-rTMS group (95% CI [−6.0, 3.3]). The rate of responders, defined as the percentage of patients showing an increase 1 point at the CDR-SB score, was 68.2% in the DMN-p-rTMS group and 34.7% in the sham group.

GLMM for repeated measures on ADAS-Cog11 scores (adjusted for age and education) showed significant result in terms of time×group (p=0.035) interaction. The GLMM estimated mean change (baseline—week 24) in ADAS-Cog11 score was −0.67 for DMN-p-rTMS (95% confidence interval (CI) [−21.5, 20.2]) and −4.2 for sham-rTMS group (95% CI [−25.1, 16.6]).

The baseline mean of ADCS-ADL total score was 58.6 (SD=9.7) for the DMN-p-rTMS group and 58.3 (SD=9.7) for the sham-rTMS group. Estimated mean change (baseline—week 24) in ADCS-ADL scores was −0.7 for AD-DMN-p-rTMS (95% CI [−27.2, 25.8]) and 7.5 for sham-rTMS group (95% CI [−20.5, 35.5]), showing an improvement of the DMN-p-rTMS with respect to sham-rTMS group (interaction effect: p=<0.001).

Prediction of Response to Treatment Based on Perturbation Biomarkers

A multiple stepwise regression analysis was performed to observe whether neurophysiological measures at baseline level (T0) were able to predict the clinical progression in patients treated with rTMS. Three neurophysiological measures were chosen as predictor variables, two of them, i.e., RMT and SAI (at ISI of 20 ms, since this was the interval at which we observed the strongest inhibition), have been previously tested as predictors of clinical progression in AD, the third one was TEP amplitude of the first peak, which is the response modulated by the rTMS protocol described herein. CDR improvement between W1 and W24 was chosen as the dependent variable, since this was the primary outcome. To explore whether TEP amplitude of the first peak was linearly correlated with clinical improvement, Pearson's correlation was performed with CDR, ADAS-cog and ADCS-ADL.

Multiple stepwise regression analysis showed that the linear model significantly predicted clinical progression, as tested with CDR, when the model included all the three predictors, i.e., RMT, SAI and TEP (Model 1: R2=0.461, p=0.03), two predictors, i.e., SAI and TEP (Model 2: R2=0.394, p=0.023) and one predictor, i.e., TEP (Model 3: R2=0.355, p=0.009). Backward selection of coefficients revealed that TEP amplitude of the first modulated peak was the best predictor for clinical progression compared to SAI and RMT (all p<0.05). Correlation analysis revealed a significant relation between TEP amplitude and CDR (r=−0.449, p=0.021), ADAS-cog (r=−0.422, p=0.018) and ADCS-ADL (r=0.514, p=0.009).

Observations

Analysis of brain activity in response to TMS perturbation may allow one to predict the response to a brain stimulation treatment in patients with Alzheimer's disease. Fine analysis of signal propagation may allow one to predict individual response rate and could be used to screen and assign patients to specific treatment based on their perturbation-based response.

Example Case #2

Response to Electromagnetic Perturbation as a Marker of Disease Pathology and Altered Synaptic Plasticity in Patients with Alzheimer's Disease.

Synaptic dysfunction is a key feature of Alzheimer's disease-related cognitive decline, but noninvasive in-vivo approaches to reliably measure such dysfunction are lacking. A set of novel biomarkers of synaptic plasticity were identified and validated in 50 patients with Alzheimer's disease. TMS-evoked EEG activity after stimulation of specific hubs of the fronto-parietal network and default mode network involved in AD pathology were collected. Specifically, stimulation was delivered to the left dorsolateral prefrontal cortex (1-DLPFC), the precuneus (PC) and the left posterior parietal cortex (1-PPC).

Cortical oscillatory activity in the gamma range resulted significantly reduced in the frontal lobe of patients, including activity induced both locally by stimulating the dorsolateral prefrontal cortex or indirectly when stimulating the precuneus.

Cortical excitability assessed by TMS evoked potentials (TEPs) was higher in the same areas in AD patients as compared to age-matched healthy volunteers (HV).

Comparison with other brain regions, including the parietal brain lobe, were identical across HV and patients with AD, identifying alterations of gamma activity in the frontal lobe (DLPFC) as a pathology specific marker of AD. Moreover, patients with a more prominent decrease in DLPFC gamma activity showed a stronger cognitive decline at subsequent follow-up evaluation performed 24 weeks after the TMS-EEG session.

More details on the procedures and results are reported below.

Sample

TMS-EEG data were acquired in patients with mild to moderate AD and analyzed according to procedures and methods described above. The mean age of the total sample of AD patients was 69.2 years, of which 59% were female, whereas the mean age of the HV group was 67.4 years. AD Patients had a mean MMSE raw score at baseline of 22.7.

Patients were eligible for the study if they had an established diagnosis of probable mild-to-moderate AD according to the International Working Group recommendations.

TMS-EEG Recordings

Neurophysiological characterization was performed by combining single-pulse TMS and EEG recordings according to procedures for single-pulse TMS described above. During all TMS-EEG recordings, participants sat on a comfortable armchair in a soundproof room in front of a computer screen. They were instructed to fixate on a white cross in the middle of the screen and to keep their arms in a relaxed position.

TMS was delivered over three target brain regions: 1-DLPFC, PC and 1-PPC. The order of stimulation of the areas was counterbalanced across patients. The intensity of stimulation of single-pulse TMS was personalized for each patient based on corticospinal excitability levels and brain anatomy.

Spatio/Temporal-Domain Analysis

Figure 2B:
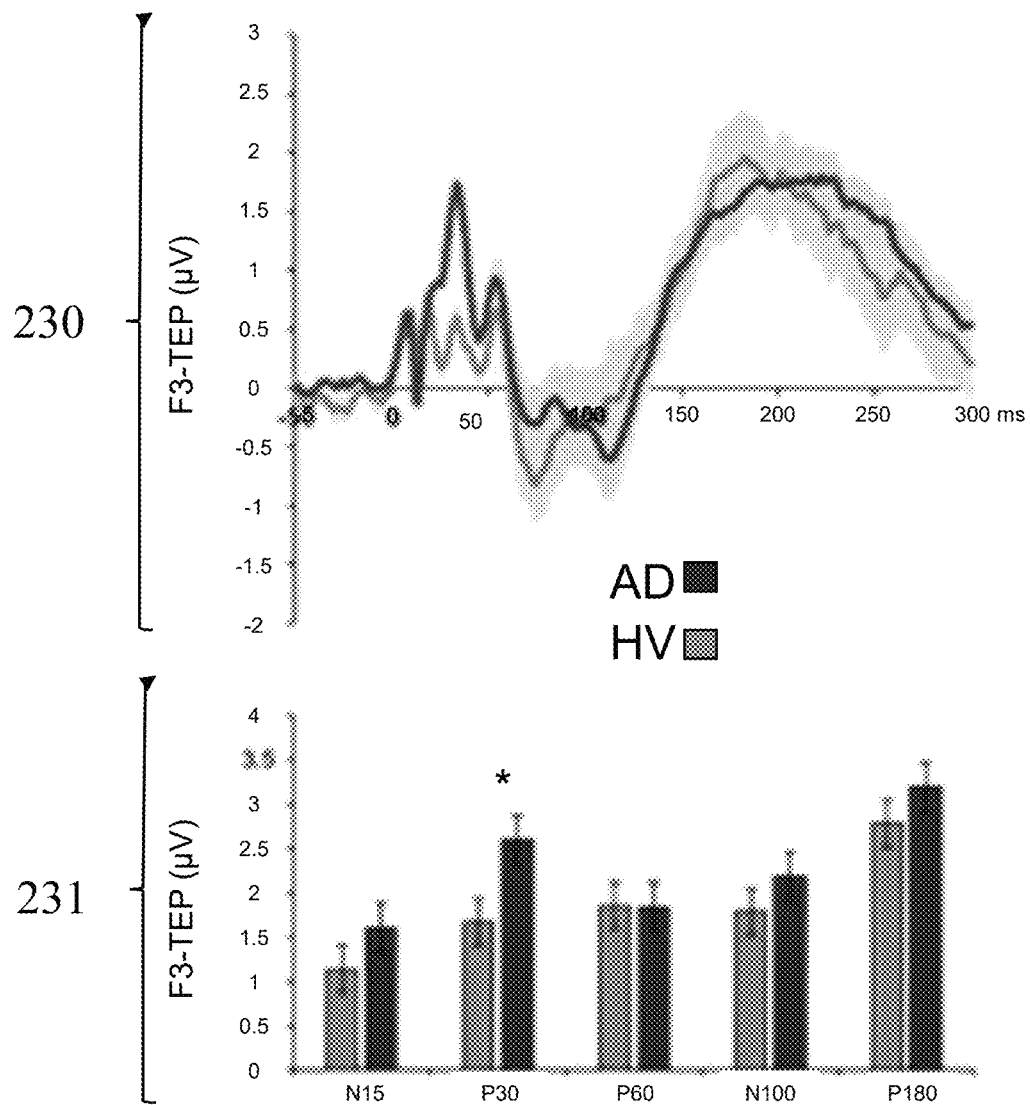
FIG. 2B show the local TEP waveform recorded over the closest electrode of the stimulated area for L-DLPFC stimulation.
Figure 2C:
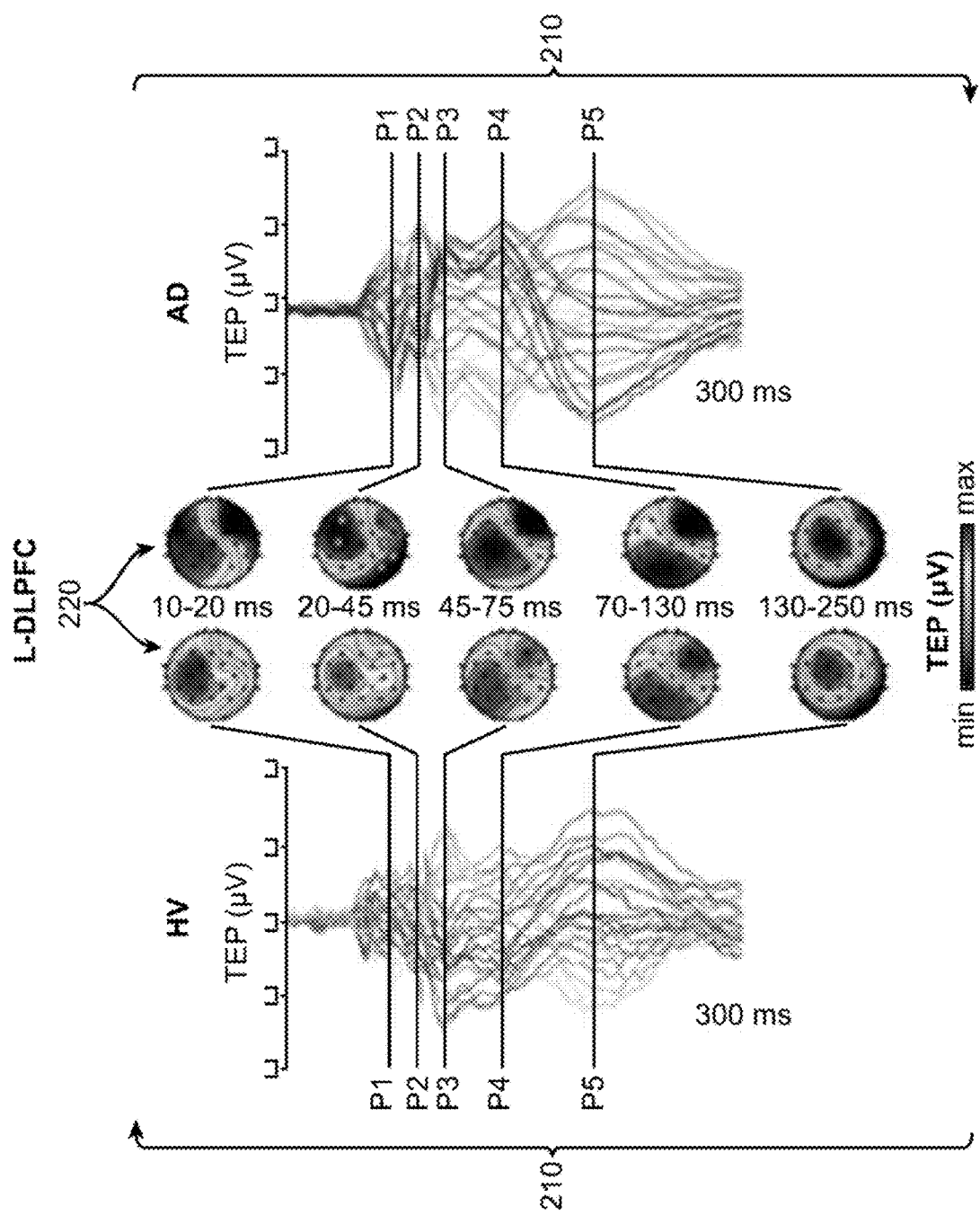
FIG. 2C illustrates a spatio-temporal reconstruction of TEPs recorded over all the scalp after stimulation of PC.
Figure 2D:
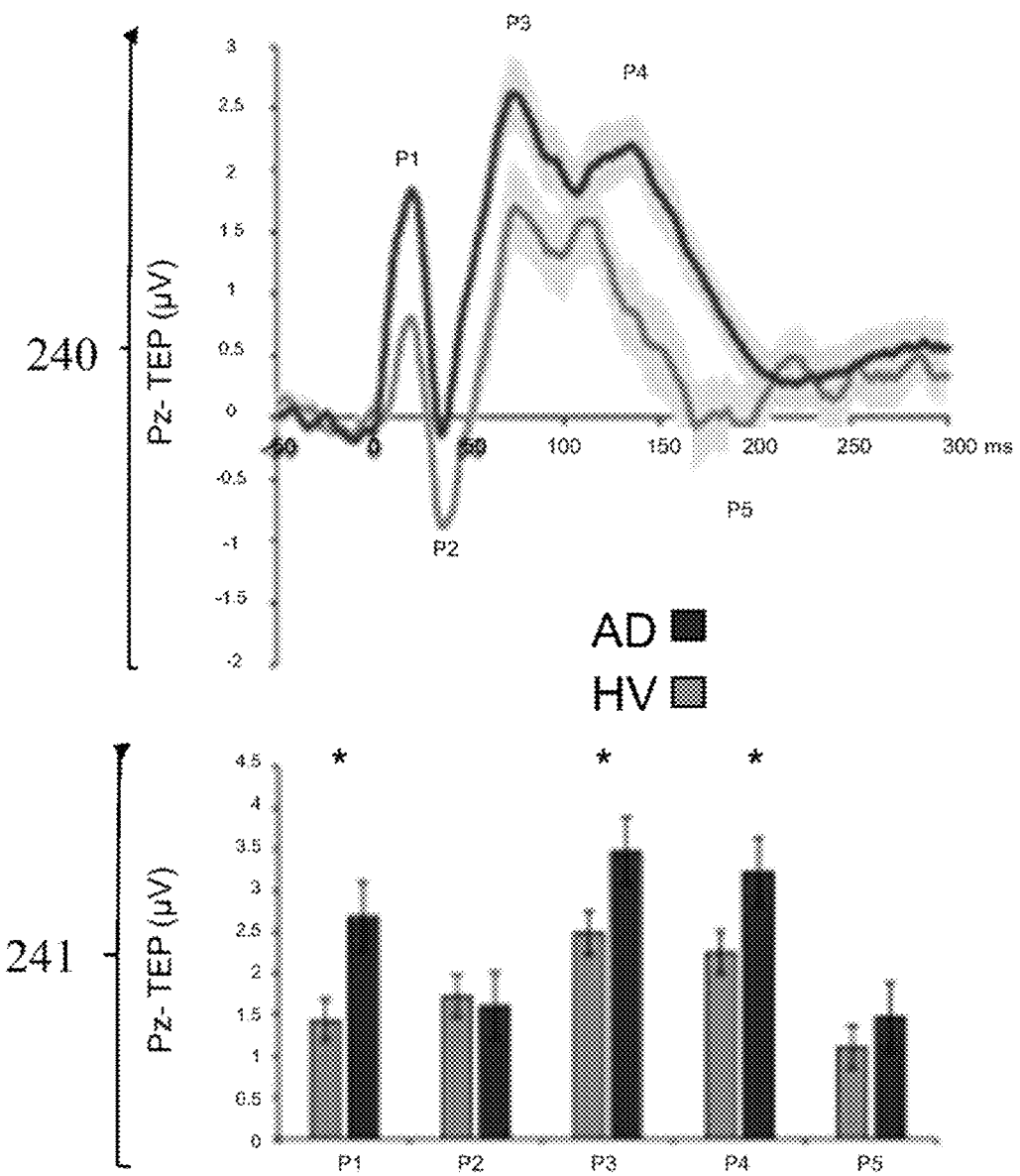
FIG. 2D show the local TEP waveform recorded over the closest electrode of the stimulated area for PC stimulation.
Figure 2E:
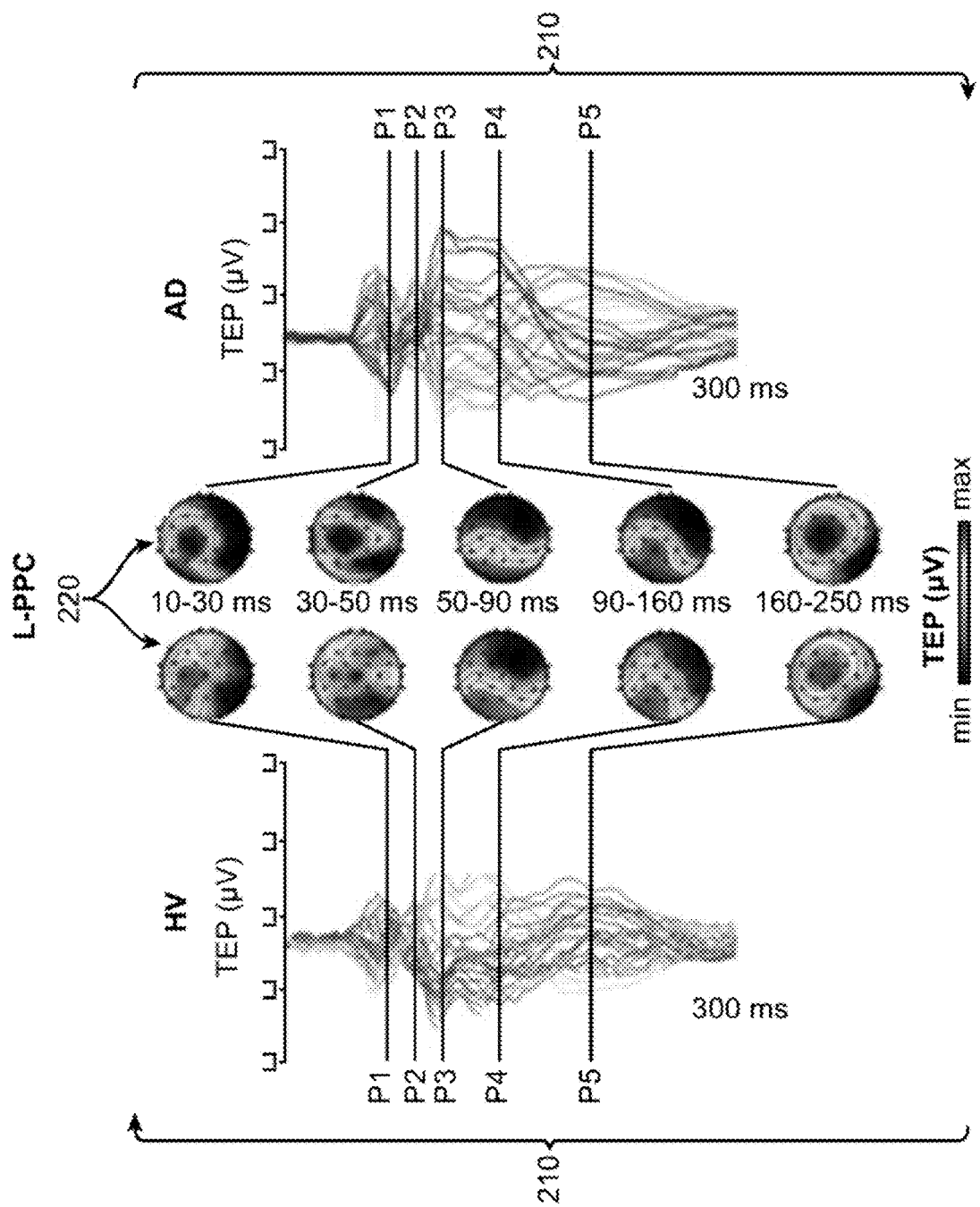
FIG. 2E illustrates a spatio-temporal reconstruction of TEPs recorded over all the scalp after stimulation of L-PPC.
Figure 2F:
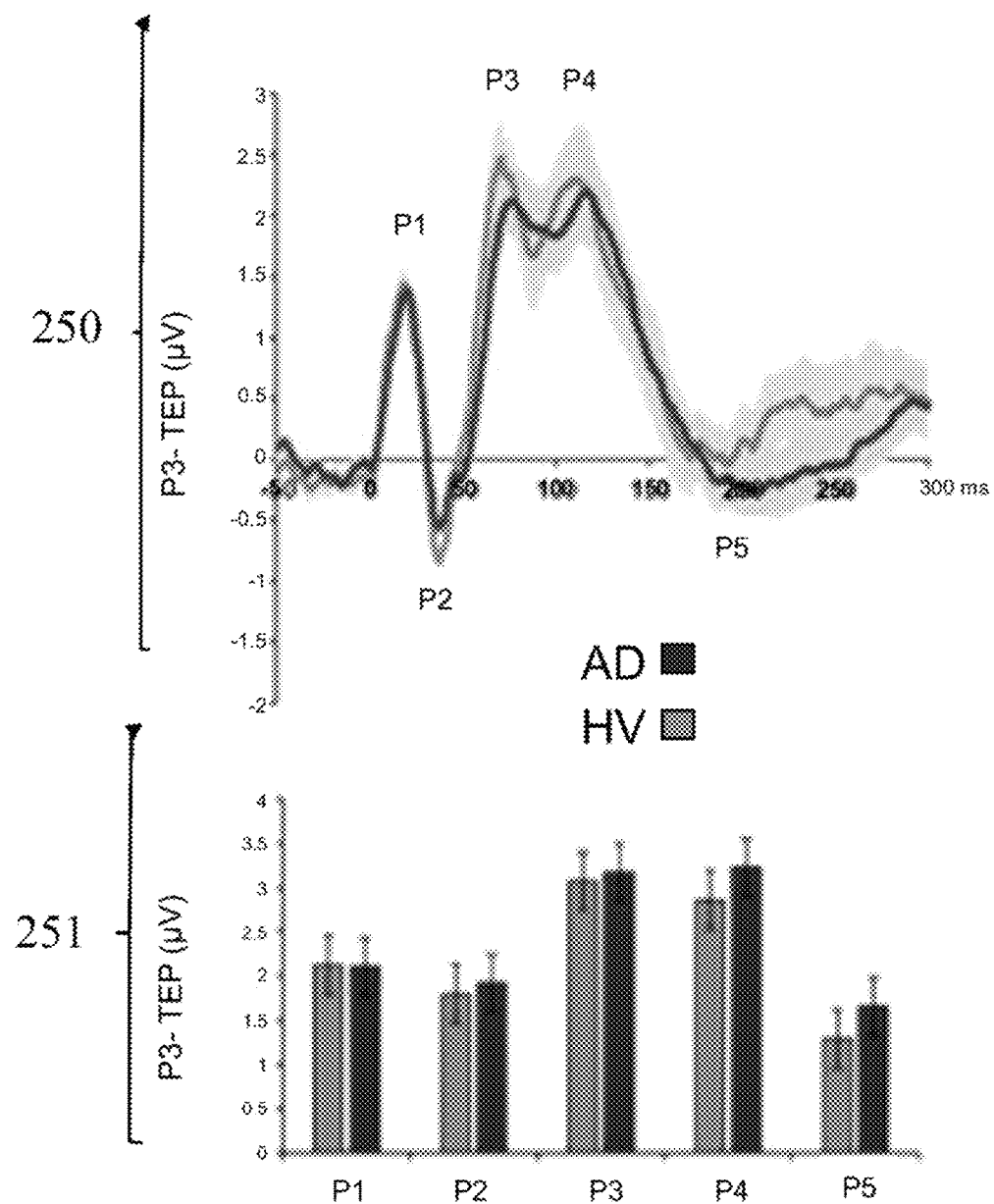
FIG. 2F show the local TEP waveform recorded over the closest electrode of the stimulated area for 1-PPC stimulation.

FIGS. 2A-2F show the spatiotemporal brain dynamics at global and local level after TMS. FIG. 2A, depicts the TMS-evoked potentials (TEPs) 210 recorded over all the scalp after TMS of the L-DLPFC for both of the AD group and in the HV group and FIG. 2B depicts the corresponding TMS-evoked potentials 230, 231 at F3 recorded over L-DLPFC. FIG. 2C depicts the TMS-evoked potentials (TEPs) 210 at a global level recorded over all the scalp after TMS of the PC for both of the AD group and in the HV group and FIG. 2D depicts the corresponding TMS-evoked potentials 240, 241 at Pz recorded over PC. FIG. 2E depicts the TMS-evoked potentials (TEPs) 210 recorded over all the scalp after TMS of the L-PPC for both of the AD group and in the HV group and FIG. 2F depicts the corresponding TMS-evoked potentials 250, 251 at P3 recorded over L-PPC. Error bars and shaded lines indicate standard error. * indicates p<0.05.

FIGS. 2A, 2C and 2E show the spatio-temporal reconstruction of TEPs 220 recorded over all the scalp after stimulation of the L-DLPFC (FIG. 2A), PC (FIG. 2C) and L-PPC (FIG. 2E). Regardless of the stimulation site, single-pulse TMS evoked a well-known pattern of five main peaks of activity (P1, P2, P3, P4, P5), lasting around 250 ms, and with different latencies depending on the stimulated area (L-DLPFC: P1 at 15 ms, P2 at 30 ms, P3 at 60 ms, P4 at 100 ms, P5 at 180 ms; PC and L-PPC: P1 at 20 ms, P2 at 40 ms, P3 at 70 ms, P4 at 120 ms, P5 at 200 ms). Spatio-temporal reconstruction of TEPs 220 showed a similar spatial dynamic among the three areas with a prominent activity focused on the stimulated area (P1, P2) that subsequently spread intra- and inter-hemispherically (P3, P4) and finally resulted in a central bilateral positivity, likely produced by a TMS-evoked auditory artefact (P5).

Analysis of TEPs at the global level 210, 220 was first conducted to assess differences in cortical excitability throughout the entire scalp between the AD and the HV group. When stimulated over the L-DLPFC (FIG. 2A), AD patients showed higher cortical excitability between 20 and 40 ms after TMS, over a cluster of two left frontal electrodes (Monte Carlo ps<0.01) and over a cluster of right posterior electrodes (all Monte Carlo ps<0.01). When stimulated over the PC (FIG. 2C), AD patients showed higher cortical excitability between 30 and 50 ms after TMS, over a cluster of four electrodes locally to the stimulated medial parietal area (all Monte Carlo ps<0.01); and in a subsequent temporal window between 50 and 90 ms over two clusters of electrodes, one of four electrodes over the stimulated area, and one of three frontal electrodes (all Monte Carlo ps<0.01). No differences were observable when the two groups were stimulated over the L-PPC (FIG. 2E) (all ps>0.05).

To compare the reactivity of the stimulated area between the AD group and the HV group, a temporal analysis of the TEP evoked at local level was subsequently performed. FIGS. 2B, 2D and 2F show the local TEP waveform recorded over the closest electrode of the stimulated area: F3 for L-DLPFC stimulation 230, 231 (FIG. 2B), Pz for PC stimulation 240, 241 (FIG. 2D) and P3 for L-PPC stimulation 250, 251 (FIG. 2F). When stimulated over the L-DLPFC, the AD group showed a higher TEP amplitude between 20 and 40 ms when compared to the HV group (AD: $1.602\pm0.286$, HV: $1.137\pm0.235$; $t(59.314)=2.370$, $p=0.021$) (FIG. 2B). When stimulated over the PC (FIG. 2D), AD showed a higher TEP amplitude between 10 and 30 ms (AD: $2.671\pm0.222$, HV: $1.252\pm0.368$; $t(79)=3.263$, $p=0.002$), between 50 and 90 ms (AD: $1.671\pm0.156$, HV: $1.038\pm0.182$; $t(79)=2.208$, $p=0.03$) and between 90 and 160 ms (AD: $2.801\pm0.201$, HV: $1.637\pm0.264$; $t(79)=3.118$, $p=0.003$). No differences were observable between the TEP of the two groups when stimulated over the L-PPC (all ps>0.05) (FIG. 2F).

Time/Frequency-Domain Analysis

Figure 3A:
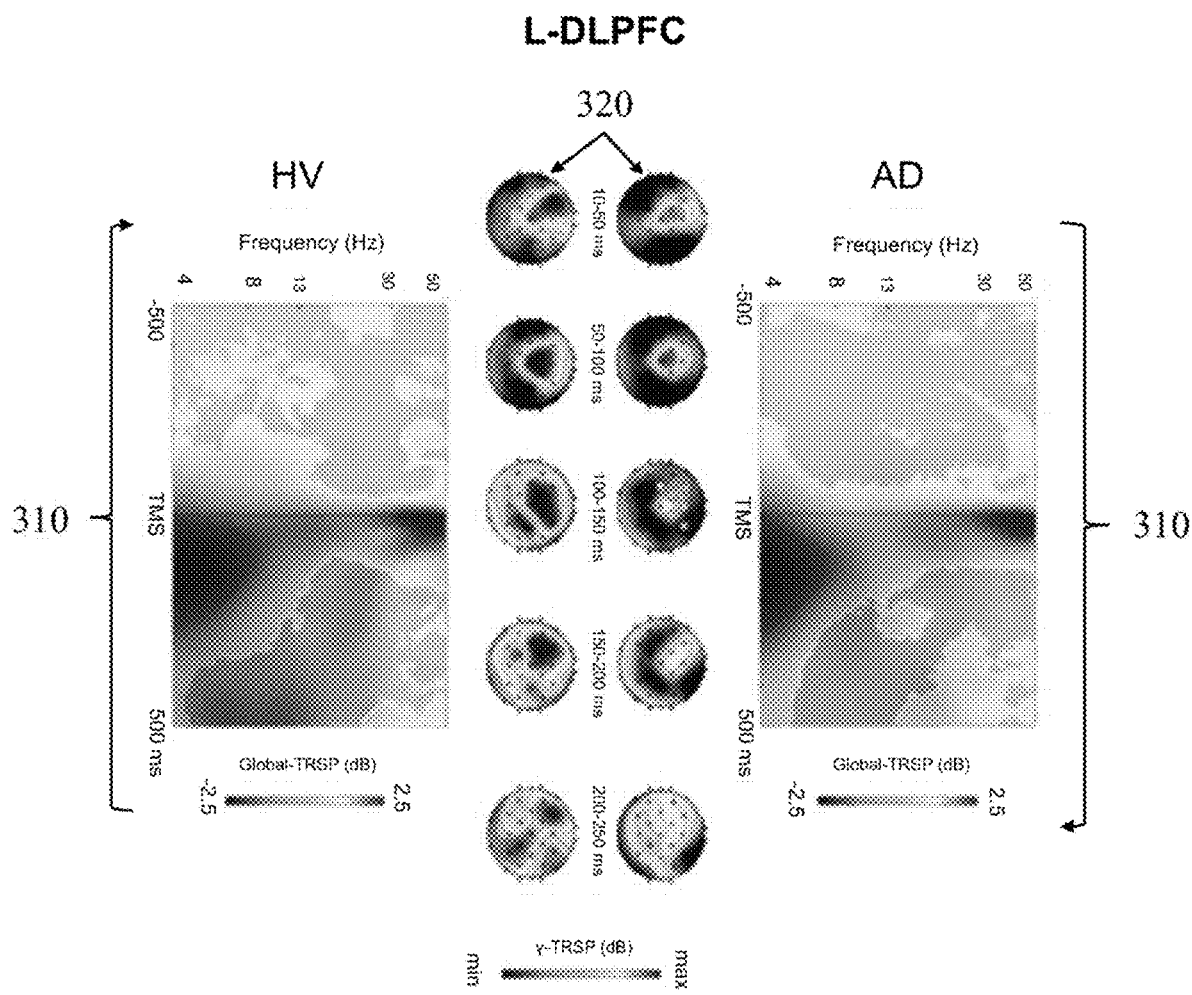
FIG. 3A illustrates a spatio-temporal reconstruction of TRSP recorded over all the scalp after stimulation of L-DLPFC.
Figure 3B:
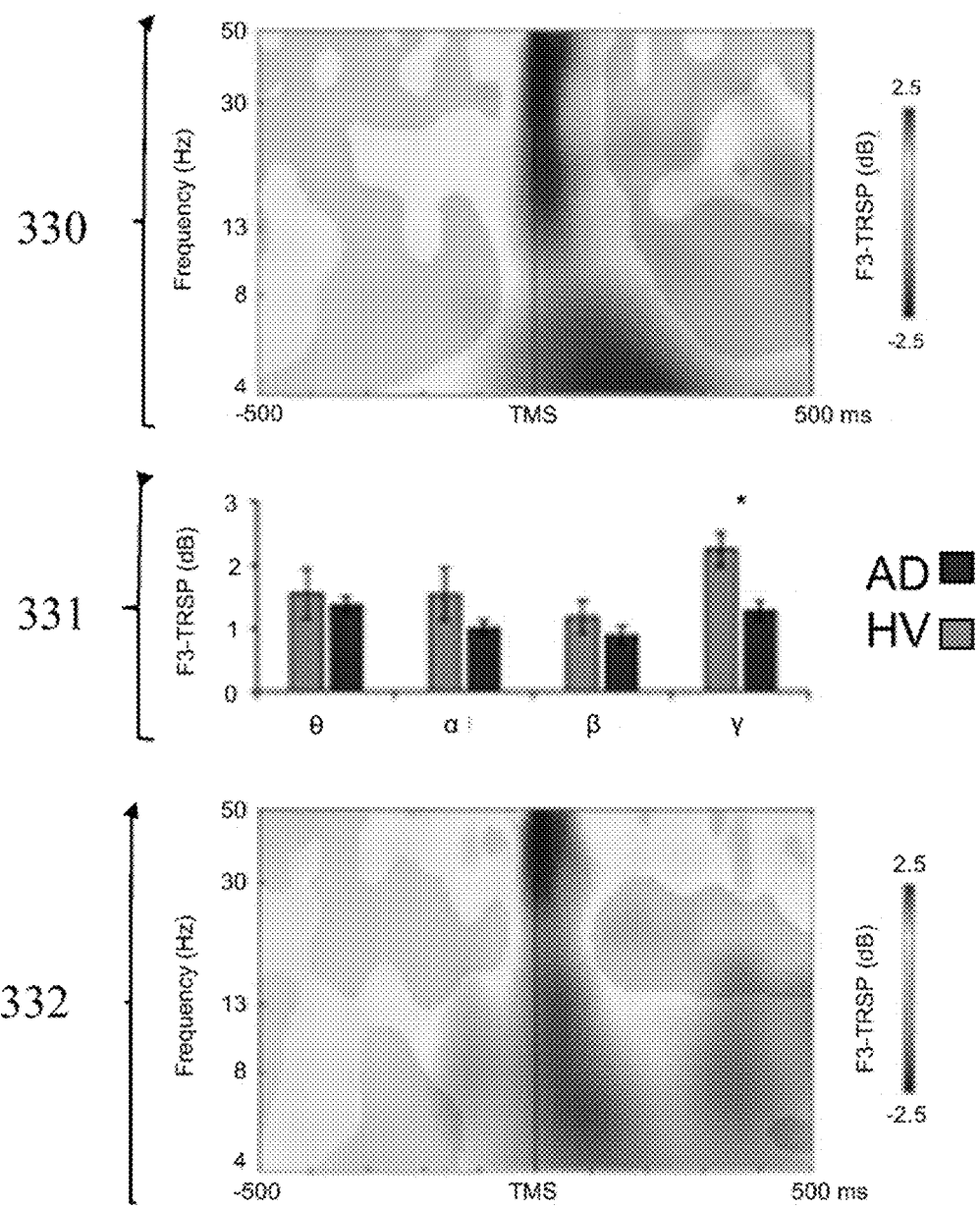
FIG. 3B shows graphical analysis of TRSP at the local level for local oscillatory activity of the stimulated area and natural frequency for L-DLPFC stimulation.
Figure 3C:
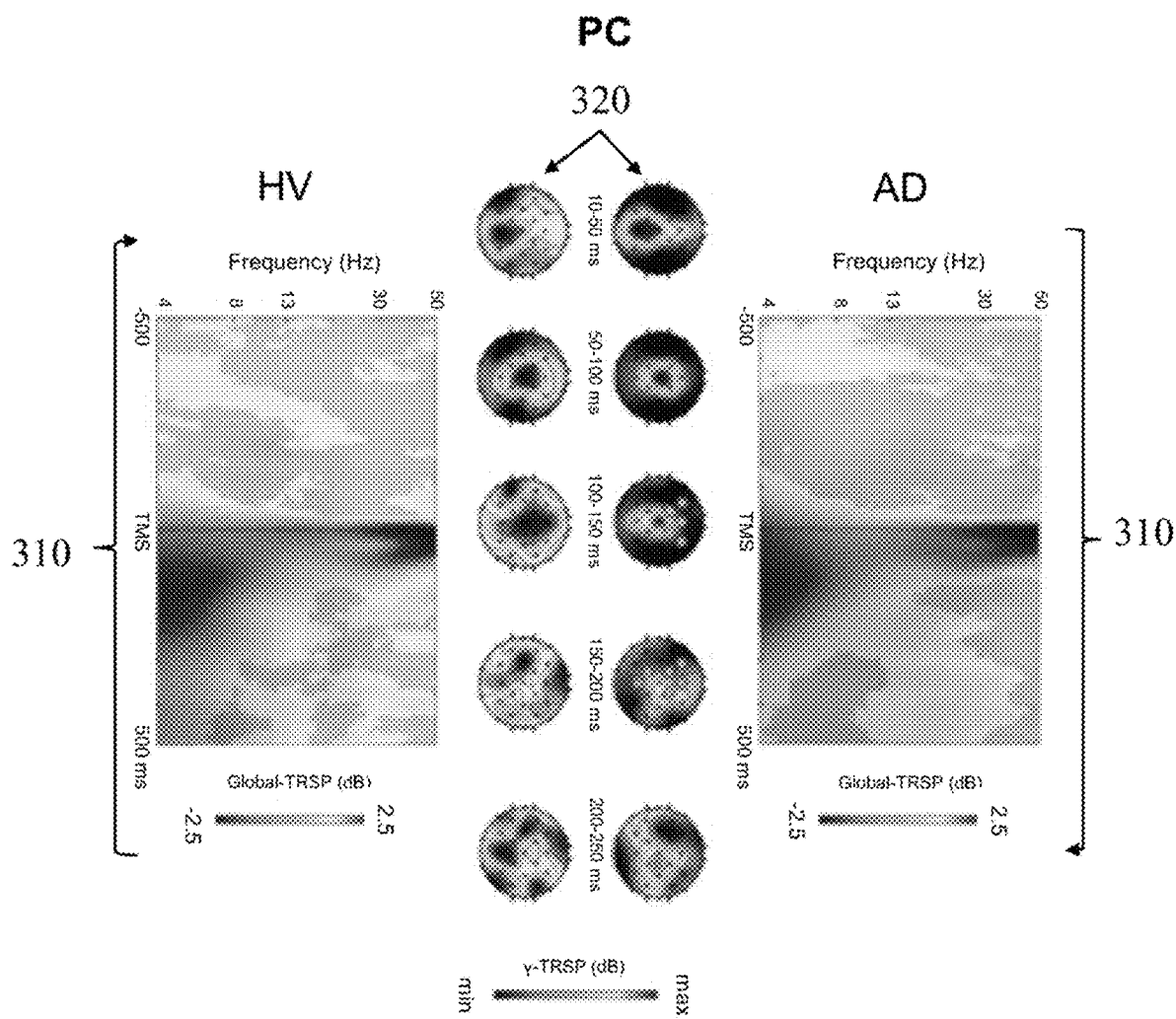
FIG. 3C illustrates a spatio-temporal reconstruction of TRSP recorded over all the scalp after stimulation of PC.
Figure 3D:
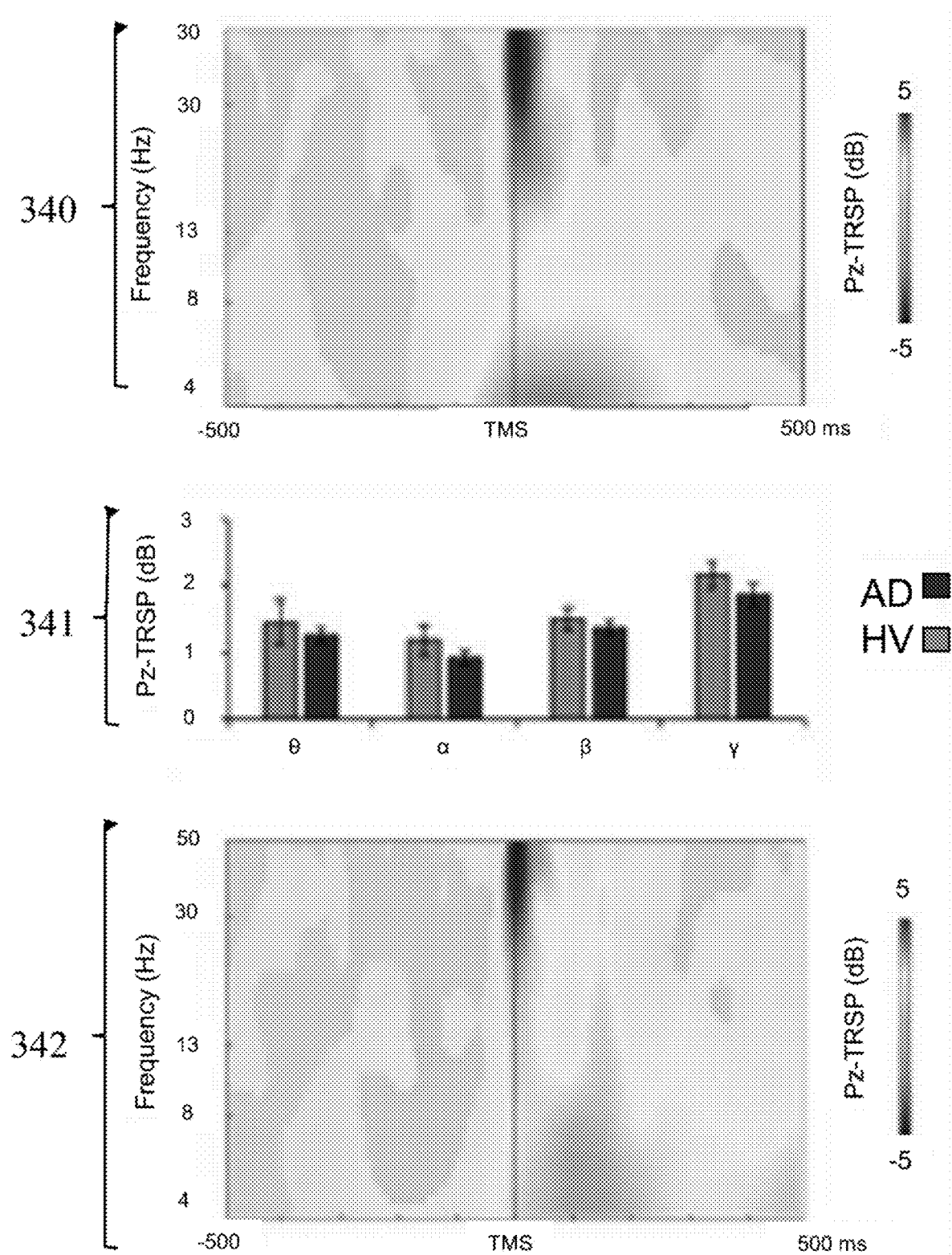
FIG. 3D shows graphical analysis of TRSP at the local level for local oscillatory activity of the stimulated area and natural frequency for PC stimulation.
Figure 3E:
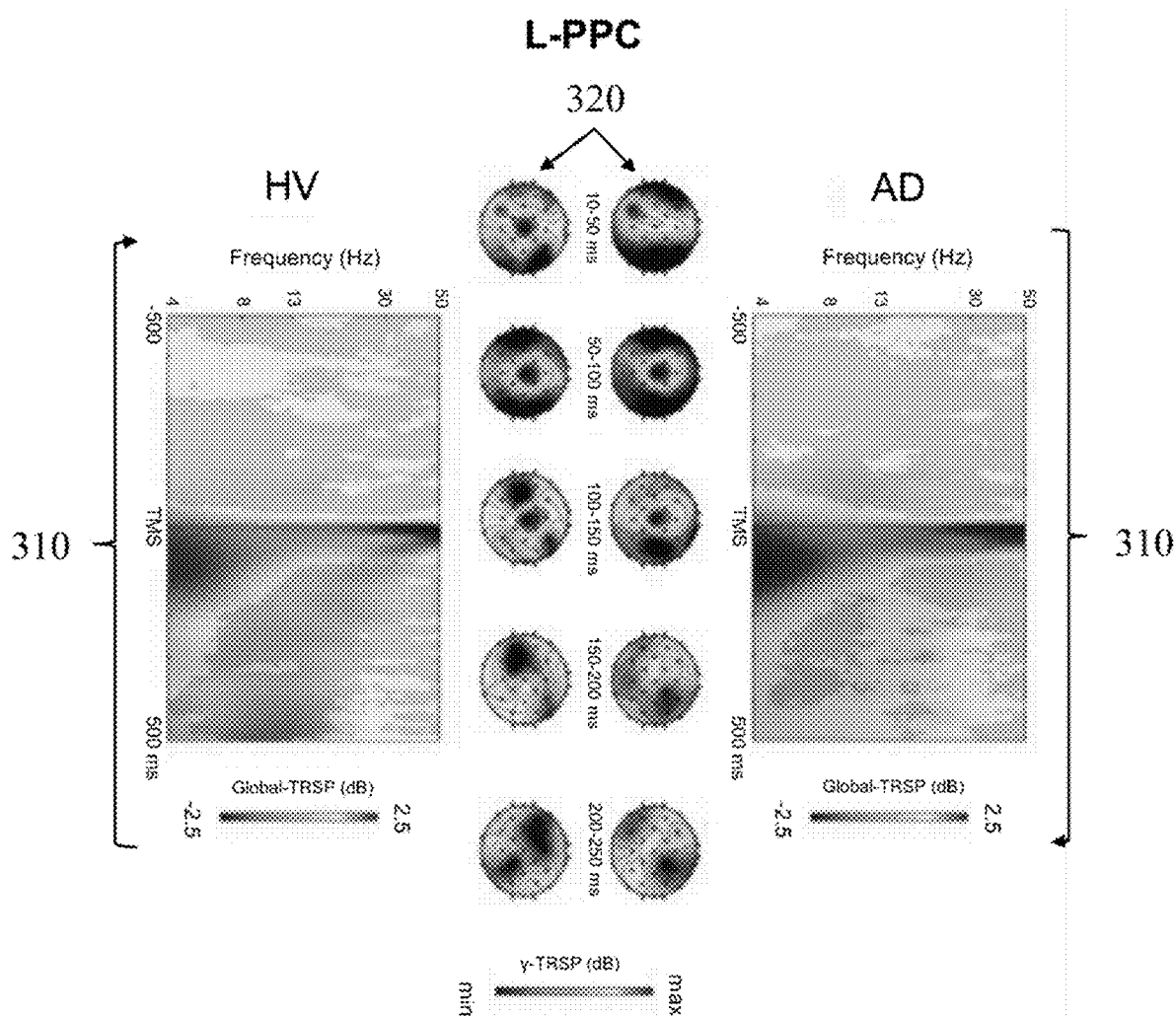
FIG. 3E illustrates a spatio-temporal reconstruction of TRSP recorded over all the scalp after stimulation of L-PPC.
Figure 3F:
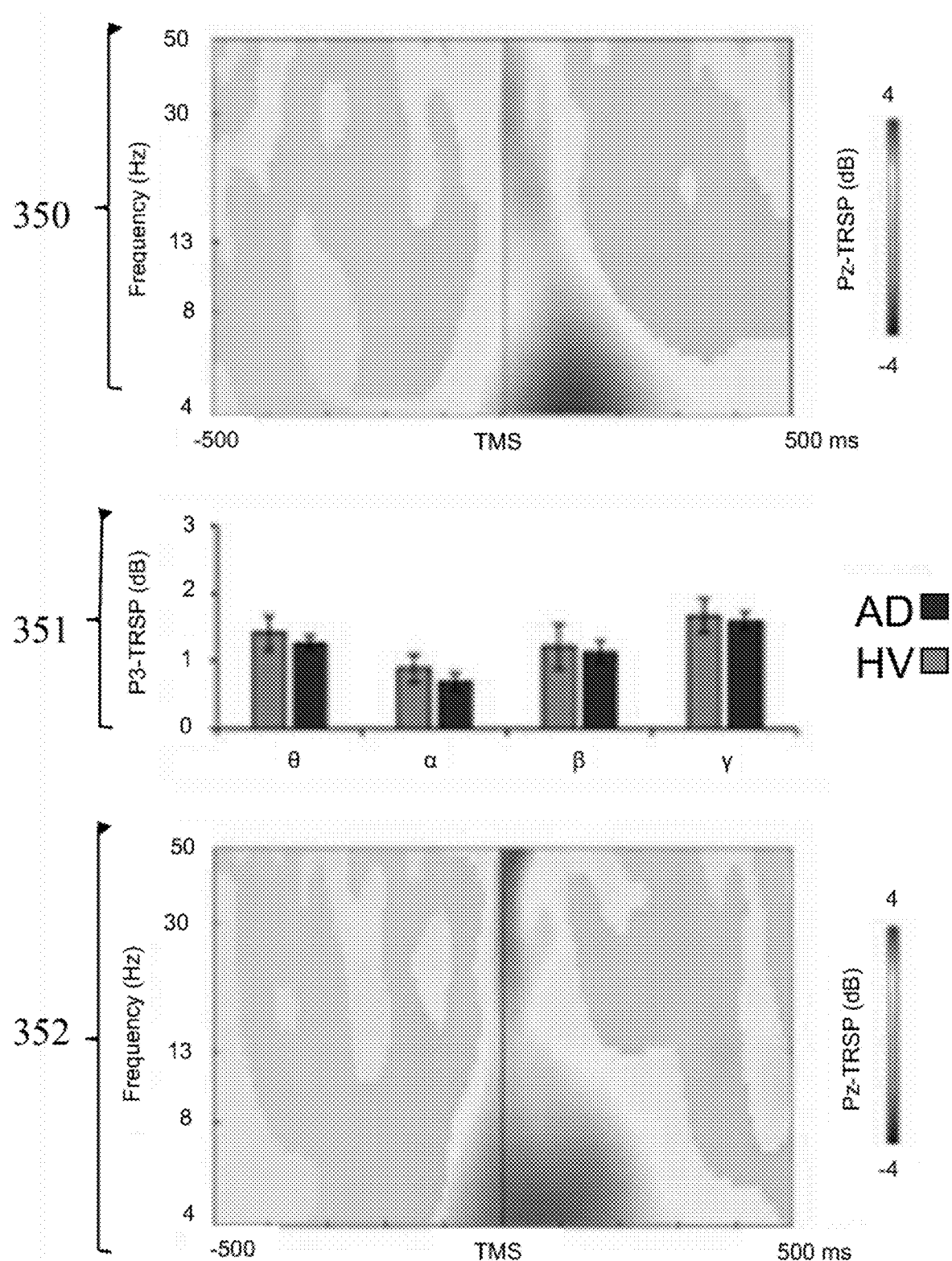
FIG. 3F shows graphical analysis of TRSP at the local level for local oscillatory activity of the stimulated area and natural frequency for L-PPC stimulation.

FIGS. 3A, 3C, and 3E shows time/frequency brain dynamics at global and FIGS. 3B, 3D, and 3F show the corresponding local level after TMS. FIG. 3A depicts the global TMS-related spectral perturbation (TRSP) 310 and the scalp maps 320 of the $\gamma$ activity after TMS of the L-DLPFC and FIG. 3B depicts the corresponding TRSP recorded over L-DLPFC, when stimulated in the AD 330 group and in the HV group, 332. FIG. 3C depicts the global TMS-related spectral perturbation (TRSP) 310 and the scalp maps 320 of the $\gamma$ activity after TMS of the PC and FIG. 3D depicts a bar graph of the corresponding TRSP recorded over PC when stimulated in the AD group 340 and in the HV group 342. FIG. 3E depicts the global TMS-related spectral perturbation (TRSP) 310 and the scalp maps 320 of the $\gamma$ activity after TMS of the L-PPC and FIG. 3F depict the corresponding TRSP recorded over L-PPC when stimulated in the AD group 350 and in the HV group 352. Error bars indicate standard error. * indicates p<0.05.

FIGS. 3A, 3C and 3E show the spatio-temporal reconstruction of TRSP 310 recorded over all the scalp after stimulation of the L-DLPFC (FIG. 3A), PC (FIG. 3C) and L-PPC (FIG. 3E). Regardless of the site of stimulation, single-pulse TMS resulted in a sustained oscillatory activity lasting about 250 ms that showed a first prominent activation in the beta/gamma band lasting around 80 ms, and a subsequent activity in the alpha/theta band lasting around 250 ms. When analyzed at local level, the prominent oscillatory activity, e.g., the natural frequency, was different depending on the stimulated site.

Analysis of TRSP at the global level was conducted to assess differences in cortical oscillatory activity throughout all the scalp between the AD and the HV group. When stimulated over the L-DLPFC (FIG. 3A), AD patients showed a lower gamma-frequency (30-50 Hz) activity evoked from 100 to 150 ms after the TMS pulse, in a cluster of six frontal bilateral electrodes (Monte Carlo ps<0.01). When stimulated over the PC (FIG. 3C), AD patients showed a lower gamma-frequency (30-50 Hz) activity evoked from 100 to 150 ms after the TMS pulse, in a cluster of five frontal bilateral electrodes (Monte Carlo ps<0.01), and from 150 to 200 ms after the TMS pulse, in two clusters of four frontal electrodes and two posterior medial electrodes (Monte Carlo ps<0.01). Stimulation of L-PPC (FIG. 3E) did not produce any difference in the oscillatory activity of the two groups (all ps>0.05).

Analysis of TRSP at the local level was conducted to assess the local oscillatory activity of the stimulated area (FIGS. 3B, 3D and 3F) and to measure its natural frequency. When stimulated over the L-DLPFC the local level oscillatory activity chart at F3 331 depicts that the AD patients showed a lower local gamma activity compared to the HV group (AD: 1.283±0.143 dB, HV: 2.243±0.267 dB; t(79)=−2.977, p=0.004), whereas the other frequency bands did not differ between the two groups (all ps>0.05). When stimulated over the PC and the L-PPC the corresponding local level oscillatory activity chart at Pz 341 and at P3 351 depicts that the AD patients did not show any difference in oscillatory activity compared to the HV group (all ps>0.05).

Figure 4:
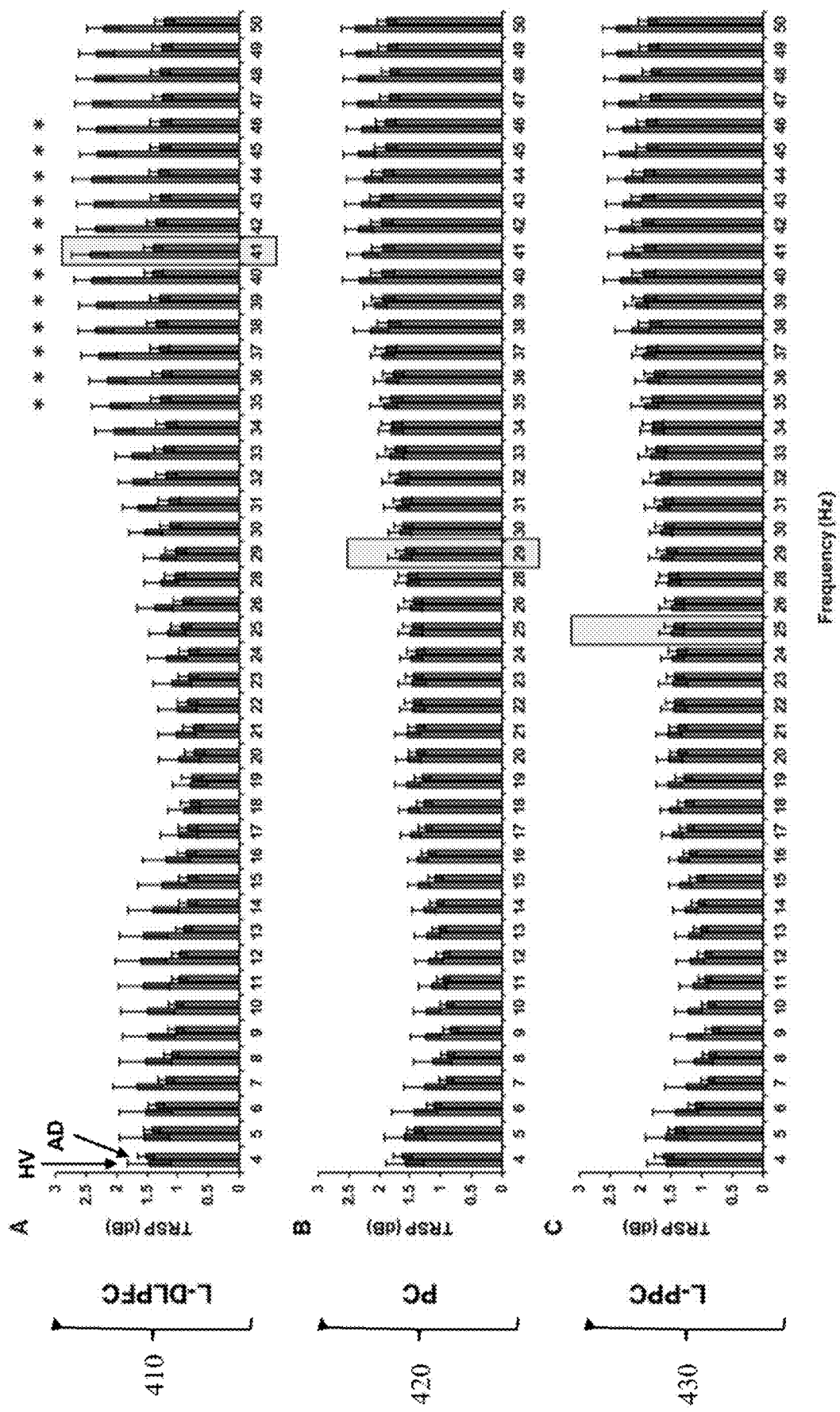
FIG. 4 shows graphical analysis for the spectral power (4-50 Hz) in the AD brain, and the spectral power evoked in the HV brain using TMS at the L-DLPFC, PC and L-PPC.

FIG. 4 shows the specificity of reduced gamma activity in the prefrontal lobe of AD patients. TMS-related spectral perturbation evoked by TMS of the L-DLPFC 410, PC 420 and L-PPC 430. First bars of each pair depict the spectral power (4-50 Hz) in the AD brain, second bars depict the spectral power evoked in the HV brain. Light grey boxes indicate the natural frequency of each area. Error bars indicate standard error. * indicates p<0.05.

FIG. 4 shows the TRSP mean value for each of the 46 frequency layers analyzed after stimulation of the three areas. Stimulation of L-DLPFC 410 resulted in a natural frequency of 40.8 Hz for both groups. When compared with HV, the AD group showed a lower local oscillatory activity from 35 to 46 Hz, thus comprising also the natural frequency of 40.8 Hz (mean p-value=0.006). Stimulation of PC 420 and L-PPC 430 resulted in a natural frequency of 29.8 Hz for both groups. When compared with HV, the AD group did not show any difference in the local oscillatory activity in any of the layers considered (all ps>0.05).

Linear Relation Between Clinical and Neurophysiological Measures

FIG. 5 shows scatterplots depicting the linear relation between the natural frequency of L-DLPFC (x-axis) and the clinical scores change after 24 weeks from the first evaluation (y-axis) at the Clinical Dementia Rating Scale Sum of Boxes (CDR) 510; Neuropsychiatric Inventory (NPI) 520; Alzheimer's Disease Cooperative Study—Activities of Daily Living (ADC-ADL) 530; The Alzheimer's Disease Assessment Scale-Cognitive Subscale (ADAS-Cog) 540.

Multiple stepwise regression analysis showed that the linear model significantly predicted clinical progression, as tested with CDR 510, when stepwise algorithm included the two predictors, i.e. natural frequency of DLPFC and of PC (CDR 510: Model 1: R2=0.410, p=0.012; NPI 520: Model 1: R2=0.417, p=0.007; ADCS-ADL 530: Model 1: R2=0.328, p=0.049; ADAS-COG 540: Model 1: R2=0.391, p=0.014), and one, i.e. DLPFC natural frequency (CDR 510: Model 2: R2=0.410, p=0.003; NPI 520: Model 2: R2=0.417, p=0.002; ADCS-ADL 530: Model 2: R2=0.305, p=0.022; ADAS-COG 540: Model 2: R2=0.356, p=0.008) (FIG. 5). Backward selection of coefficients revealed that DLPFC natural frequency was shown to be one of the best predictor for the general clinical progression.

Example Case 3

Response to Electromagnetic Perturbation as a Marker of Protein Clearance, Neuroinflammation and Altered Cognition in Patients with Alzheimer's Disease Background and Rationale Evidence from both animal and human studies suggest that enhanced neuronal excitability might represent an early distinctive feature of Alzheimer Disease. Hyperexcitability has been shown to even precede AD causative pathophysiological alterations, such as accumulation of amyloid plaque and inflammation. However, the relationship between altered cortical excitability, cognitive performance and biomarker of AD pathology and inflammation has not been extensively explored yet. Co-registration of Transcranial Magnetic Stimulation (TMS) and TMS-induced evoked responses through electroencephalography (TMS-EEG) was used to quantitatively measure cortical excitability and brain oscillatory activity in vivo in patients with AD and verify the possibility of extracting TMS-EEG markers of brain neuroinflammation and protein clearance in patients. TMS-EEG was performed in patients with AD together with amyloid (Aβ1-40 and Aβ1-42), p-tau and inflammation (IL-6, IL-10, IL-17 and TNFα) biomarkers collected before the TMS-EEG session.

In this example, a time and frequency domain analysis of 14 AD patients' TMS-EEG Evoked Potential (TEPs) was performed with the aim of exploring the relationship between TEPs, cognition and neurodegeneration and inflammation blood biomarkers. Stimuli were delivered over three different neuro-navigated cortical sites, namely the left primary motor area (L-M1), the right dorsolateral prefrontal cortex (R-DLPFC) and the right occipital cortex (R-OC). Patients underwent an extensive neuropsychological evaluation at baseline. Blood amyloid (Aβ1-40 and Aβ1-42), p-tau and inflammation (IL-6, IL-10, IL-17 and TNFα) biomarkers were collected prior to TMS-EEG registration.

Methods and Sample

Patients with mild to moderate dementia due to AD were enrolled for the study. The inclusion criteria were: demonstration or history of memory impairments, Mini Mental State Examination (MMSE)≥18 (Mild AD≥21, Moderate AD=18-20), and Clinical Dementia Rating (CDR)≥0.5. Participants underwent a baseline assessment completed over 5-7 days. The baseline assessment included: i) neuropsychological evaluation; ii) blood sample collection for the evaluation of neurodegeneration and neuroinflammatory biomarkers; iii) intermittent theta-burst stimulation (iTBS) for LTP-like (long-term potentiation) plasticity assessment; iv) resting-state EEG (rsEEG); and v) a session of TMS-EEG co-registration. iTBS, rsEEG and TMS-EEG sessions were held on three different days in order to avoid potential biases. All participants gave written informed consent.

Cognitive and Biomarkers Assessment

Participants underwent a baseline cognitive assessment evaluating global functioning [Alzheimer's Disease Assessment Scale-Cognitive Subscale—ADAS-Cog, Mini-Mental State Examination—MMSE, Montreal Cognitive Assessment—MoCA]; verbal/episodic memory and learning status [Rey Auditory Verbal Learning Test—RAVLT, Craft Story 21 Recall Immediate and Delayed, Number Span Test Forward and Backward]. Blood samples were collected at baseline and peripheral concentrations of Aβ1-40, Aβ1-42 and p-tau were assessed. Blood BDNF concentration and Levels of peripheral cytokines IL-6, IL-10, IL-17A, and TNFα were also evaluated.

TMS-EEG Assessment

A figure-of-8 coil oriented at a 45 degrees angle from the midline was used to apply TMS to three cortical sites. T1-weighted MRI volumes were used as a positional reference and the coil was placed on top of the target areas. Participants sat in a comfortable chair and were asked to stay still and alert during the visit. Stimulation intensity was determined based on individual resting motor threshold (RMT), defined as the minimum stimulus intensity that produces a motor evoked potential (MEP) of at least 50 μV in at least 5 out of 10 trials. Stimulation intensity was set at 120% of RMT using a figure-of-8 coil. Blocks of single TMS pulses were delivered with an inter-stimulus interval of 1 to 4 seconds. EEG activity from the scalp was recorded during the TMS protocol with a TMS-compatible 64 channels (Ag/AgCl electrodes) EEG headset mounted on an elastic cap.

Results

Cognitive Performance Indicators

Figure 6:
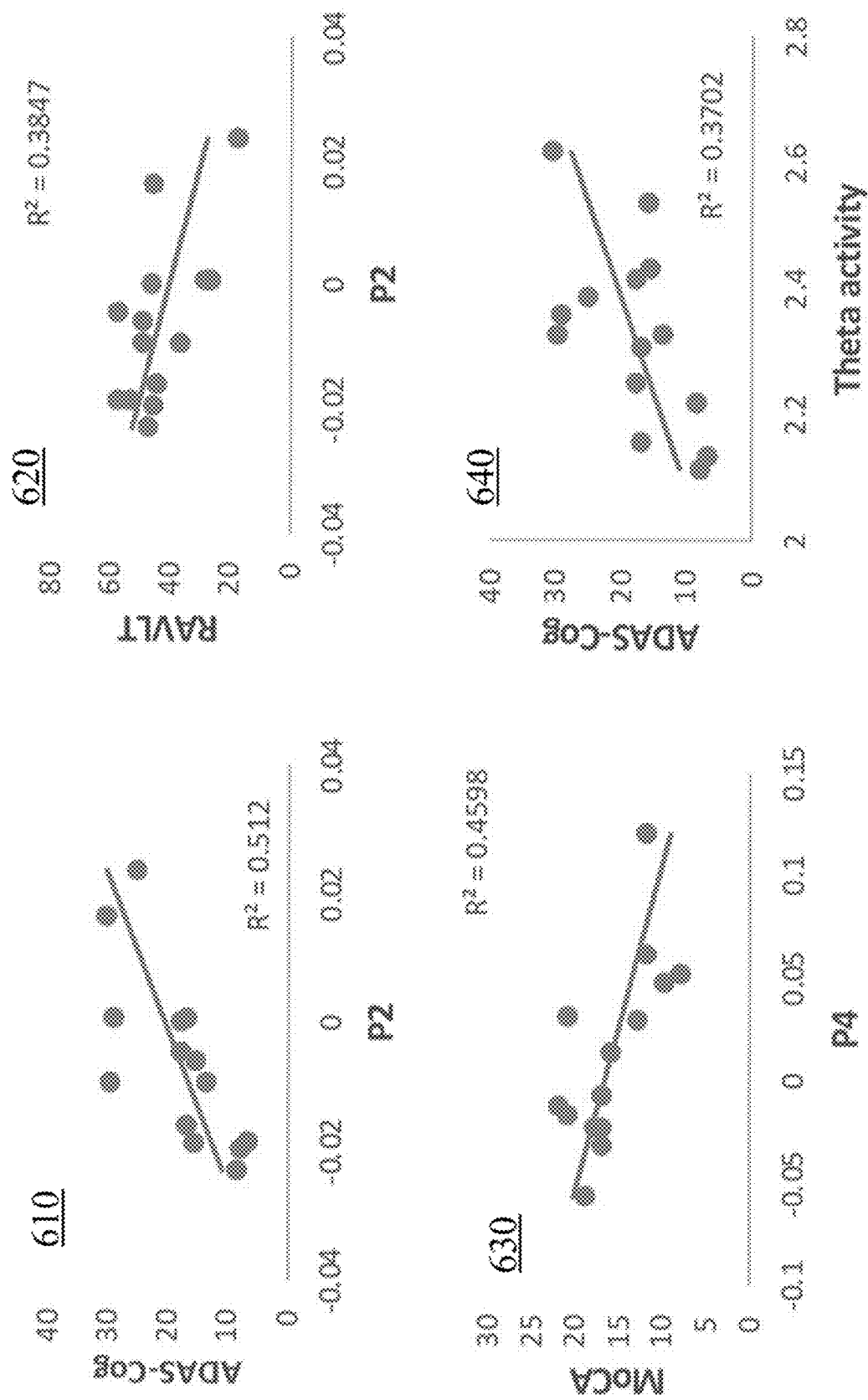
FIG. 6 shows graphical analysis of linear regression between TMS-EEG features and patients' cognitive performance.

FIG. 6 shows results of linear regression between TMS-EEG features and patients' cognitive performance. Univariate regression analysis of time-domain, global TEP extracted features and cognitive performance indicators revealed a positive linear correlation between ADAS-Cog score and peak amplitude of the second TEP peak (P2) 610, as well as a negative correlation between the same TEP component and the RAVLT score 620 after stimulation of the right DLPFC. Moreover, P4 peak amplitude over the right temporal lobe showed to be correlate positively with ADAS-Cog score and negatively with MoCA score 630 after stimulation. Finally, RAVLT score showed a negative correlation with left centro-parietal P2. Interestingly, all the aforementioned results were statically significant after adjusting for the normalized, induced electric field computed via biophysical modeling. Frequency-domain analysis of the TEP revealed a positive correlation between ADAS-Cog score and global theta power 640 after stimulation.

Blood Biomarkers of AD Pathology

Figure 7:
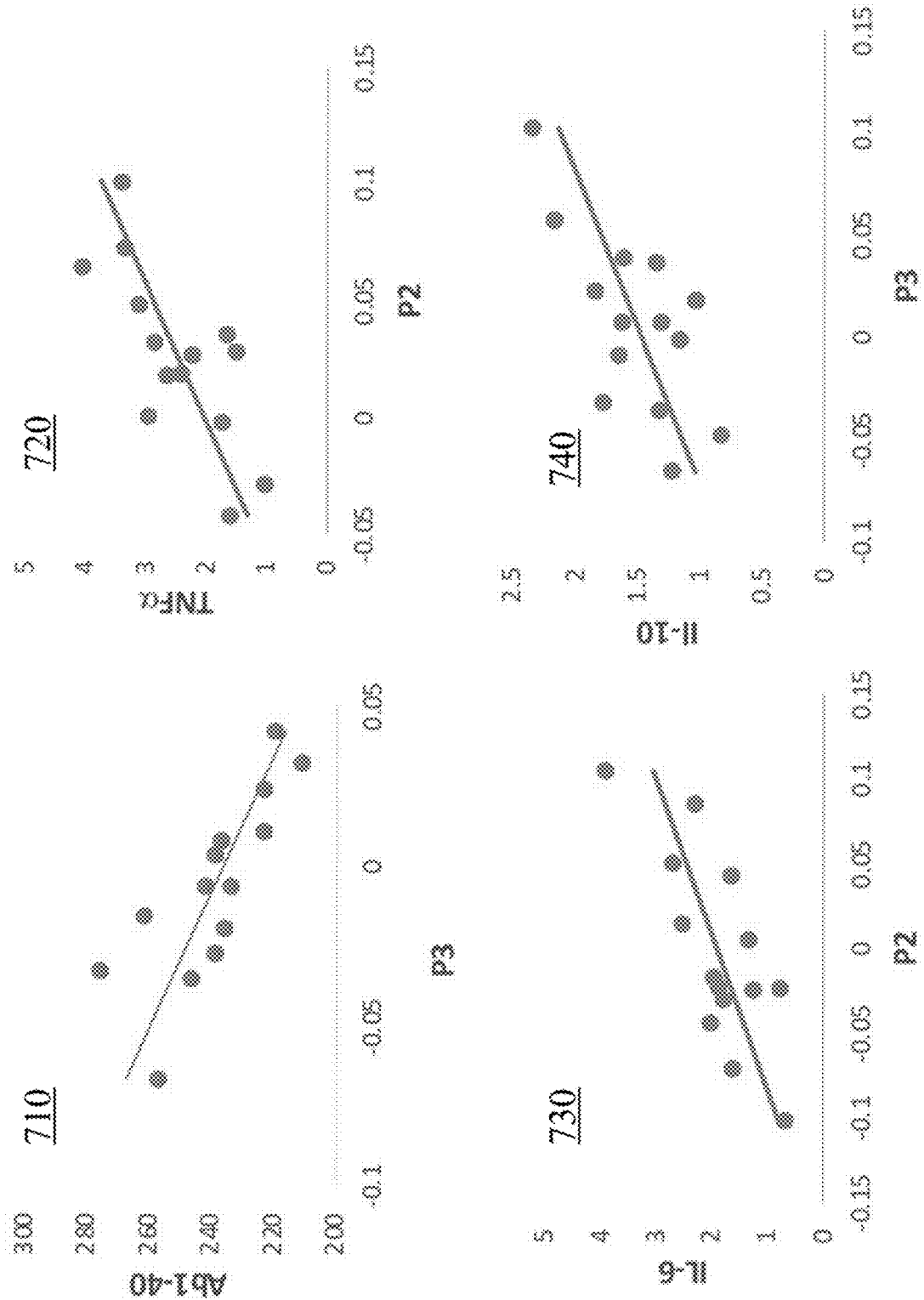
FIG. 7 shows graphical analysis of linear regression between TMS-EEG features, amyloid-β and pro-inflammatory cytokines plasmatic levels.

FIG. 7 shows results of linear regression between TMS-EEG features, amyloid-β and pro-inflammatory cytokines plasmatic levels. Linear regression of time-domain, local TEP extracted features and blood biomarkers of AD pathology showed an inverse correlation between plasmatic concentration of Aβ1-40 710 with P3 peak amplitude over the left frontal lobe, right centro-parietal regions and temporal lobes after stimulation of DLPFC. These findings remained significant after controlling for the induced electrical field as a covariate to the regression model.

Blood Biomarkers of Neuroinflammation

Several global and local TEPs features showed significant correlations with blood biomarkers of inflammation. More specifically, IL6 730 and TNFα 720 levels showed to positively correlate with P2 peak amplitude over the left centro-parietal regions and temporal lobe regions after stimulation as shown in FIG. 7. Analogously, IL-6, IL-10 740 and TNFα showed a positive correlation with the latest TEPs peak amplitude (P3, P4) over the bilateral centro-parietal regions and temporal lobe regions after stimulation of both frontal and parietal areas (FIG. 7). All the aforementioned results were statically significant after adjusting for the normalized induced electric field.

Example Case 4

Combined Transcranial Magnetic and Electrical Stimulation for the Assessment and Enhancement of Long Term Associative Memory in Patients with Alzheimer's Disease Sample 41 young healthy participants were recruited. The sample size was estimated based on the previous experiment conducted by our group having a similar paradigms. We enrolled 24 participants in experiment 1, considering the drop-out probability due to the large number of sessions required for each subject (i.e., 4). 10 participants were enrolled in experiment 2 to replicate experiment 1 and investigate the long-term effects. 18 participants, 10 of them already recruited in experiment 1, were involved in both experiment 3 and 4.

TMS and tACS safety guidelines and medical regulations were fully followed. In addition to the criteria pointed out by the safety guidelines (i.e., history of seizure, metal implant in the head, implanted electronic device, etc.), left-handedness, claustrophobia, psychotropic medication, current or past psychiatric or neurological disorders, were considered as exclusion criteria. Inclusion criteria included participants native or fluent in Italian and normal or corrected-to-normal vision and hearing.

Procedure

Figure 9A:
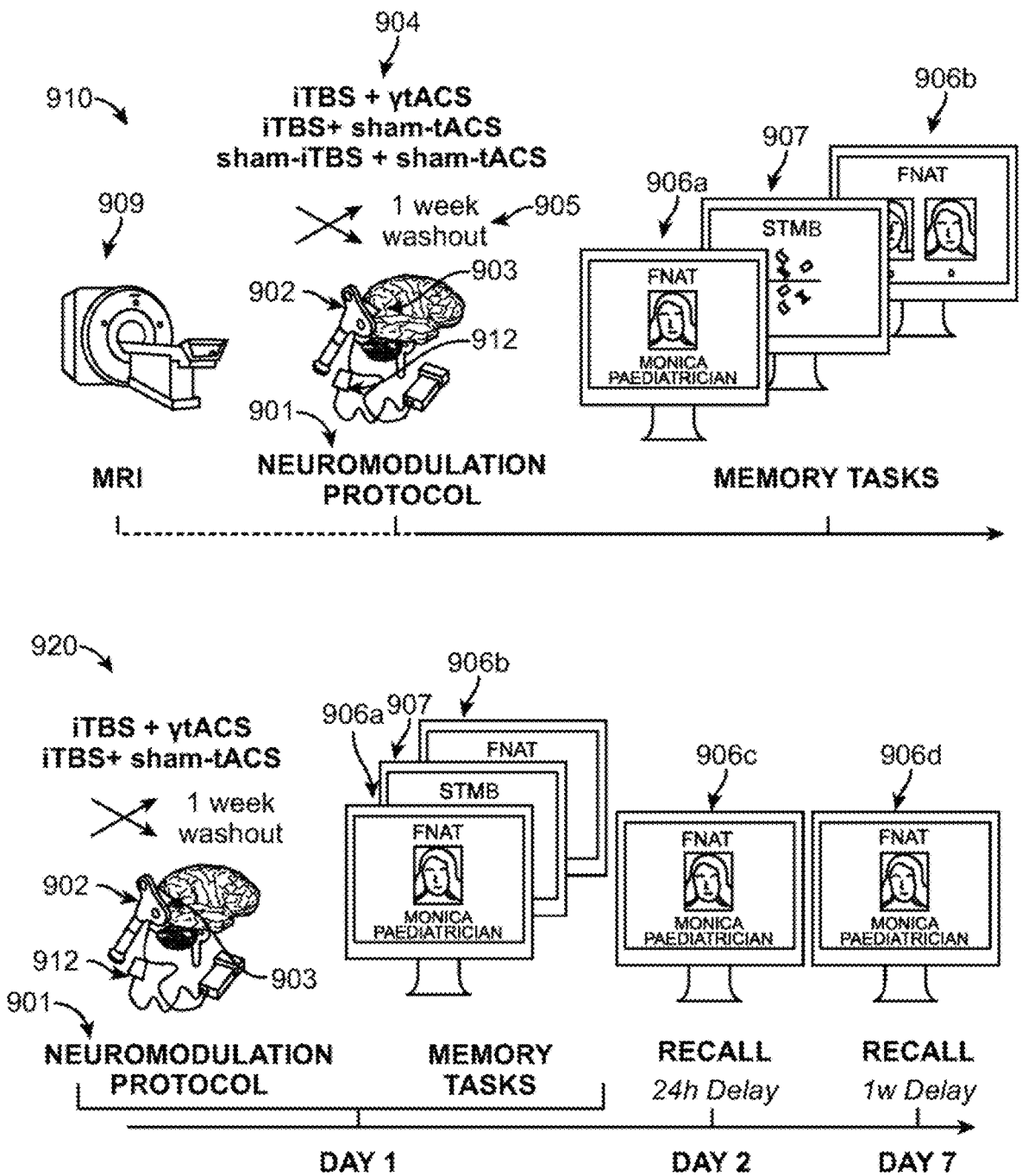

FIG. 9 illustrates an exemplary procedure for testing combined transcranial magnetic and electrical stimulation for the assessment and enhancement of long-term associative memory in patients with Alzheimer's Disease comprising at least 4 experiments 910, 920, 930, and 940.

Experiment 1 910, Investigated iTBS+γtACS co-stimulation behavioral effects by studying memory performances changes in two memory tasks. Participants first underwent MRI scanning 909 to individualize the stimulation sites and permit neuronavigation, then they were involved in a crossover design with three experimental sessions of neuromodulation 904 separated by a washout week 905. Every session of the experimental sessions 904 corresponded to a different balanced and randomized stimulation condition (i.e., iTBS+γtACS, iTBS+sham-tACS, sham-iTBS+sham-γtACS) immediately followed by two memory tasks (see 'memory tasks' paragraph): the Face-name associative task (FNAT) (e.g., 906a-906d) and the visual Short-term memory binding test (STMB) 907.

Experiment 2 920. Deepened the study of the behavioral effects investigating the long-term changes in memory performances, simplifying the experimental design to have two experimental sessions 904 by eliminating the control condition 'sham-iTBS+sham-γtACS' which did not exert any effect, as demonstrated in experiment 1 910. Indeed, participants were involved in a cross-over design with two experimental sessions 904 corresponding to a different balanced and randomized stimulation conditions (i.e., iTBS+γtACS, iTBS+sham-tACS) separated by a washout week 905. In each session 904, participants were required to attend three experimental testing sessions. During the first testing session (day 1), participants received the neuromodulation protocol 901 and then performed the FNAT 906a, 906b without the recognition phase and the STMB 907. In the second testing session (day 2), participants performed the FNAT recall with a 24-hours delay 906b from the neuromodulation protocol 901, while in the third testing session (day 7), participants performed the FNAT recall 906*d* and recognition with a 1-week delay from the neuromodulation protocol 901. Recognition trial was administered just on the third session to avoid a learning bias over day 2 and day 7 cued recall.

Experiment 3 930. We investigated the neurophysiological effects of the neuromodulation protocol 901 through the combined use of TMS-EEG 908. As for experiment 1 910, participants underwent an MRI 909 scanning to individualize the stimulation sites and permit neuronavigation. They were then involved in two randomized and balanced experimental sessions 904 of neuromodulation (i.e., iTBS+γtACS, iTBS+sham-tACS) separated by a washout week 905. TMS-EEG 908 recordings were performed before (T0), immediately after (T1), and 20 minutes after (T2) the neuromodulation protocol 901.

Experiment 4 940. We investigated the functional connectivity effects of the neuromodulation protocol 901 through fMRI scanning 911. After the first MRI scanning 909 needed for neuronavigation, participants were involved in two randomized and balanced experimental sessions 904 of neuromodulation (i.e., iTBS+γtACS, iTBS+sham-tACS) separated by a washout week 905. The fMRI scanning 911 was performed before (T0) and immediately after (T1) the neuromodulation protocol 901.

iTBS-γtACS Neuromodulation Protocol

The co-stimulation consisted of a combination of iTBS and tACS delivered in the gamma band (γtACS) based on previous studies. The neuromodulation protocol 901 was delivered on the individual PC, based on the individual resting state structural 909 and functional MRI 911 (see 'MRI data acquisition and preprocessing' paragraph) targeted with a stereotaxic neuronavigation system. The active tACS electrode (anode) 903 was placed on the scalp with the iTBS coil 902 above it, and the other tACS electrode (cathode) 912 was placed over the shoulder's right muscle.

tACS was delivered through a multifunctional system for low-intensity transcranial electrical stimulation and saline-soaked sponge electrodes (7.5 cm2). γtACS sinusoid frequency wave was set at 70 Hz with an intensity of 1 mA for a total duration of 190*s*.

iTBS was delivered through a figure-of-eight coil 902 (70 mm). iTBS consisted of ten bursts of three pulses at 50 Hz lasting 2 s, repeated every 10 s with an 8 s pause between consecutive trains, for a total of 600 pulses total lasting 190 s. Stimulation intensity for iTBS was set at 80% of the active motor threshold (AMT), defined as the lowest intensity able to produce approximately 200 μV motor evoked potentials (MEPs) in at least five out of ten trials when the participant performed a 10% of maximum contraction using visual feedback. AMT was tested over the first dorsal interosseous hotspot of the primary motor cortex (M1) in the left dominant hemisphere, with the tACS electrode 903 under the coil 902 to guarantee the same scalp-coil distance of the neuromodulation protocol. Electromyographic activity was recorded from the contralateral FDI muscle, using two Ag-AgCl surface cup electrodes (9 mm) in a belly-tendon montage.

Sham stimulation conditions were implemented to control the individual contribution of the techniques and the placebo effect. tACS sham condition were implemented applying only a 2 s ramp up and 2 s ramp down, to give the participant real stimulation feelings. iTBS sham condition were implemented by adding a wood layer under the coil.

Memory Tasks

Face-name associative task (FNAT). The first task ran, both in experiments 1 910 and 2 920, was FNAT, a cross-modal associative memory test that requires participants to pair pictures of unfamiliar faces with common first names and occupations. For the present study, FNAT 906 was adapted creating three parallel forms by taking pictures from an online dataset (FACES) and associating them with Italian names and occupations. Two versions of the task were used: the first, implemented in experiment 1 910, consisted in a learning phase followed by an immediate cued recall 906*a* and a 15-minute delayed cued recall 906*b* with recognition; the second, implemented in experiment 2 920, consisted in a learning phase, an immediate cued recall 906*a* and a 15-min delayed recall 906*b* on the day 1, a 24-hours delayed cued recall 906*c* on day 2, and a 1-week delayed cued recall 906*d* with recognition on day 7.

The learning phase consisted in showing for a time period (e.g., up to 8 seconds or less than 8 seconds) on a PC screen twelve faces associated with a name and an occupation and instructing participants to read aloud the name and the occupation, to ensure their attention was focused on the items, and to memorize the face-name-occupation association. Just after the learning phase occurred the immediate cued recall, during which participants were asked to recall the name and the occupation of each face again showed for 8 s. The delayed cued recall consisted in showing the previously shown faces and asking participants to say aloud the name and the occupation of each face. Finally, during the recognition trial, participants had first to recognize the studied face from another distractor face matched for age and sex. Then, for those names and/or occupations not correctly recollected on the previous delayed cued recall, they had to identify the correct name and/or occupation among three alternatives each, where the distractors were a novel name/occupation and a name/occupation associated with a different face.

We derived three accuracy indexes for each task phase i.e., immediate cued recall 906*a*, delayed cued recall 906*b*, and recognition for experiment 1 910; immediate cued recall 906*a*; delayed cued recall 906*b* (day 1); 24-hours delayed cued recall 906*c* (day2); 1-week cued recall and recognition 906*d* (day7): sum of names recalled or recognized/12×100; sum of occupations recalled or recognized/12×100; sum of items totally recalled or recognized/12×100 (i.e., both name and occupation recalled/recognized).

The Short-Term Memory Binding test (STMB). This test was run between the FNAT immediate cued recall 906*a* and the 15-min delayed cued recall 906*b*. STMB 907 is a recognition task relying on a change detection paradigm which requires participants to remember visual arrays of three black shapes (shape only condition) or colored shapes (shape-color binding condition) presented for a time period (e.g., at least 2 seconds or less than 2 seconds) (study phase). After a 1-second delay where a blank screen is presented (retention interval), a display with the same or different items appears in new random locations on the screen (test phase). Participants were asked to press the "1" button on the keyboard if the items shown in the study and test phase were different (50% of the trials) or to press "2" if they were the same. A total of 32 randomized trials were presented for each condition. Conditions were counterbalanced across participants. Before starting the test, each participant underwent a perception trial where the two arrays of shapes were presented on the same screen, to exclude perceptual deficit and to train participants at the keyboard answers. We derived two accuracy indexes, respectively for the shape-only condition and the shape-color binding condition (total score of each condition/32×100).

TMS-EEG Neurophysiological Assessment

Changes in local cortical oscillations and connectivity were assessed using single-pulse TMS during EEG recordings. During the TMS-EEG 908 assessment, participants sat on a comfortable armchair in a soundproof room, were instructed to fixate a black cross on the wall, and wore in-ear plugs which continuously played a white noise to avoid possible auditory event-related potential responses. The intensity of the white noise was adjusted individually by increasing the volume (always below 90 decibels) until the participant was sure that s/he could no longer hear the TMS-induced click. TMS for EEG 908 recordings was the same stimulator as for the neuromodulatory protocol 901. The stimulated areas were PC and 1PPC. The order of the stimulation areas was counterbalanced across participants. PC and 1-PPC were both identified by the individual resting state structural 909 and functional MRI 911 (see 'MRI data acquisition and preprocessing' paragraph). The coil 902 position was constantly monitored using a neuronavigation system and was differently oriented depending on the area of stimulation so that the direction of current flow in the most effective (second) phase was in a posterior-anterior direction. To target the PC, the coil 902 was positioned with an orientation parallel to the midline, while to target the 1-PPC the coil 902 was positioned with an orientation of 15 degrees from the midline. The single-pulse TMS intensity was set at 110% of the resting motor threshold (RMT), defined as the lowest intensity producing MEPs of >50 µV in at least five out of 10 trials in the relaxed FDI muscle of the right hand. Each TMS-EEG 908 block consisted of 90 single pulses with a randomized inter-stimulus interval (ISI) between 2 and 42.

EEG was continuously recorded from 61 scalp sites positioned according to the 10-20 International System, using TMS-compatible Ag/AgCl pellet electrodes mounted on an elastic cap 913. Additional electrodes were used as a ground and reference: the ground electrode was positioned in Fpz, while the reference was positioned on the tip of the nose. EEG signals were digitized at a sampling rate of 5 kHz. Skin/electrode impedance was maintained below 5 kΩ.

EEG preprocessing. TMS-EEG data were preprocessed offline. Data were segmented into epochs starting 1 s before and 12 after the TMS pulse. TMS pulse artifact was removed and replaced using cubic interpolation, from 1 ms before to 10 ms following the pulse. Afterward, data were downsampled to 1,000 Hz and band-pass filtered between 1 and 80 Hz (Butterworth zero-phase filters). A 50-Hz notch filter was applied to reduce noise from electrical sources. Then, all the epochs were visually inspected and those with an excessively noisy EEG were excluded from the analysis. Independent component analysis (INFOMAX-ICA) was applied to the EEG signal to identify and remove components reflecting muscle activity, eye movements, and blink-related activity, and residual TMS-related artifacts based on previously established criteria. Finally, the signal was re-referenced to the average signal of all the electrodes.

Cortical oscillations. The analysis of cortical oscillations was performed running a time/frequency decomposition based on Morlet wavelet (cycles: 5; frequency resolution: 1 Hz from 4 to 90 Hz) and computing the TMS-related spectral perturbation (TRSP) for theta, alpha, beta, and gamma band. To analyze local oscillatory activity, we computed the average TRSP within the following electrodes cluster: Pz, P1, P2, POz for PC; P3, P5, CP3, PO3 for 1-PPC.

For each time, condition, and stimulated area, we computed the corresponding cluster, and averaged the TRSP values between 10 and 250 ms (since this was the average time window of the spectral perturbation, see 'results' paragraph) in the following frequency bands: theta (4-7 Hz), alpha (8-13 Hz), beta (14-30 Hz), low gamma (31-40 Hz), high gamma (41-90 Hz).

Connectivity. The analysis of connectivity was performed by computing the wavelet phase-locking value (PLV), a phase synchronization index ranging from 0 (complete absence of phase synchronization) and 1 (perfect phase synchronization). To assess the effects of the neuromodulation protocol over DMN connectivity, PLV was computed between the PC cluster (see 'cortical oscillation' section) and a fronto-medial cluster (FM) composed of Fz, AFz, F1, F2. To verify network effects specificity, PLV was also computed over PC and 1-PPC clusters. Every computation was run for each frequency band.

Cortical excitability. was assessed using TMS-evoked potentials (TEPs), computed by averaging all the time-locked EEG responses in each electrode, from 100 ms before to 250 ms after the TMS pulse, with a baseline correction of 100 ms before the TMS pulse. Pz-TEP was computed to assess the local effects of the neuromodulation protocol. Six peaks were determined through an accurate visual inspection of the TEP waveform: P1 from 10 to 25 ms, P2 from 26 to 40 ms, P3 from 41 to 55 ms, P4 from 56 to 65 ms, P5 from 66 to 85 ms, P6 from 86 to 100 ms. The mean TEP amplitude was calculated within each time window.

MRI Data Acquisition and Preprocessing

MRI data were acquired 1) to identify and individualize the stimulation target before each experiment and 2) to assess the neuromodulation protocol effects, before and after the protocol (see 'procedure' paragraph).

The structural imaging session was acquired using high-resolution T1-weighted (T1) anatomical images obtained through a 3D-Tiw sequence (TR=2500 ms, TE=2 ms, T1=1070 ms, flip angle (FA)=8°, thickness=1 mm, imaging matrix=240×240). The fMRI images were acquired using standard echo-planar blood oxygenation level-dependent (BOLD) imaging (TR=3200 ms, TE=25 ms, flip angle (FA)=90°, thickness=2.5 mm, gap=2.5 mm, acquisition duration: 6,46"). Subjects were instructed to not focus their thoughts on any particular topic, to not cross their arms or legs, and keep their eyes open.

For the individualization of the stimulation sites, the functional region of interest (ROI) representing the PC node of the DMN and the L-PPC node of the fronto-parietal network (FPN). A seed-to-voxel correlation map 1200 was computed for each participant, thus obtaining a map of positively and negatively correlated voxels, respectively representing the DMN and FPN. An investigator expert in MRI checked both resting-state functional connectivity (rs-FC) maps and structural MRI data (i.e., T1-weighted images) to identify individual hotspots based on ad hoc criteria. In particular, the stimulation sites were defined as the ones as close as possible to the local maxima of the rs-FC cluster identified as DMN-PC and FPN-PPC being on the top of a cortical gyrus and representing the shortest perpendicular path connecting the stimulating TMS coil 902 on the scalp and the cortex. Based on best judgment, the resulting set of coordinates was picked as the individual stimulation sites. The individual set of coordinates was then transformed using a non-linear transformation to reconstruct the targets in individual brain spaces. Lastly, to assure a coherent intrasession and intersession stimulation, the individualized targets were marked in the subject's anatomical MRI loaded into the neuronavigation system.

Data Analysis

Before undergoing parametric or non-parametric statistical procedures, the assumption of normality distribution of data residuals was assessed with Shapiro-Wilk test. The assumption of sphericity was tested with Mauchly test, if this test was significant, we used the Huynh-Feldt correction. The level of significance was set at $\alpha=0.05$.

To assess memory performances in experiment 1 910, we ran repeated-measures ANOVAs with stimulation condition as a within-subject factor (i.e., iTBS+γtACS; iTBS+sham-tACS; sham-iTBS+sham-tACS) for each dependent variable. In detail, a separate ANOVA was conducted for every FNAT measure (i.e., name, occupation, total) on each memory process (i.e., intermediate recall 906a, delayed recall 906b, and recognition). Separate ANOVAs were also conducted for STBM 907 accuracy and RTs both for the shape and the binding condition.

To assess memory performances in experiment 2 920, we ran repeated-measures ANOVAs with stimulation condition as a within-subject factor (iTBS+γtACS, iTBS+sham-tACS). Separate ANOVAs were conducted for each dependent variable as for experiment 1 910 except for FNAT delayed recall performance, which was analyzed with a repeated-measure ANOVA with stimulation condition (i.e., iTBS+γtACS, iTBS+sham-tACS) and time (i.e., day1, day2, day7) as within-subject factors. Following the results obtained in this analysis (see 'results' paragraph), we conducted exploratory paired t-tests aimed at investigating the effect of stimulation conditions on each time point.

To assess both cortical oscillation and connectivity changes in experiment 3 930, we computed repeated-measures ANOVAs with stimulation condition (iTBS+γtACS, iTBS+sham-tACS) and time T1-T0, T2-T0 (ΔT1, ΔT2) as within factors for each frequency band. Also in this case, paired t-tests were conducted to investigate the effect of stimulation condition on each time point (T0, T1, T2).

To assess cortical excitability effects, we computed a repeated-measures ANOVA with stimulation condition (iTBS+γtACS, iTBS+sham-tACS), time (T0, T1, T2) and peak (P1, P2, P3, P4, P5, P6) as within-subject factors. Post-hoc comparisons were performed with paired t-tests corrected with Bonferroni method.

To assess the possible predictive role of baseline level neurophysiological outputs (i.e., cortical oscillatory activity, connectivity, cortical excitability) on memory performances, we performed a stepwise linear regression using a forward algorithm.

A General Linear Model (GLM) was used to test whether the stimulation condition modulated participants' resting-state functional connectivity (rsFC). The statistical analyses were performed considering the stimulation conditions (i.e., iTBS+γtACS; iTBS+sham-tACS) and time points (i.e., pre and post) as factors. In particular, a seed-to-voxel analysis considering as seed the PC (i.e., the stimulated region) was computed. Temporal correlations were calculated between this seed and all other voxels in the brain. Age, gender, and order of stimulation were included as covariates in all analyses. Results were computed by applying a cluster size correction (false discovery rate) and an alpha of 0.01.

Results

The different stimulation protocols were all well-tolerated. No participants reported significant side effects connected with the neuromodulation protocol applications.

iTBS-γtACS for Selectively Improving Long-Term Associative Memory

Figure 10A:
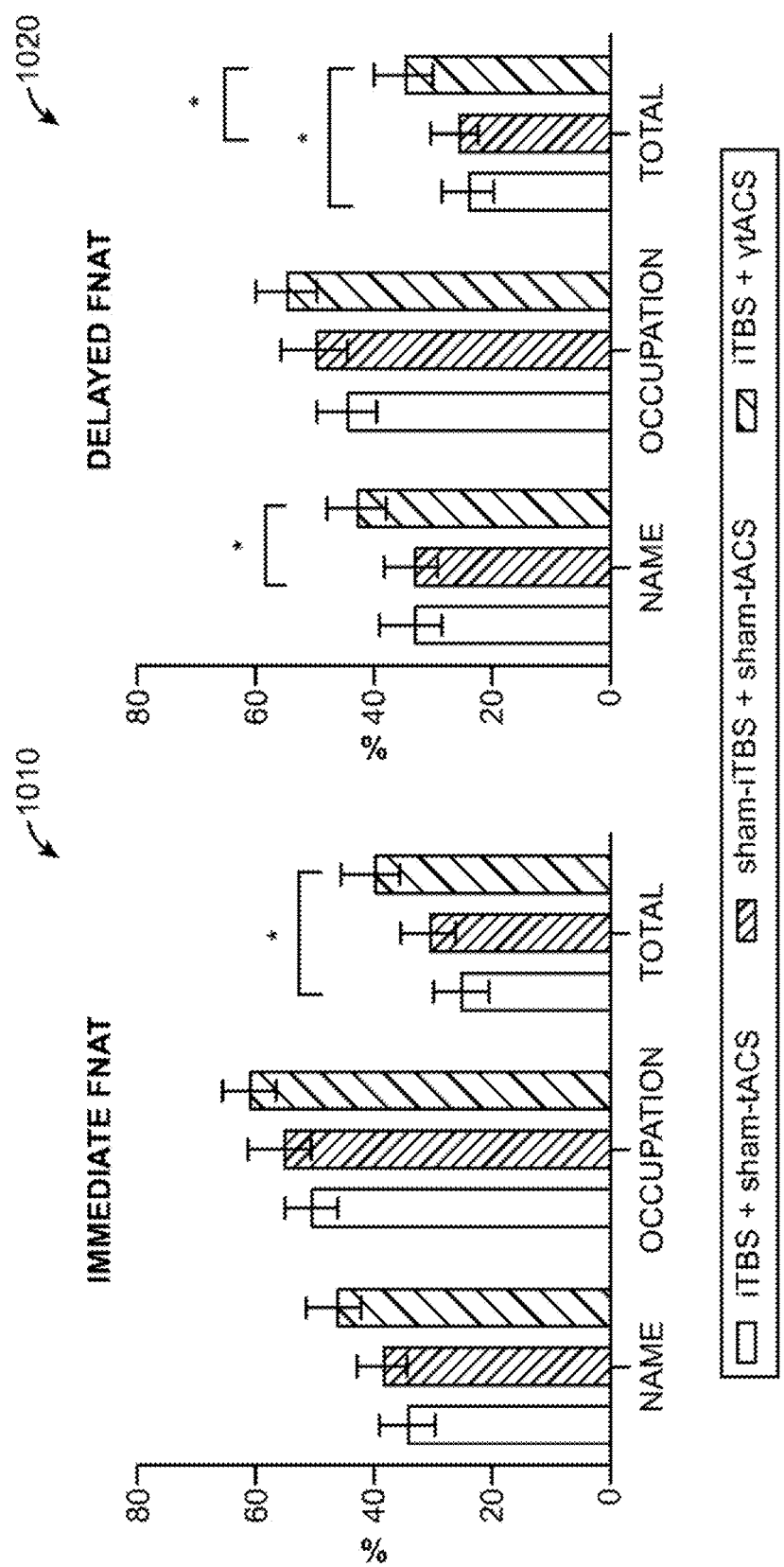
FIG. 10A shows graphical analysis for immediate FNAT and delayed FNAT testing.
Figure 10B:
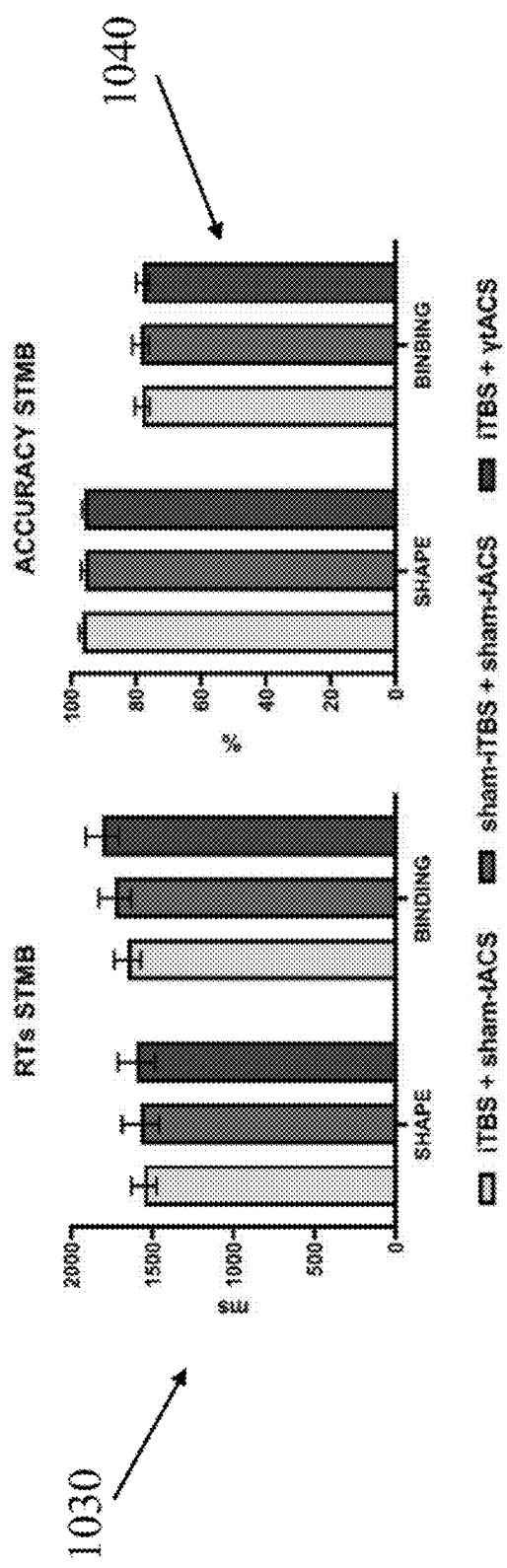
FIG. 10B shows graphical analysis for STMB accuracy and RTs.

In experiment 1 910, we investigated the effects of three stimulation conditions (i.e., iTBS+γtACS, iTBS+sham-tACS, sham-iTBS+sham-tACS) on memory performances. A main effect was found for the iTBS+γtACS condition over the long-term associative memory performance investigated through the FNAT 906a, 906b. Specifically, total FNAT was found to be different both in the immediate FNAT recall 906a performance, as illustrated by graph 1010 (F2, 38=6.81; p=0.003; $\eta^2$p=0.264) and the delayed FNAT recall 906b performance as illustrated by graph 1020 (F2,38=6.35; p=0.009; $\eta^2$p=0.25). Post-hoc analysis revealed a higher total FNAT score in the immediate recall in iTBS+γtACS respect to iTBS+sham-tACS (40.4±22.5% vs. 25.4±19%; post-hoc p=0.011) (FIG. 10A), while an increase was found in iTBS+γtACS delayed recall both versus iTBS+sham-tACS (35±22.4% vs. 26.2±19.8%; p=0.046) and sham-iTBS+sham-tACS (40.4±22.5% vs. 26.3±17.6% p=0.026) (FIG. 2A). Moreover, an effect was found on the FNAT name delayed recall 906b (F2,38=3.46; p=0.042; 12 p=0.154) where an increase was found in iTBS+γtACS respect to sham-iTBS+sham-tACS (42.9±21.5% vs. 33.8±19%; p=0.048) and a trend was observed in the immediate recall 906a (F2,38=3.2; p=0.052; $\eta^2$p=0.144) (FIG. 10). These stimulation conditions effects were selective for long-term associative memory investigated through the FNAT 906a, 906b, no effects were found on visual short-term memory investigated through STMB RTs 1030 and accuracy 1040 (all ps>0.05) (FIG. 10B).

iTBS-γtACS Has Long-Lasting Effects on Associative Memory

To investigate the long-term effects of the neuromodulation protocol on memory performances and replicate the results of experiment 1 910, we ran experiment 2 920 adding delayed FNAT cued recall after 24 hours 906c and 1 week 906d from the neuromodulatory protocol 901. As for experiment 1 910, we found an effect for the iTBS+γtACS over the total immediate FNAT 906a memory performance (F1, 9=7.31; p=0.024; $\eta^2$p=0.448, with an increase in the performance after the iTBS+γtACS respect to the control condition iTBS+sham-tACS (26.7±10.2% vs. 17.5±8.3%; p=0.024) as illustrated by immediate recall results graph 1110 of FIG. 11A. More important, we found that the stimulation condition had a long-lasting effect on the total delayed FNAT performance (F1,9=8.433; p=0.017; $\eta^2$p=0.484) as illustrated in the name results graph 1130, the occupation results graph 1140, and the total results graph 1050 of FIG. 11B. Indeed, the exploratory analysis revealed that such effect lasted up to one week after the neuromodulation (day 1 906b: 25±9.6% vs. 14.2±9.7%; t9=−2.751; p=0.011; day 2 906c: 25.8±10.7% vs. 15±9.5%; t9=−2.899; p=0.009; day 7 906d: 23.3±12.9% vs. 14.2±12.5%; t9=−2.400; p=0.020).

No effects were found for FNAT 906a, 906b recognition and STMB 907 accuracy and RTs (all ps>0.05) as for experiment 1 910.

iTBS-γtACS Increases Gamma Oscillation and Medial Parieto-Frontal Connections

Experiment 3 930 was aimed at investigating the effects of the neuromodulation protocol 901 on cortical oscillations and connectivity, by means of TRSP and PLV respectively. Analysis of local cortical oscillations showed a main effect of the neuromodulation protocol 901 over the gamma TRSP (F1,13=5.073; p=0.042; $\eta^2$p=0.281). Specifically, we observed an increase of the gamma-TRSP after iTBS+γtACS respect to iTBS+sham tACS in both time points (ΔT1: 0.045±0.09 vs. −0.013±0.06; t13=1.96; p=0.036; ΔT2: 0.026±0.04 vs. −0.013±0.05; t13=1.92; p=0.039). This effect was specific for the stimulation of PC; indeed, no significant effect was found over the 1PPC (p>0.05).

Analysis of connectivity showed a significant effect of the neuromodulation protocol 901 on PLV in the gamma (F1, 13=5.07; p=0.042; $\eta^2$p=0.281) and alpha frequency band (F1,13=13.32; p=0.003; $\eta^2$p=0.506). Specifically, an increase in the gamma PLV was observed after 20 minutes from iTBS+γtACS respect to iTBS+sham-tACS (ΔT2: 0.06±0.11 vs. −0.03±0.09; t13=2.53; p=0.013) while a trend was observed immediately after (ΔT1: 0.07±0.11 vs. 0.00±0.11; t13=1.5; p=0.07). On the other hand, alpha PLV was increased both immediately and 20 min after iTBS+γtACS with respect to iTBS+sham-tACS (ΔT1: 0.06±0.09 vs. −0.09±0.11; t13=4.58; p=0.001; ΔT2: 0.02±0.07 vs. −0.06±0.13; t13=2.06; p=0.03). Moreover, a trend in the stimulation effect was found over the PLV index computed in theta (F1,13=4.309; p=0.058; $\eta^2$p=0.249) and beta (F1, 13=4.583; p=0.052; $\eta^2$p=0.261).

iTBS-γtACS Increases Functional Connectivity

Figure 12A:
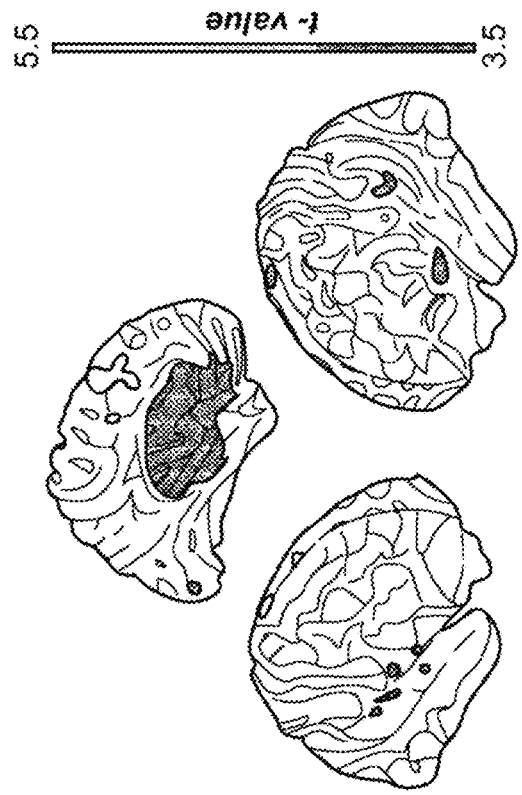
FIGS. 12A-12D shows graphical representation of seed-to-voxel analyses on an MNI map.
Figure 12B:
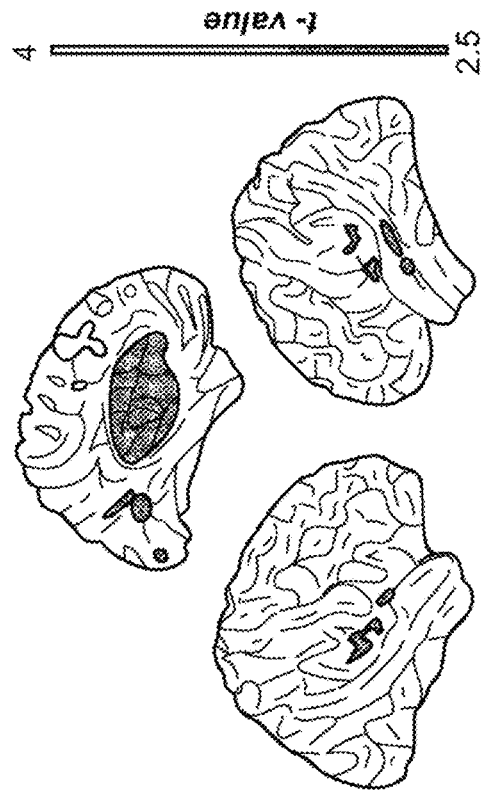
Figure 12C:
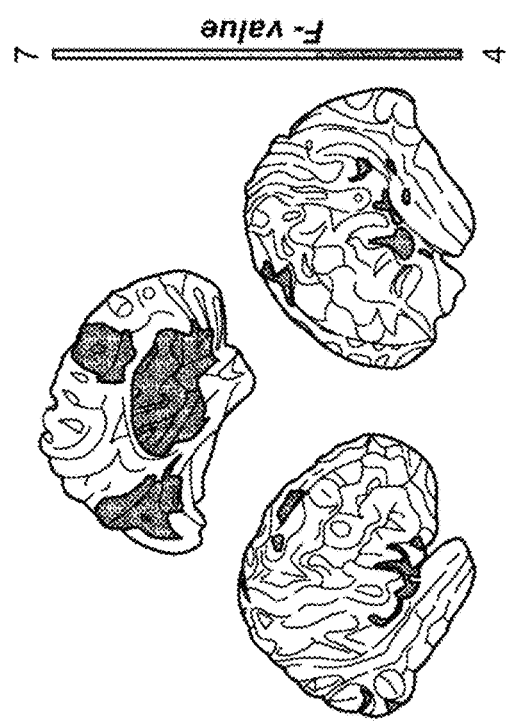
Figure 12D:
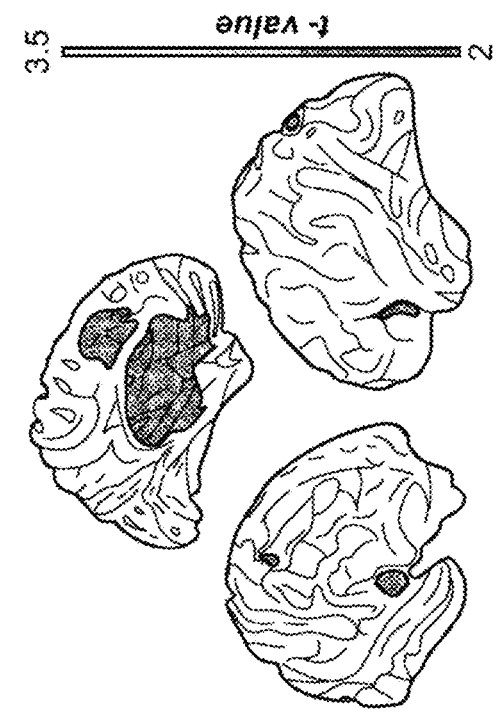

In experiment 4 940 we investigated the effects of the neuromodulation protocol 901 in functional connectivity thanks to MRI analyses. We computed a seed-based functional connectivity analysis using the stimulated area (i.e., PC) as seed. The analysis revealed a significant stimulation condition×time interactions on rs-FC between PC and bilateral insular cortices, cuneal cortex, orbitofrontal cortex, and cingulate gyrus (FIG. 12A). Moreover, a main effect of stimulation condition was observed within PC and bilateral insular cortices, left temporal cortex, and cingulate gyrus (FIG. 12B). To further investigate the interaction effect, we conducted pairwise comparisons that revealed an rs-FC increase in the insular cortices, orbitofrontal cortex, and the cingulate gyrus after iTBS+γtACS when comparing it to the same condition before stimulation (FIG. 12C). At the same time, we observed an rs-FC decrease in the bilateral insular cortices and the cuneal cortex after the iTBS+sham-tACS condition when compared to rs-FC pre-stimulation (FIG. 12D). No significant differences were detected between the groups before stimulation.

FIGS. 12A-D illustrates the Seed-to-voxel results of experiments 4 940 with significant results at p<0.02 (FDR-corrected) shown on the standard MNI map for A) Interaction between group and condition. B) Main effect of condition. C) iTBS+γtACS: post>pre. D) iTBS+sham-tACS: post>pre. The color bar represents F or t-values.

Computer Systems

Figure 13:
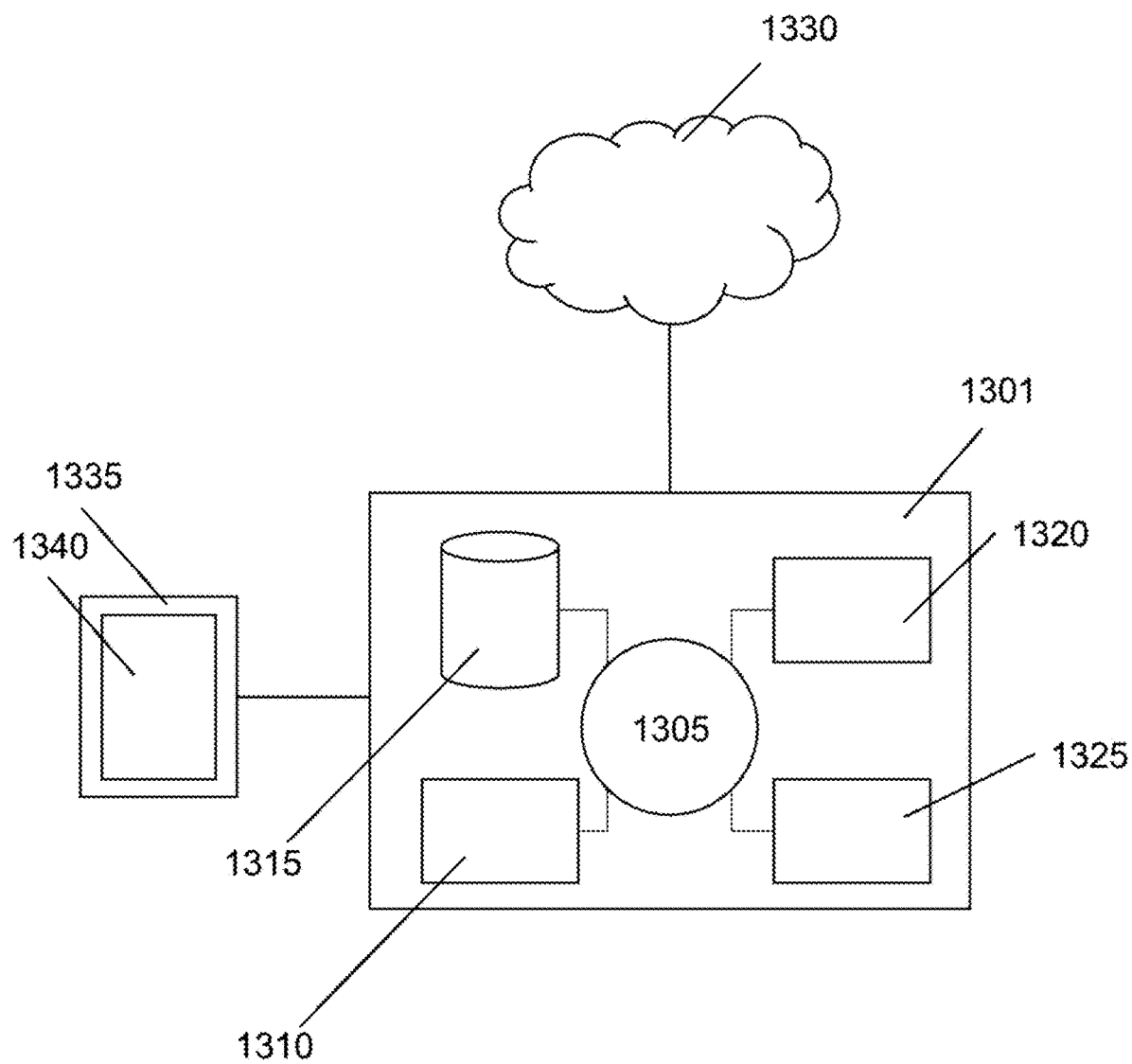
FIG. 13 shows a computer system that is programmed or otherwise configured to implement methods provided herein.

The present disclosure provides computer systems that are programmed to implement methods of the disclosure. FIG. 13 shows a computer system 1301 that is programmed or otherwise configured to perform one or more steps of methods described herein and/or control one or more aspects of the systems and methods described herein. The computer system 1301 can regulate various aspects of the present disclosure, such as, for example, applying stimulation to a patient; recording bio signals of the patient; analyzing recorded signals and/or one or more other inputs; and generating an output based on the recorded signals and signal analysis.

The computer system 1301 can be an electronic device of a user or a computer system that is remotely located with respect to the electronic device. The electronic device can be a mobile electronic device.

The computer system 1301 includes a central processing unit (CPU, also "processor" and "computer processor" herein) 1305, which can be a single core or multi core processor, or a plurality of processors for parallel processing. The computer system 1301 also includes memory or memory location 1310 (e.g., random-access memory, read-only memory, flash memory), electronic storage unit 1315 (e.g., hard disk), communication interface 1320 (e.g., network adapter) for communicating with one or more other systems, and peripheral devices 1325, such as cache, other memory, data storage and/or electronic display adapters. The memory 1310, storage unit 1315, interface 1320 and peripheral devices 1325 are in communication with the CPU 1305 through a communication bus (solid lines), such as a motherboard. The storage unit 1315 can be a data storage unit (or data repository) for storing data. The computer system 1301 can be operatively coupled to a computer network ("network") 1330 with the aid of the communication interface 1320. The network 1330 can be the Internet, an internet and/or extranet, or an intranet and/or extranet that is in communication with the Internet. The network 1330 in some cases is a telecommunication and/or data network. The network 1330 can include one or more computer servers, which can enable distributed computing, such as cloud computing. The network 1330, in some cases with the aid of the computer system 1301, can implement a peer-to-peer network, which may enable devices coupled to the computer system 1301 to behave as a client or a server.

The CPU 1305 can execute a sequence of machine-readable instructions, which can be embodied in a program or software. The instructions may be stored in a memory location, such as the memory 1310. The instructions can be directed to the CPU 1305, which can subsequently program or otherwise configure the CPU 1305 to implement methods of the present disclosure. Examples of operations performed by the CPU 1305 can include fetch, decode, execute, and writeback.

The CPU 1305 can be part of a circuit, such as an integrated circuit. One or more other components of the system 1301 can be included in the circuit. In some cases, the circuit is an application specific integrated circuit (ASIC).

The storage unit 1315 can store files, such as drivers, libraries and saved programs. The storage unit 1315 can store user data, e.g., user preferences and user programs. The computer system 1301 in some cases can include one or more additional data storage units that are external to the computer system 1301, such as located on a remote server that is in communication with the computer system 1301 through an intranet or the Internet.

The computer system 1301 can communicate with one or more remote computer systems through the network 1330. For instance, the computer system 1301 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1301 via the network 1330.

Methods as described herein can be implemented by way of machine (e.g., computer processor) executable code stored on an electronic storage location of the computer system 1301, such as, for example, on the memory 1310 or electronic storage unit 1315. The machine executable or machine readable code can be provided in the form of software. During use, the code can be executed by the processor 1305. In some cases, the code can be retrieved from the storage unit 1315 and stored on the memory 1310 for ready access by the processor 1305. In some situations, the electronic storage unit 1315 can be precluded, and machine-executable instructions are stored on memory 1310.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 1301, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1301 can include or be in communication with an electronic display 1335 that comprises a user interface (UI) 1340 for providing, for example, visual representation of stimulation parameters; graphical representation of recorded response signals, an indication of the non-invasive assessment of the brain state of the person, etc. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1305. The algorithm can, for example, control stimulation protocols, perform data analysis and generate an output based on the data analysis.

While preferred embodiments of the present disclosure have been shown and described herein, it will be obvious to those skilled in the art that such embodiments are provided by way of example only. It is not intended that the present disclosure be limited by the specific examples provided within the specification. While the present disclosure has been described with reference to the aforementioned specification, the descriptions and illustrations of the embodiments herein are not meant to be construed in a limiting sense. Numerous variations, changes, and substitutions will now occur to those skilled in the art without departing from the present disclosure. Furthermore, it shall be understood that all aspects of the present disclosure are not limited to the specific depictions, configurations or relative proportions set forth herein which depend upon a variety of conditions and variables. It should be understood that various alternatives to the embodiments described herein may be employed in practicing the present disclosure. It is therefore contemplated that the present disclosure shall also cover any such alternatives, modifications, variations, or equivalents. It is intended that the following claims define the scope of the invention and that methods and structures within the scope of these claims and their equivalents be covered thereby.

The invention claimed is:

1. A method of enhancing memory in a subject, the method comprising:
   applying to a first brain region in a brain of a subject, during a first time period, a combination of transcranial magnetic stimulation (TMS) and transcranial alternating current stimulation (tACS), wherein
   the first brain region represents a functional brain network associated with memory;
   the tACS is applied using a target frequency in a gamma frequency range, and applying to the first brain region in a brain of a subject, during a first time period, a combination of TMS and tACS comprises:
      continuously applying tACS during the first time period as a sinusoidal wave; and
      applying TMS as a set of stimulation pulse trains separated by periods of non-stimulation.

2. The method of claim 1, wherein applying TMS comprises applying intermittent theta burst stimulation (iTBS).

3. The method of claim 1, further comprising:
   identifying, based on a plurality of evoked potentials, a stimulation location within the first brain region to stimulate the subject;
   wherein applying a combination of TMS and tACS to the first brain region comprises applying the combination of TMS and tACS at the stimulation location within the first brain region.

4. The method of claim 3, wherein applying the combination of TMS and tACS at the stimulation location within the first brain region comprises using neuronavigation to track the stimulation location while applying the combination of TMS and tACS.

5. The method of claim 1, wherein the target frequency is between 60-80 Hz.

6. The method of claim 1, wherein applying TMS to the first brain region comprises applying a set of bursts of magnetic pulses in the gamma frequency range.

7. The method of claim 1, wherein the target frequency of tACS stimulation is approximately 70 Hz.

8. The method of claim 1, wherein a length of each of the periods of non-stimulation is approximately four times as long as a length of each stimulation pulse train in the set of stimulation pulse trains.

9. The method of claim 1, wherein applying to a first brain region in a brain of a subject, during a first time period, a combination of TMS and tACS comprises:
 arranging a tACS electrode on a scalp of the subject;
 arranging a figure-of-eight coil adjacent to the tACS electrode; and
 controlling stimulation via the tACS and the figure-of-eight coil using a controller coupled to the tACS electrode and the figure-of-eight coil.

10. The method of claim 1, wherein the first brain region comprises a precuneus region or a left posterior parietal cortex region.

11. The method of claim 1, further comprising:
 measuring, by a memory task performed by the subject after applying the combination of TMS and tACS, enhanced long-term memory performance of the subject.

12. The method of claim 11, wherein the memory task is a face-name associative task or a short-term memory binding test.

13. A memory enhancement system, comprising:
 a transcranial magnetic stimulation (TMS) coil;
 at least one transcranial alternating current stimulation (tACS) electrode configured to be arranged on a scalp of a subject; and
 a controller configured to
  activate the TMS coil and the at least one tACS electrode according to a stimulation protocol to apply stimulation to a first brain region in a brain of the subject, during a first time period, wherein
   the first brain region represents a functional brain network associated with memory,
   tACS is applied using a target frequency in a gamma frequency range, and
   applying the stimulation to the first brain region in a brain of a subject, during a first time period comprises:
    continuously applying tACS during the first time period as a sinusoidal wave; and
    applying TMS as a set of stimulation pulse trains separated by periods of non-stimulation.

14. The memory enhancement system of claim 13, wherein activating the TMS coil comprises activating the TMS coil to apply intermittent theta burst stimulation (iTBS) during the first time period.

15. The memory enhancement system of claim 13, further comprising:
 an electroencephalography (EEG) system configured to record a plurality of evoked potentials from the brain of the subject; and
 a neuronavigation system configured to track a location of stimulation during application of the TMS and tACS during the first time period,
 wherein the controller is further configured to:
  identify, based on the plurality of evoked potentials, a stimulation location within the first brain region to stimulate the subject, and
  activate the TMS coil and the at least one tACS electrode to apply stimulation at the stimulation location based, at least in part, on information provided the neuronavigation system.

16. The memory enhancement system of claim 13, wherein a length of each of the periods of non-stimulation is approximately four times as long as a length of each stimulation pulse train in the set of stimulation pulse trains.

17. The memory enhancement system of claim 13, wherein the first brain region comprises a precuneus region or a left posterior parietal cortex region.

18. The memory enhancement system of claim 13, wherein the target frequency is between 60-80 Hz.

19. The memory enhancement system of claim 13, wherein applying TMS to the first brain region comprises applying a set of bursts of magnetic pulses in the gamma frequency range.

20. The memory enhancement system of claim 13, wherein the first brain region comprises a precuneus region or a left posterior parietal cortex region.

* * * * *